(12) United States Patent
Lappin

(10) Patent No.: US 9,973,552 B2
(45) Date of Patent: May 15, 2018

(54) SYSTEMS AND METHODS FOR ORGANIZATIONAL COLLABORATION

(71) Applicant: Candex Technologies Ltd., Ramat-Gan (IL)

(72) Inventor: Jeremy S. Lappin, Tel-Aviv (IL)

(73) Assignee: Candex Technologies Ltd., Ramat-Gan (IL)

( * ) Notice: Subject to any disclaimer, the term of this patent is extended or adjusted under 35 U.S.C. 154(b) by 304 days.

(21) Appl. No.: 14/806,849

(22) Filed: Jul. 23, 2015

(65) Prior Publication Data

US 2016/0036872 A1     Feb. 4, 2016

Related U.S. Application Data

(60) Provisional application No. 62/032,681, filed on Aug. 4, 2014.

(51) Int. Cl.
| | |
|---|---|
| G06F 15/16 | (2006.01) |
| H04L 29/06 | (2006.01) |
| G06Q 10/10 | (2012.01) |
| H04L 12/58 | (2006.01) |
| H04L 12/18 | (2006.01) |

(52) U.S. Cl.
CPC ........ *H04L 65/403* (2013.01); *G06Q 10/103* (2013.01); *H04L 12/185* (2013.01); *H04L 51/32* (2013.01)

(58) Field of Classification Search
CPC ..... H04L 65/403; H04L 12/185; H04L 51/32; G06Q 10/103
See application file for complete search history.

(56) References Cited

U.S. PATENT DOCUMENTS

| | | | | |
|---|---|---|---|---|
| 7,610,287 | B1* | 10/2009 | Dean ................ | G06F 17/30699 |
| 2008/0114844 | A1* | 5/2008 | Sanchez ............... | G06F 9/4443 709/206 |
| 2011/0016274 | A1* | 1/2011 | Ohnuma ............ | G06F 12/0223 711/115 |
| 2014/0164934 | A1* | 6/2014 | Yang ................... | G06F 17/3089 715/738 |
| 2015/0347966 | A1* | 12/2015 | Saunders .............. | G06Q 10/10 705/342 |

\* cited by examiner

*Primary Examiner* — Michael A Keller

(57) ABSTRACT

A peer collaboration method comprising: receiving commands from certain users to create project correspondence environment (PCE) objects each containing PCE metadata and PCE team members and related entities; generating, for each of the PCE objects, child PCE objects associated with respective related entities, associating each entity with the respective child PCE object as a PCE child member, and inheriting respective PCE metadata from the PCE object, each one of the child PCE objects additionally containing child PCE team members; documenting correspondence held between any of the child PCE team members within each respective child PCE object; providing each of the child PCE team members with an access to the documented correspondence within the child PCE object; documenting correspondence held between any of the PCE team members with each of the entities; and providing each of the PCE team members with an access to the documented correspondence in the PCE object.

62 Claims, 35 Drawing Sheets

SYSTEMS AND METHODS FOR ORGANIZATIONAL COLLABORATION

RELATED APPLICATION

This application claims the benefit of priority under 35 USC § 119(e) of U.S. Provisional Patent Application No. 62/032,681 filed Aug. 4, 2014, the contents of which are incorporated herein by reference in their entirety.

FIELD AND BACKGROUND OF THE INVENTION

The present invention, in some embodiments thereof, relates to systems and methods for communication between peers and, more specifically, but not exclusively, to systems and methods for collaboration between peers of an organization.

Different systems have been developed to try and help employees of an organization collaborate. For example, Yammer® (www(dot)yammer(dot)com) describes "a private social network that helps employees collaborate across departments, locations and business apps". In another example, Microsoft SharePoint® describes "new ways to share your work and work with others, organize your projects and teams and discover people and information".

SUMMARY OF THE INVENTION

According to an aspect of some embodiments of the present invention, there is provided a computer-implemented method for intra-organizational and extra-organizational peer collaboration, comprising: registering, at a central server, multiple users in a user repository storing a dataset of multiple registered users; receiving, at the central server, multiple commands from certain users of the multiple registered users, to create multiple project correspondence environment (PCE) objects each containing PCE metadata and multiple PCE team member electronic addresses of multiple PCE team members from the registered users, and multiple related entity electronic addresses of entities associated with the PCE object; receiving a command, at the central server, from a certain PCE team member of each PCE object, to associate multiple entity users from the multiple related entities with each PCE object based on the electronic address; generating, for each of the PCE objects multiple child PCE objects associated with respective the multiple related entities, associating each entity user with the respective child PCE object as a PCE child member, and inheriting respective the PCE metadata from the PCE object, each one of the multiple child PCE objects additionally containing multiple child PCE team member electronic addresses of multiple child PCE team members; documenting correspondence held between any of the multiple child PCE team members within each respective child PCE object using the multiple related entity electronic addresses in the PCE object; providing each of the multiple child PCE team members with an access to correspondence documented in a respective the child PCE object; documenting correspondence held between any of the multiple PCE team members with each of the entities using the multiple related entity electronic addresses in the PCE object; and providing each of the multiple PCE team members with an access to correspondence documented in a respective PCE object.

Optionally, the method further comprises associating the PCE objects with the user; and generating a list of the PCE objects for presentation in an intra-organizational social profile page.

Optionally, the method further comprises blocking access to the documented correspondence from other child PCE team members of other child PCE objects and from PCE team members of the PCE object; and blocking each of the entities from access to correspondence with other of the entities.

Optionally, the metadata includes a brief field which includes a user provided description of a project on which the respective PCE object is based, and a debrief field which includes a user provided update of the project or a summary after project completion.

Optionally, the PCE object includes a shared space for sharing of data and correspondence of messages and files between team members of the PCE object and child team members of each child PCE object.

Optionally, the method further comprises displaying on a respective user interface of each team member of each PCE object, information of other team members of the PCE object and information of each related entity of each child PCE object; and displaying for each child PCE team member, information of other child team members of the PCE object and information of each team member of the PCE object.

Optionally, the generated PCE objects and child PCE objects are stored in a PCE repository.

Optionally, the method further comprises receiving a command, at the central server, from a certain child PCE team member of each child PCE object, to associate multiple entity users from the multiple related entities of the child PCE object with each child PCE object based on the electronic address; and generating, for each of the PCE child objects multiple grandchild PCE objects associated with respective the multiple related child entities, associating each child entity user with the respective grandchild PCE object as a PCE grandchild member, and inheriting respective the child PCE metadata from the child PCE object, each one of the multiple grandchild PCE objects additionally containing multiple grandchild PCE team member electronic addresses of multiple grandchild PCE team members. Optionally, correspondence of grandchild team members of the grandchild PCE object is unavailable for access by team members of the PCE object, and correspondence of team members of the PCE object is unavailable for access by team grandchild members of the grandchild PCE object. Optionally, the method further comprises receiving, at the central server, a request from a certain team member of the PCE object to link to the grandchild PCE object, and linking the grandchild PCE object to the PCE object, the PCE link stored in the PCE mapping module; wherein selected correspondence of the grandchild team members of the grandchild PCE object is available to team members of the PCE object, and selected correspondence of the PCE team members of the PCE object is available to grandchild team members of the grandchild PCE object.

Optionally, the method further comprises linking the child PCE object to the PCE object via a PCE link, the PCE link stored in a PCE mapping module.

Optionally, inheriting comprises automatically copying data from a shared space of the PCE object having permission for access by the respective child PCE object, to the shared space of the respective child PCE object, the copied data having a permission to allow access to the copied data by all child team members of the child PCE object.

Optionally, data designated as archived in the PCE object has permission for access by all respective child PCE objects, the archive automatically copied to all child PCE objects.

Optionally, the correspondence includes a text message written by the certain team member for viewing by a selected subset of team members based on a permission associated with the text message.

Optionally, the correspondence includes a file uploaded by the certain team member to the respective shared space of the PCE object, for downloading or viewing by a selected subset of team members based on a permission associated with the file. Optionally, correspondence designated as archived is available for downloading or reviewing by all team members based on a global permission level.

Optionally, the correspondence by the PCE team member is copied to the child PCE object for access by all child PCE team members.

Optionally, the correspondence by the child PCE team members is copied to the PCE object for access by all PCE team members.

Optionally, the method further comprises receiving, at the central server, a request from at least one user of the multiple registered users, to become a member of the PCE object; and mapping, at the central server, between the at least one requesting user and the PCE object, to assign members of the PCE object.

Optionally, a single copy of the correspondence is stored within the shared space of the PCE object, the same single copy accessible to the PCE members.

Optionally, the PCE team members include internal users from within a company and the child PCE team members include external users from the related entity outside the company, the internal and external users collaborating together through common respective PCE objects.

Optionally, the method further comprises one or both of tagging a PCE link between the PCE object and child PCE object, and storing data in association with the PCE link, the data related to the relationship between the team members of the PCE object and the related entity of the child PCE object. Optionally, the link is unidirectional, and tagging and storing data is independently performed for the link between the PCE object and child PCE object, and for the link between the child PCE object and the parent PCE object.

Optionally, metadata of the child PCE object is changed by a certain child PCE member, independently of the metadata of the PCE object.

Optionally, the method further comprises providing data from a certain team member of the PCE object to selected child team members of the child PCE object, the data uploaded to a shared space of the child PCE object by the certain team member.

Optionally, the method further comprises adding a new team member to the PCE object; and providing access to pre-stored correspondence of the PCE object having permission for access by the new member.

Optionally, the method further comprises removing an existing team member of the PCE object; and providing access to pre-stored correspondence of the PCE object having permission for access by the removed member until the time and date of the removal.

Optionally, the method further comprises selectively upgrading certain registered users to an upgraded system level, wherein registered users at the basic level have access to correspondence within the shared space of each PCE object until a preselected time period, and users at an upgraded level have access to all correspondence independently of the preselected time period.

Optionally, the method further comprises receiving, at the central server, a command from a certain PCE team member to close a certain PCE object; and receiving, at the central server, a command from the certain PCE member to open the closed certain PCE object; wherein the certain PCE member accesses correspondence of the certain PCE object added between the closing and the opening, after the opening of the closed certain PCE object.

Optionally, the method further comprises receiving, at the central server, a command from a certain internal user that another certain internal user has left the organization, and flagging the another certain user within the user repository with a left-the-organization status based on the signal from the certain internal user.

Optionally, documented correspondences are retained by blocking at least one of tampering and deletion of the documented correspondences by each of the plurality of PCE team members.

According to an aspect of some embodiments of the present invention there is provided a system for intra-organizational and extra-organizational peer collaboration, comprising: a central server comprising: a terminal interface configured for communicating with a plurality of client terminals of a plurality of registered users; a program store storing code; and a processor coupled to the terminal interface, and the program store for implementing the stored code, the code comprising: a user repository that stores a dataset of the plurality of registered users, a project correspondence environment (PCE) repository that stores a plurality of PCE objects, each containing PCE metadata and a plurality of PCE team member electronic addresses of a plurality of PCE team members from the registered users, and a plurality of related entity electronic addresses of entities associated with the PCE object, a user mapping module that based on a received command from a certain PCE team member of each PCE object, associates a plurality of entity users from the plurality of related entities with each PCE object based on the electronic address, a PCE object management module that generates, for each of the PCE objects, a plurality of child PCE objects associated with respective the plurality of related entities, associates each entity user with the respective child PCE object as a PCE child member, and inherits respective the PCE metadata from the PCE object, each one of the plurality of child PCE objects additionally containing a plurality of child PCE team member electronic addresses of a plurality of child PCE team members, and the PCE object management module receives a plurality of commands from certain users of the plurality of registered users, creates a plurality of PCE objects, documents correspondence held between any of the plurality of child PCE team members within each respective child PCE object using the plurality of related entity electronic addresses in the PCE object, provides each of the plurality of child PCE team members with an access to correspondence documented in a respective the child PCE object; documents correspondence held between any of the plurality of PCE team members with each of the entities using the plurality of related entity electronic addresses in the PCE object; and provides each of the plurality of PCE team members with an access to correspondence documented in a respective the PCE object; wherein the terminal interface transmits instructions to one or both of display on the respective client terminal and download to the respective client terminal, correspondence of a respective PCE or child PCE based on an associated permission and the user accessing the client terminal.

Optionally, the metadata includes a brief field which includes a user provided description of a project on which the respective PCE object is based, and a debrief field which includes a user provided update of the project or a summary after project completion.

Optionally, the PCE object includes a shared space for sharing of data and correspondence of messages and files between members of the respective PCE object.

Optionally, the system further comprises a PCE mapping module that stores PCE links between PCE objects of the PCE repository, the PCE mapping module automatically adds a PCE link between the child PCE object and the PCE object during the generating.

Optionally, the PCE object management module further includes code to perform the inheriting by automatically copying data from a shared space of the parent PCE object having permission for access by the child PCE object, to a shared space of the child PCE object, the copied data having a permission to allow access to the copied data by all child team members of the child PCE object.

Optionally, each stored correspondence includes the associated permission denoting a subset of the PCE team members and child PCE objects that have access to the data. Optionally, a single copy of the correspondence is stored within the PCE object, the single copy accessible to the subset of PCE team members.

Optionally, the PCE object management module includes code to store one or both of a tag of a PCE link and data in association with the PCE link between the child PCE object and the PCE object.

Optionally, the PCE object management module includes code to copy data from the child PCE object having permission for access by the team members of the PCE object, to the PCE object.

Optionally, the user mapping module includes code to send an email to a non-registered peer when the PCE object contains certain correspondence having a permission to allow the non-registered peer access to the certain correspondence, the email including the data in the body of the email or as an attachment, the email including metadata to allow the non-registered peer to respond to the email. Optionally, the user mapping module includes code used as a destination address to receive a response email from the non-registered user, and to decode metadata within the response email to integrate data from the response email with the shared space of the correct corresponding PCE object.

Optionally, the system is a stand-alone system independent of integration with a company system.

Optionally, the system further comprises a user interface that displays to a certain registered user, a customized view of correspondence stored within each PCE object associated with the certain registered user, based on associated permission allowing the certain registered user access to certain correspondence.

Optionally, the system further comprises a user interface that provides a central data space for a certain registered user, wherein certain correspondence from all PCE objects associated with the certain registered user is centrally organized in a single list, based on the associated permission allowing the certain registered user access to the certain correspondence. Optionally, the user interface includes code to mirror the certain correspondence between the respective PCE objects and the central data space, so that removal of the certain correspondence from the central data space retains the certain data in the respective PCE object. Optionally, the user interface displays data from respective PCE objects that has not been acted upon by the certain registered user, within the central data space. Optionally, the user interface includes a closed PCE object that consolidates correspondence added to closed PCE objects after closing of respective PCE objects by the certain registered user.

Optionally, the system further comprises a user interface that aggregates all extra-organizational members of all PCE objects into an extra-organizational dataset, and to allow an intra-organizational registered user to search the dataset.

Optionally, the system further comprises a user interface that tags each PCE object with a category type, and searches through PCE objects based on the category type.

According to an aspect of some embodiments of the present invention, there is provided a computer-implemented method for intra-organizational and extra-organizational peer social networking, comprising: registering, at a central server, multiple users in a user repository storing a dataset of multiple registered users; receiving, at the central server, multiple commands from certain users of the multiple registered users, to create multiple project correspondence environment (PCE) objects each containing PCE metadata and multiple PCE team member electronic addresses of multiple PCE team members from the registered users, and multiple related entity electronic addresses of entities associated with the PCE object; receiving a command, at the central server, from a certain PCE team member of each PCE object, to associate multiple entity users from the multiple related entities with each PCE object based on the electronic address; documenting correspondence held between any of the multiple PCE team members with each of the entities using the multiple related entity electronic addresses in the PCE object; providing each of the multiple PCE team members with an access to correspondence documented in a respective the PCE object; associating the PCE objects with the user; generating a list of the PCE objects for presentation in an intra-organizational social profile page; and mapping social links between registered users of the user repository, and providing the list of the user to other users socially linked to the user.

Optionally, the metadata includes a brief field denoting a project on which the respective PCE object is based, a debrief field denoting an update of the project or a summary after project completion, and a shared space for sharing of data and correspondence of messages and files between team members of the PCE object.

Optionally, the metadata includes data, messages, and files designated as archived, and the list includes PCE objects with accessible archived items from the social profile page.

Optionally, the method further comprises mapping, by a PCE mapping module, links between PCE objects of each user having child PCE objects therefrom.

Optionally, the method further comprises blocking display of the list to extra-organizational users.

Optionally, the list includes a brief and a debrief of the PCE objects associated with the user, when the user is extra-organizational and list for the extra-organizational is viewed by intra-organizational users.

Optionally, each PCE object is associated with a social permission level, and each social link is associated with a social permission threshold, the social permission threshold defining which particular PCE objects of the at least linked user to provide.

Optionally, the method further comprises mapping the social links between registered users based on an organizational hierarchal structure of the organization, so that supervisors are linked to subordinates and to superiors.

Optionally, the method further comprises automatically detecting an update of the metadata of respective PCE objects, and automatically sending a message including the updated metadata to the linked user.

Optionally, the method further comprises generating for a certain extra-organizational user, a list of respective PCE objects for presentation based on the certain extra-organizational user being a member of the respective PCE objects.

Optionally, the method further comprises providing a user with a suitable permission level access to a certain PCE object without being linked to PCE team members of the certain PCE object.

Optionally, the method further comprises automatically linking between intra-organizational users of the user repository and extra-organizational users of the user repository based on the extra-organizational users being members of the PCE object together with respective intra-organizational users.

According to an aspect of some embodiments of the present invention, there is provided a computer-implemented method for intra-organizational and extra-organizational peer collaboration, comprising: registering, at a central server, multiple users in a user repository storing a dataset of multiple registered users; receiving, at the central server, multiple commands from certain users of the multiple registered users, to create multiple project correspondence environment (PCE) objects each containing PCE metadata and multiple PCE team member electronic addresses of multiple PCE team members from the registered users, and multiple related entity electronic addresses of entities associated with the PCE object; receiving a command, at the central server, from a certain PCE team member of each PCE object, to associate multiple entity users from the multiple related entities with each PCE object based on the electronic address; generating, for each of the PCE objects multiple child PCE objects associated with respective the multiple related entities, associating each entity user with the respective child PCE object as a PCE child member, and inheriting respective the PCE metadata from the PCE object, each one of the multiple child PCE objects additionally containing multiple child PCE team member electronic addresses of multiple child PCE team members; documenting correspondence held between any of the multiple child PCE team members within each respective child PCE object using the multiple related entity electronic addresses in the PCE object; providing each of the multiple child PCE team members with an access to correspondence documented in a respective the child PCE object, and blocking access to the documented correspondence from other child PCE team members of other child PCE objects and from PCE team members of the PCE object; documenting correspondence held between any of the multiple PCE team members with each of the entities using the multiple related entity electronic addresses in the PCE object; and providing each of the multiple PCE team members with an access to correspondence documented in a respective PCE object, and blocking each of the entities from access to correspondence with other of the entities.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
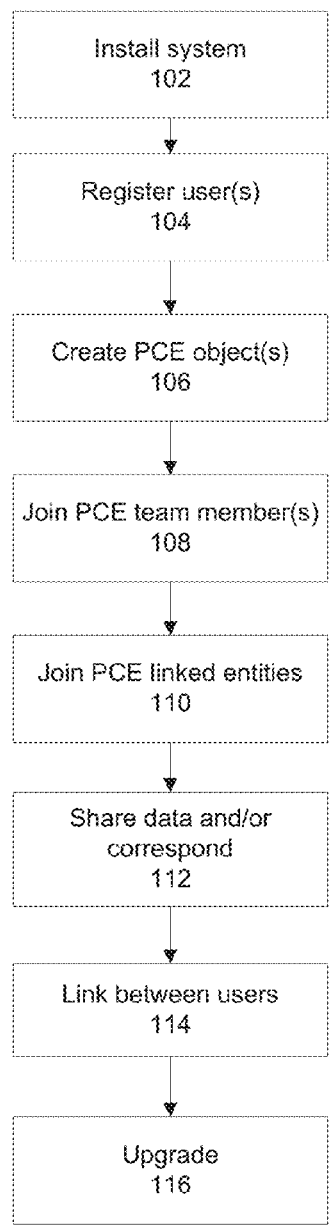
FIG. 1 is a flowchart of a method for intra-organizational and extra-organizational collaboration based on PCE object(s), in accordance with some embodiments of the present invention.

An aspect of some embodiments of the present invention relates to a generic object environment for collaboration between intra-organizational and/or extra-organizational peers. As used herein, the phrase project correspondence environment (PCE) refers to a generic object environment, which is based on a set of records and used for establishing an interactive platform for intra-organizational and/or extra-organizational peer collaboration based on exchanging electronic messages. The PCE object is executed to host a correspondence environment for a certain project, wherein team members and entities, which are assigned to the certain project can communicate and share knowledge while intra-organizational communication and extra-organizational communication may be managed under different paradigms. The PCE object based correspondence environment models the way a team that includes intra-organizational employees work together and with extra-organizational collaborators, such as suppliers and contractors. It is noted that the extra-organization collaborators may be from a different organization, from different parts of the same organization as the core team working on the project, or from different related companies owned by the same entity. It should be noted that a user who is involved in a plurality of project can manage her involvement in a plurality of different PCE objects simultaneously.

Optionally, a PCE object is created according to user instructions for a certain company related business activity, such as a project, a client, an activity, a sub project, and/or the like. Different PCE objects may include different intra-organizational and/or extra-organizational members (referred to herein as PCE members), such as depending on the project and who is working on the project. Each user (for example, an intra-organizational employee) may participate in multiple PCE objects, for example, different PCE objects for different projects the respective user is involved with.

Each PCE object defines based on user selection, PCE team members that are team members of the project (referred to herein as PCE team members). Optionally, each PCE object also defines, based on user selection, collaborators that contribute to the project but are not team members of the team allocated by the organization for the project, action, or sub project defined in the PCE object (referred to herein as PCE linked entities or linked partners). The electronic addressees of the team members and/or linked entities may be contained within the PCE object, for example, the email of the members, an electronic link to a user interface of the member, and an internet protocol (IP) address.

The linked entities may be related entities, which may be intra-organizational or extra-organizational, for example, attorneys, accountants, suppliers, and/or contractors. Each team member is aware of all other team and linked entities, by being displayed information of the other team members and linked entities, for example, on a user interface. Each linked entity is aware of all team members, but is unaware of the other linked entities, being displayed information of the team members with information of the linked entities being blocked. Optionally, information displayed to PCE team members may be specially designated for display to the PCE linked entities (e.g., to all), by a PCE team member designating a message, a file, and/or a document as an archive. The archive may become available to PCE linked entities that would otherwise not have availability to such information. Team members may be individual peers (for example, summary data of the individual is provided and displayed to other viewing peer). Linked entities may be other PCE objects (for example, summary data of the other PCE objects is provided and displayed to the other viewing peer), where each of the other PCE objects includes members from the entity itself, for example, employees of the law firm, accounting firm, supplier company and/or contracting company. Additional exemplary PCE members and collaborators are discussed in more detail below.

Optionally, data uploaded and/or posted to the PCE object (e.g., messages, files, and/or documents) is permanently retained. The uploaded and/or posted data may not be tampered with and/or deleted. In this manner, each PCE object retains a complete record of interactions, without data tampering and/or data deletion. Such complete records may be used, for example, to verify historical interactions, as part of legal proceedings, and/or as part of business negotiations.

An aspect of some embodiments of the present invention relates to systems and/or methods for intra-organizational and/or extra-organizational social networking based on PCE objects. Selected information within the PCE object is used as a basis for a social profile, which publishes accomplishments of the user PCE member to other intra-organizational users. The PCE object information shared by the user (for example, an intra-organizational employee) helps the user receive the recognition he/she deserves for working on the projects through related PCE objects. PCE object information may be shared, for example, by intra-organizational employees with other intra-organizational employees, and/or by extra-organizational entities with intra-organizational employees. The shared PCE object information helps the external entities receive recognition for their performance, for example, by intra-organizational employees selecting the external entities for new projects based on the shared PCE object information.

Optionally, intra-organizational and/or extra-organizational peers linked to one another are presented with PCE objects associated with the linked peer. Optionally, the peer issuing a request to access PCE objects associated with the linked peer is provided with selected information from the PCE objects of the linked peer, for example, the information is organized and/or displayed on a client terminal of the requesting peer.

The selected information for sharing is used as profile entries for the sharing user. Exemplary selected information may include one or more of: a title of the PCE object, a brief of the PCE object (which may describe the project of the project of the PCE object), a debrief of the PCE object (which may be an updated state of the project), and other optional data fields as described herein. Optionally, the selected information includes archives of the PCE object (e.g., messages, documents, and/or files), optionally archives designated by the user having the profile entry. In this manner, the archived data items may be used to highlight achievements of the profile user, for example, by making available (via designation) a work document the profile user worked on.

As described herein, the title, the brief, the debrief, PCE tags, link tags, and/or other selected information as described herein are part of a briefing. The briefing may be shared, as described herein.

The PCE object management system provides a common environment for peers from inside the organization to collaborate together with peers from outside the organization. The peers from outside the organization may be, for example, located on a different network than the internal peers, outside the wirewall of the organization, have different emails, and not be employees of the organization (but may be contractors).

Each PCE object includes metadata, such as: a title of the project, a brief field which includes a user provided description of a project on which the respective PCE object is based, and/or a debrief field which includes a user provided update of the project or a summary after project completion. Each PCE object includes a shared space for sharing of data and correspondence of messages and files between members of the PCE object, and other information as described herein. Each PCE object may include archives of the items within the shared space, which may be available to linked entities that do not have access to other shared information.

Optionally, a child PCE object is created by the PCE object management system for each PCE linked entity of a parent PCE object. The child PCE object may be generated upon request of a team member of the parent to link to the external entity. One of the external entity users may be selected by the requesting team member to represent the external entity. The representing user may be automatically added as a team member to the child PCE object. The representing user may be provided with permission levels to modify certain metadata to customize the child PCE object for use by the entity. Effectively, the child PCE object itself is linked to the parent PCE object as the linked entity.

The child PCE object partially mirrors the parent PCE object, including relevant messages, files, and/or documents intended for the members of the child PCE object by a member(s) of the parent PCE object. The child PCE object inherits certain metadata from the parent PCE object. The relevant metadata is copied, for example, from the parent PCE object to the child PCE object. The copied metadata may be changed by the team member of the child PCE object. Alternatively or additionally, certain metadata is not copied, but left blank for the term member to fill in. In this manner, metadata may be different and/or customized for the child PCE, for example, the title, brief and/or debrief of the child PCE object may be different than the parent PCE object. Alternatively or additionally, certain data stored within the shared space of the parent PCE is copied to the shared space of the child PCE object. The copied data has permission to allow access by the team members of the child PCE object. Optionally, messages, files, and/or documents designated as an archive in the parent PCE object are copied to the child PCE object, and become available to team members of the child PCE object.

The child PCE object is linked to the parent PCE object to maintain and/or update the inherited data.

The child PCE object may be used and/or managed by the respective child PCE team member in a similar manner described herein for the use of the parent PCE object. For example, the child PCE object is created for an extra-organizational contractor, and child PCE members which may be extra-organizational peers may be invited to participate in the child PCE object. In this manner, the child PCE object provides the respective child PCE team member with both an environment for collaboration with the members of the parent PCE, and a separate environment for collaboration with members of the child PCE. Effectively, the team members and/or linked entity child members of the child PCE object are independent of the team and/or linked entity parent members of the parent PCE object, able to correspond privately amongst themselves. Similarly, the team member and/or linked entity of the parent PCE object are independent of the team member and/or linked entity of the child PCE object. Each group of child PCE object members of each child PCE object may correspond amongst themselves, without child PCE object members of other child PCE objects having access to the correspondence. Parent PCE team members of the parent PCE object may correspond with all child PCE team members of each child PCE object. In this manner, the parent members correspond with all linked entities, while each linked entity corresponds amongst itself and/or with the parent members, but without correspondence between different linked entities. It is noted that archived data items span across parent and PCE objects, and across team members and linked entities of each linked child PCE object, being made available for viewing.

In a similar manner, additional PCE objects may be created and linked back, for example, one or more grandchild PCE objects may be created (for example, by a team member of the child PCE object). The members of the grandchild PCE objects are unable to communicate, correspond and/or share data back with members of the parent PCE object. Linking the grandchild PCE object directly back to the parent PCE object provides for communication between members of the grandchild and parent PCE objects. Complex graphs linking PCE objects may be created.

Optionally, a message from a PCE object member (for example, a text message, such as an email) may have a permission level to be read by all team members and linked entities. Alternatively, the permission level of the message is selectively set to be allowed to be read by certain PCE members selected by the sender, which may be a single member or several members, from the team member and/or linked entities. The sent message remains within the parent PCE object, with the permission defining who is allowed to access the message. When a child PCE object exists, the message may be copied to the child PCE object. Optionally, all (or a selected subgroup of) team members and/or linked entities of the child PCE object are able to access the data provided from the parent PCE object. A limited number of copies of the message may exist, which may be read by all recipients through a user interface connecting to the PCE, instead of, for example, multiple copies of the message being provided into an inbox of each person. For example, a single message for the parent PCE object, and another message for each relevant child PCE object.

Optionally, in a manner similar to the method described for messages, files and/or documents may be posted by a PCE object member with permission levels defining which subset (or one or all) of the team members and/or linked entities may access the files and/or documents. The files may remain within the parent PCE object, or selectively copied and mirrored to the child PCE object. Archived data items, such as messages and/or files and/or documents, may be visible to the linked member (e.g., all or a subset of).

The PCE objects of the peer may have permission levels defining which particular PCE objects and/or which particular fields of the PCE objects are accessible to the requesting peer. Archived data items may be automatically assigned global permission. In this manner, linked peers may learn what others are doing, such as what other people in their organization are working on. Employees are able to present their current and/or past work to their linked peers, for example, what projects they worked on, their role in each project, and/or the success of each project.

Employees may receive the recognition they deserve for the work performed, which may include, for example, the archived files and/or documents.

Optionally, peers that are extra-organizational (for example, not employees of the organization) are denied access to the brief and/or debrief fields of PCE objects of their intra-organizational linked peers. The intra-organizational peers may be provided with the brief and/or debrief of the PCE objects of their extra-organizational linked peers. In this manner, only intra-organizational employees may learn what others within the organization are doing, and/or what their extra-organizational peers are doing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term briefing includes other data fields accessible to the linked user, for example, one or more of the brief, the title, the project start date, the project end date, cost, and other fields as described herein. As used herein, the term briefing may sometimes be interchanged with, or used in addition to the words brief and/or debrief, for example, when the user is interested in several information items related to the project, instead of specific items such as the goal of the project or the update to the project.

As used herein, the term correspondence sometimes refers to sharing of messages and/or files and/or documents and/or other data between team members and/or linked entities, as described herein. As used herein, the term documented correspondence sometimes refers to the stored data representation of the shared messages and/or files, as described herein.

Reference is now made to FIG. 1, which is a flowchart of a method for intra-organizational and extra-organizational collaboration based on PCE object(s), in accordance with some embodiments of the present invention. The PCE object provides an organized structure in which messages are selectively sent between PCE object members and/or files are selectively shared between PCE object members.

Figure 2:
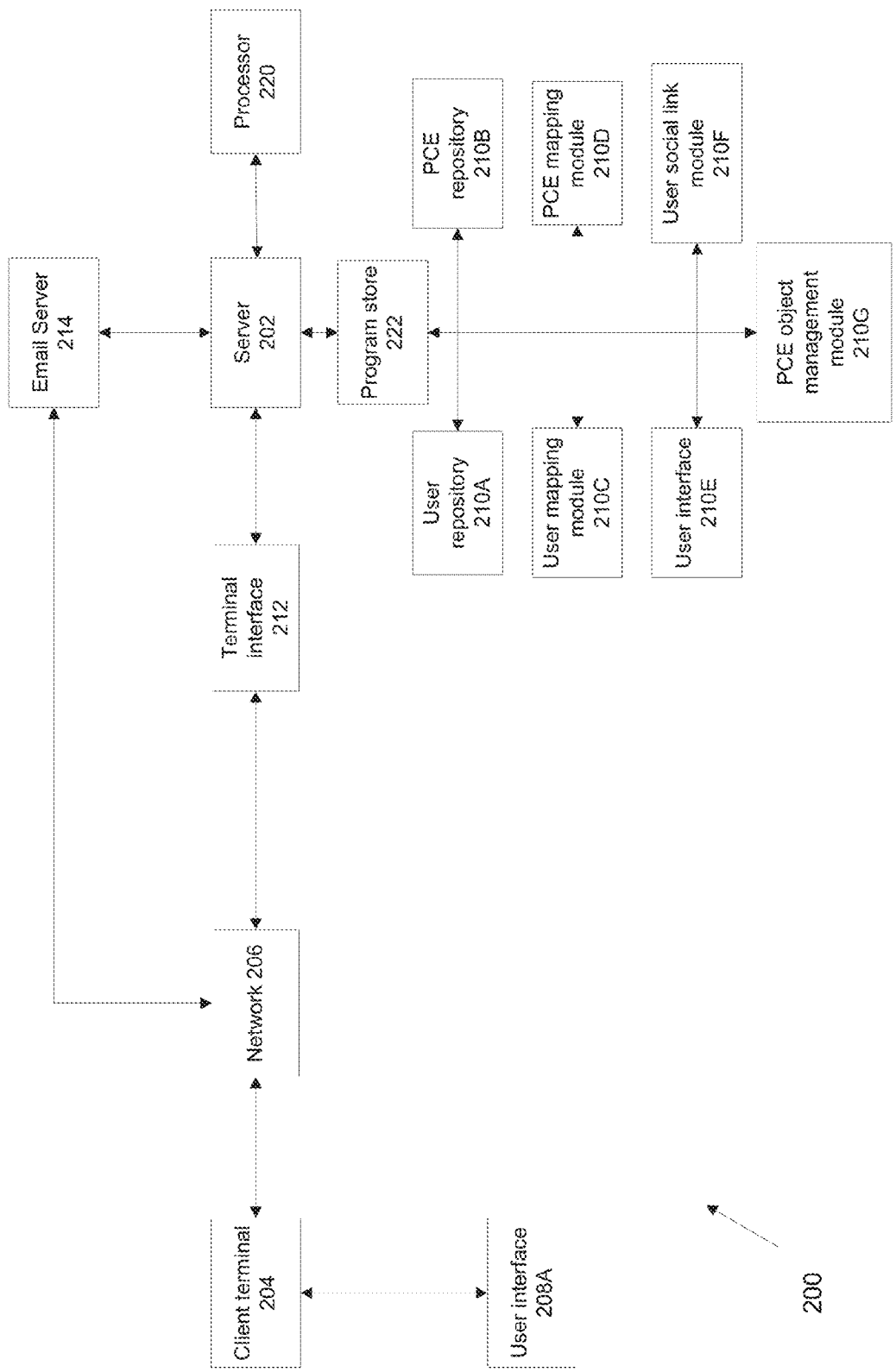
FIG. 2 is a block diagram of a system for intra-organization and extra-organization collaboration based on PCE object(s), in accordance with some embodiments of the present invention.

Reference is also made to FIG. 2, which is a block diagram of a system for intra-organization and extra-organization collaboration based on PCE object(s), in accordance with some embodiments of the present invention. The method of FIG. 1 may be executed by the system of FIG. 2, such as by the processor implementing code stored in the program store to execute one or more features.

The PCE object provides a generic collaboration medium between intra-organization peers and/or extra-organizational peers that is different than email (although email may be integrated to collaborate with non-registered users as described herein). The PCE object provides a virtual folder that other users (for example, intra-organizational and/or extra-organizational) may look at, share, and/or add to. The PCE object environment may prevent or reduce wasted time by peers looking for certain messages and/or files in different folders in an email inbox and/or on their computer. Vital information may be buried in an inbox containing hundreds or thousands of unsorted messages. Sorting such messages in an inbox may take significant amounts of time. Instead, the systems and/or methods described herein based on the PCE object allow organization of data (for example, messages and/or files) based on projects, using a shared space, so that data may be quickly found.

The PCE object environment allows each use to act as his/her own administrator. Limited central administration may be required, as each user may create new PCE objects, decide on the permission level of the PCE object, and decide which users to invite.

The PCE object environment allows for each organization to own its own data, such as external organizations collaborating with intra-organizational employees.

The system operator may not own and/or use the data for any purposes, which may increase the privacy and/or integrity of the stored data.

The systems and/or methods described herein may improve performance of a computer, for example, a server hosting the PCE objects. The computer may perform more efficiently and/or in an optimized manner, which may required fewer resources (e.g., memory and/or processing resources) and/or the computer may perform more quickly using the existing resources. The improvement in performance may be based, for example, on keeping a single copy of the message and/or files within each PCE object (the messages and/or files may be mirrored to the child PCE object), instead of copying the message and/or files to each recipient, and forwarding the message and/or files to each recipient. Moreover, the improvement in performance may be based on the organization provided by the PCE objects, as the computer may only need to process relevant data within active PCE objects, instead of all data within all PCE objects.

The performance of the computer(s) (for example, a central server) executing the methods described herein is improved, as the links between peers may be quicker to process than having peers join as members for every PCE object of every person they want to link to. The links may use fewer resources and/or have lower processing requirements.

System 200 includes a central server 202 for communicating with multiple client terminals 204 through a network 206. Optionally, server 202 communicates with client terminals 204 using a terminal interface 212 that selectively provides access to respective users of client terminals 204. Server 202 may be implemented in a computing cloud. The stored data (as described herein) may include all activity, for example, in case the data is needed for company and/or legal reasons.

System 200 includes a program store 222 storing code to perform functions, as described herein, for example, as described with reference to FIG. 1. The code may be organized as modules (as described herein). Alternatively, the description of modules is for the purpose of illustration and clarity in description, with code implementation using a different architecture. A processor 220 coupled to program store 222 implements the stored code to execute the features, as described herein. Processor 220 is coupled to terminal interface 212, to execute data communication via terminal interface 212, as described herein. Processor 220 may be implemented within server 202. Program store 222 may be locally stored on server 202, and/or in communication with server 202, for example, residing on an external server, a removable storage device, or other implementations.

Data in transit may be encrypted. Data stored may be protected by firewalls and/or access control. The cloud technology may be upgraded regularly to maintain high levels of security and/or user experience. Data from outside the United States may be stored within the European Union (EU), and/or in EU safe harbor compliant data centers. The system operator may not claim ownership of any of the data that passes through server 202.

Optionally, at 102, system 200 is configured for a particular organization. The organization may be, for example, a company, a division or department within the company, a group of related companies (which may be commonly owned), a government agency, and a non-profit organization. Each organization using the system may custom configure user interfaces, for example, by adding their company logo to the user interface, and/or selecting company colors.

Alternatively, system 200 is installed in a generic manner and configured to allow multiple organizations to use the system simultaneously, with data from each organization being separate from other organizations.

The system may be a stand-alone system independent of a company system.

Alternatively, the system may be integrated with existing company systems.

Server 202 may be installed within an internal company network, which may include a firewall to separate internal and external users. Alternatively, server 202 is installed remotely, for example, within a facility operated by an external operator, with employees of the organization remotely connecting to server 202, for example, through the internet.

Client terminals 204 may communicate with server 202 through an installed application, for example, a user interface 208A. It is noted that respective user interfaces 208A may store code in a program store on or in communication with respective client terminals 204, implementable by the respective processor of the client terminal 204. Alternatively or additionally, client terminals 204 may communicate with server 202 through a generic application, for example, a web-browser. A user interface module 210E installed on server 202 and/or in communication with server 202 may include code (implementable by the processor) to organize data processed by server 202 for presentation to client terminal 204, for example, organize data for presentation using the web-browser. Exemplary client terminals 204 include: computers located within the physical facilities of the organization, and computers located outside the organization, such as at the home of the employee, or at the physical facilities of an external contractor. Exemplary computers include: desktop computers or mobile devices, for example, a Smartphone, a Tablet computer, a laptop computer, and a wearable computer (e.g., watch or glasses).

Optionally, at 104, users are registered with server 202. Employees of the organization may be registered without requiring a special invitation. Registration may be based on the email address of the employee, by verifying that the email address has a domain name associated with the organization.

Users outside of the organization, which may have email addresses with domain names not associated with the organization, may be registered after being invited to register by an intra-organizational employee. In this manner, the relationship between respective extra-organization users and intra-organization users may be tracked, as described herein in more detail.

Users may register quickly, providing few details. For example by providing one or more of: an email address, a name, a title, and a password.

A user repository 210A within and/or in communication with server 202 stores a dataset of the registered users.

At 106, one of the respective users creates a PCE object. The command to create the PCE object may be sent by the user, using user interface 208A, through client terminal 204, for processing by the processing unit of server 202.

The PCE object may be created by code (implementable by the processor) stored as a PCE object management module (and/or system) 210G, which is stored within server 202 and/or is connected to server 202. PCE object management system 210G may include code (implementable by the processor) to perform the functions described herein with reference to the PCE object.

PCE objects may be created where multiple peers are collaborating on a project. PCE objects may be created for a common topic. Exemplary projects include: drafting a patent, development of a new product, investigation of a client complaint, negotiation of a business deal, construction of a building, and upgrade of a company website.

Figure 3:
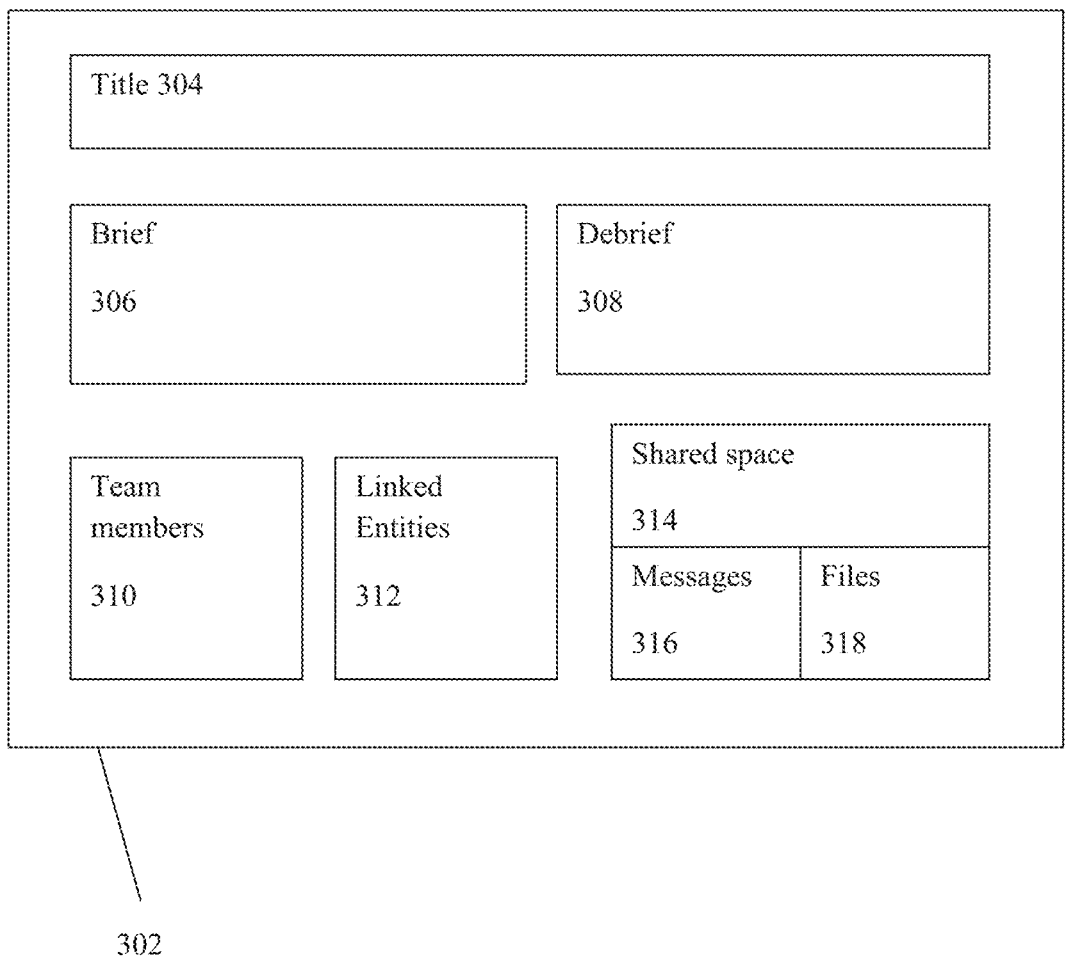
FIG. 3 is a block diagram of an exemplary PCE object, in accordance with some embodiments of the present invention.

Reference is now made to FIG. 3, which is a block diagram of an exemplary PCE object 302, in accordance with some embodiments of the present invention. Each PCE object 302 includes metadata. Exemplary metadata optionally includes a title field 304. Title 304 may represent the purpose of the PCE object, for example, based on the project the PCE members are collaborating on.

Optionally, PCE object 302 includes a brief field 306 as metadata. Brief field 306 may include a description of the purpose and/or goals of the project. Brief field 306 may include an estimated cost of the project, and/or estimated milestones for completion. The cost and/or milestones may be stored as separate fields.

Optionally, PCE object 302 includes a debrief field 308 as metadata. Debrief field 308 may include an update of the current state of the project, or the outcome of the project after completion. Debrief field 308 may include an update of the original estimated cost, costs incurred to date, and/or date of completion of each milestone.

PCE object 302 includes multiple PCE members. The PCE members may include PCE team members 310 and linked PCE entities 312, as described herein.

Linked PCE entities 312 are child PCE objects that inherit certain metadata and/or partially mirror the parent PCE object, as described herein. Optionally, the electronic addresses of the multiple PCE members are stored within PCE object 302.

PCE object 302 may include multiple related entity electronic addresses of the entities associated with the PCE object.

Optionally, PCE object 302 includes a shared space 314 for storing data to be shared between PCE members. Shared space 314 may include messages 316 and/or files 318, as described herein. Messages 316 and files 318 may be independent of one another. Alternatively or additionally, messages 316 and files 318 are linked, for example, using the user interface to click on a certain file brings up the associated message, and/or clicking on a certain message bring up the associated file(s).

Exemplary shared data includes: messages, text documents, slide shows, images, videos, sound files, computer code, and database files. Data stored within shared space 314 is provided by a PCE object member to share with other PCE members. The providing member may select which subset of the other PCE members (one, some, or all) to share the data with. Each message and/or file may be shared individually with another PCE member, with all PCE members, or in a group with selected PCE members. Archived items may be automatically designated for sharing with all PCE members and/or all PCE linked entities.

Referring now back to FIG. 1 and FIG. 2, optionally, PCE repository 210B stored on server 202 and/or in communication with server 202 stores the created PCE object(s). Optionally, a user mapping module 210C includes code that maps between users of user repository 210A and PCE objects of PCE repository 210B, to define which users are members of which PCE object(s). Data associated with each PCE object (i.e., within the shared space) may be stored as part of the PCE object, for example, within PCE repository 210B. Optionally, a PCE mapping module 210D includes code (implementable by the processor) that maps between parent PCE objects and one or more child PCE objects within PCE repository 210B, as described herein, for example, with reference to FIGS. 4A and 4B.

The user creating the PCE object may be assigned a lead permission level to perform functions that other members of the PCE object are not authorized to perform. The creating user may be referred to herein as a PCE leader. For example, the leader may change the title, the briefing, and/or the debriefing. The PCE leader may transfer leadership to other PCE members, and/or assign one or more other PCE members leadership authorization. The PCE leader may prevent other PCE team members from adding other peers to the PCE object. The PCE leader may define a set of rules for who may be added to the PCE object, as PCE shared members and/or as PCE linked entities.

At 108, users are assigned as PCE team members for each PCE object, for example, by the processor implementing code stored as PCE object management module 210G. Different PCE objects may have different team members. PCE members of the PCE object connect to the same PCE object.

Users may be invited to become team members by the PCE leader and/or by other team members. An invitation may be sent through a user interface accessing the PCE object. The invitation may be sent to an inbox of the invited user using an email address, the invitation may be sent to another PCE object that the invited user is a member of, and/or to a common space of the user (as described herein). Alternatively, users may be added to the PCE object (as shared members, as team leaders and/or as linked entities) without approval and/or without being invited first, for example, by a central administrator, the PCE leader, or a PCE member.

Alternatively, users are assigned as team members without being sent an invitation and having to respond, for example, by the PCE leader.

Peers invited to become PCE team members that are not registered users may first register as a user (for example, as described with reference to block 104), and then be assigned as a PCE team member.

PCE team members may be selected based on an organization framework, for example, the core team members working on the project. The PCE team members may be entirely composed of intra-organizational peers. Alternatively, one or more members may be extra-organizational, for example, when such members are a core part of the team. Intra-organizational and extra-organizational PCE object members may be tagged differently, for example, by using metadata. When viewing the PCE object members using a user interface, the intra-organization and extra-organization members may have different displays, for example, the company name of the extra-organizational members displayed may be different.

PCE team members are aware of one another. Optionally, terminal interface 212 provides the list of all PCE team members to each respective PCE object member accessing the PCE object using client terminal 204. The list of PCE team members may be displayed on client terminal 204 using user interface 208A.

Optionally, at 110, users are assigned as linked PCE members for each PCE object, for example, by the processor implementing code stored as PCE object management module 210G. Different PCE objects may have different linked entities.

Figure 4A:
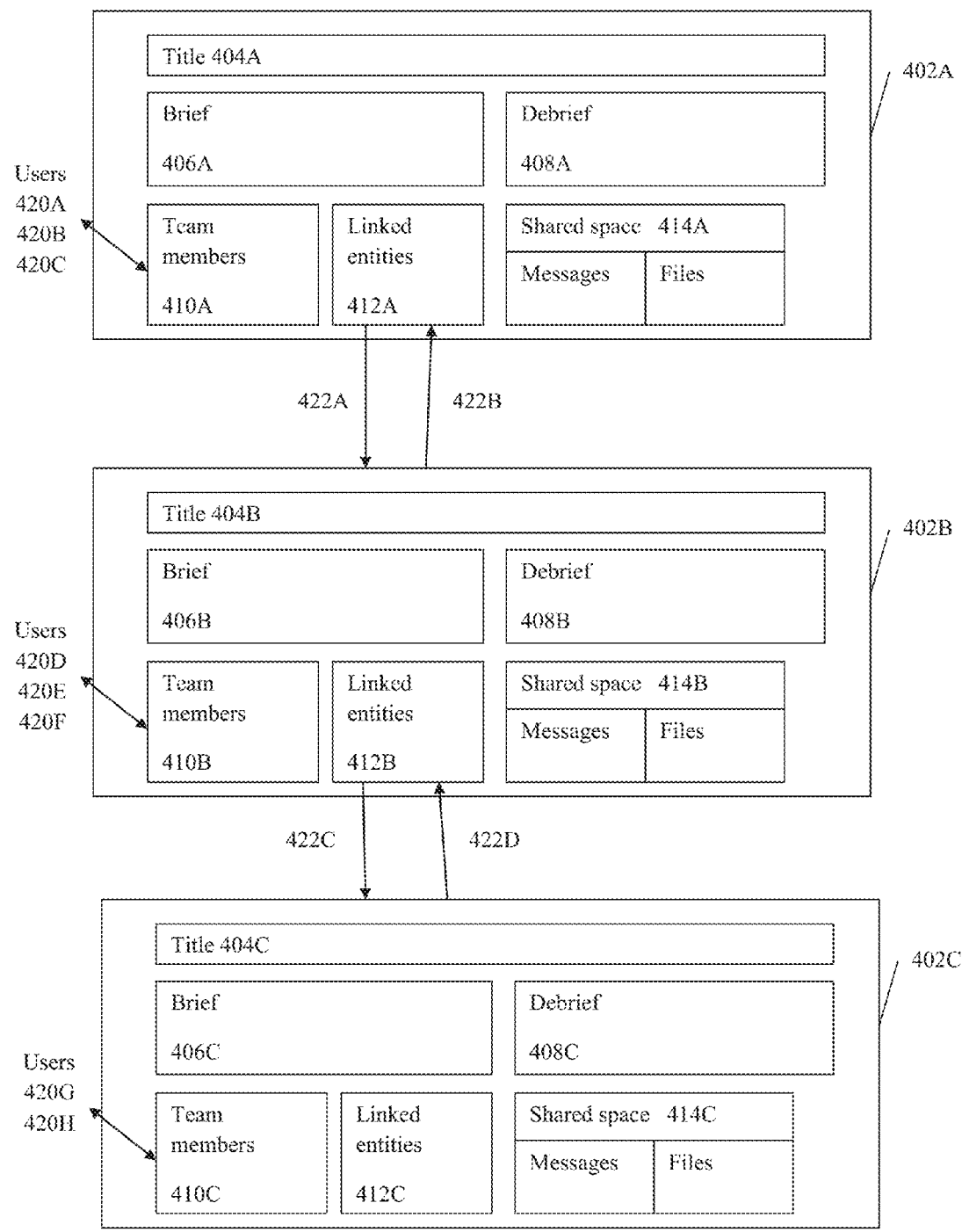
FIGS. 4A and 4B are schematic diagrams depicting links between PCE objects, in accordance with some embodiments of the present invention.

Reference is now made to FIG. 4A, which is a schematic diagram depicting linked entity(s) of a certain PCE object 402A, in accordance with some embodiments of the present invention. PCE object 402A contains a title field 404A, a brief 406A, a debrief 408A, and shared space 414A as described herein. PCE object 402A contains a team members field 410A that depicts users that are assigned as team members of PCE object 402A, as described herein. Exemplary team members are depicted as user 420A, user 420B, and user 420C.

The PCE leader and/or any of the team members may invite another peer as a linked entity 412A. Each linked entity is aware of all team members 410A, for example, viewing a list of the team members though the user interface of the client terminal. Each linked entity is not granted permission to view any of the other linked entities. For example, terminal interface 212 provides a list of all PCE team members and to block a list of other linked PCE members, to each respective linked PCE object member accessing the respective PCE object using the client terminal.

The linked entities may include team members that contribute towards a project. The linked entities may work on a selected part of the project. The linked entities may be extra-organizational peers, or intra-organizational peers from another department. Exemplary linked entities include: suppliers, contractors, lawyers, finance, technical writers, and part-time employees.

In this manner, the team members may collaborate with different peers as needed, while maintaining privacy in that the linked peers are unaware of other linked peers involved in the same project. For example, multiple suppliers of similar products may be invited to collaborate within the same PCE object, with each supplier being unaware that of the presence of the other suppliers, which may be competitors.

When a user is assigned as a linked PCE object member for a particular PCE object, a child PCE object 402B is created. The child PCE object may be automatically created, for example, by the processor implementing code stored as PCE repository module 210B. The invited user may be assigned as a PCE leader for child PCE object 402B, for example, by the processor implementing code stored as user mapping module 210C. The invited user may assign title 404B, brief 406B and/or debrief 408B as he or she desires. The assigned title, brief and/or debrief of child PCE object 402B may be different than the title, brief and/or debrief of parent PCE object 402A.

Child PCE 402B is linked back to parent PCE 402A. Optionally, the processor implements code stored as a PCE mapping module 210D stored on server 202 or in communication with server 202, to automatically create and/or store the links between PCE objects.

When linked, a user interface (for example, user interface 208A of client terminal 204) displays the linked PCE member(s) of the PCE object being accessed as the linked (or child) PCE object. For example, when PCE object 402A is accessed, PCE object 402B appears as a linked entity 412A. When PCE object 402B is accessed, PCE object 402A appears as a linked entity 412B.

The PCE team leader of PCE object 402B may now invite other peers to join as team members. For example, users 420D, 420E and 420F may be different users than users 420A-C, may be the same users, or may overlap with certain users. The PCE team leader of PCE object 402B may control and/or collaborate using PCE object 402B independently of PCE object 402A. In this manner, extra-organizational peers may collaborate further with other peers, which indirectly contribute to the project of PCE object 402A.

PCE team leader of PCE object 402B may invite another peer, which may be entirely unknown to the organization, to join as a linked entity of PCE object 402B.

PCE object 402C is created and linked to PCE 402B as described above. PCE 402B appears as a link in linked entity 412C of PCE 402C. Both PCE 402A and 402C appear as linked entities 412B in PCE 402B. Title 404C, brief 406C, and/or debrief 408C may be independently selected for PCE object 402C. Users 420G and 420H being team members 410C may be unaware of users 420A-F of PCE 402A and 402B.

Users 420A-C of PCE 420A are not able to directly communicate or collaborate with users 420G-H of PCE 402C. Users 420G-H of PCE 420C are not able to directly communicate or collaborate with users 420A-C of PCE 402A.

Effectively, PCE 402C is independent of PCE 402A. The members of PCE 402C may indirectly contribute to the project of PCE 402A, for example, by being subcontractors to members of PCE 402B, which may be a contractor to PCE 402A.

The subcontractor may perform work for the project, without the subcontractor being aware of the organization, or the organization being aware of the subcontractor. In order for one or more of users 420A-C of PCE 402A to communicate with users 420G-H of PCE 402C, the users of PCE 402A may link to PCE 402C. When PCE 402C becomes a linked entity 412A of PCE 402A, members of PCE 402C may collaborate with members of PCE 402A directly, as described herein.

It is noted that PCE 402C may link back to PCE 402A. It is also noted that each PCE object may link to multiple other PCE objects. In this manner, a graph between PCE objects may be created, which may be complex. Connections between PCE objects may be circular.

Automatically created instances of child PCE objects may be stored in PCE repository 210B. The links between additionally created PCE objects may be stored in PCE mapping module 210D.

Optionally, PCE links between PCE objects are unidirectional, for example, PCE link 422A is from PCE 402A to PCE 402B, PCE link 422B is from PCE 402B to PCE 402A, PCE link 422C is from PCE 402B to PCE 402C, and PCE link 422D is from PCE 402C to PCE 402B. Alternatively, PCE links are bidirectional. The unidirectional PCE link may allow for different functions and/or tag when one PCE object links to another PCE object, depending on the direction of the link. The bidirectional links may provide for the same functions and/or tags between the linked PCE objects.

Data may be stored in association with the PCE link. The data stored on the link may be data that is related to the association between the two PCE objects. For example, a contract between the organization (for example, PCE 402A) and the contractor (for example, PCE 402B). The contracts may be associated with expiration dates. PCE members may post data to the link related to the linked partner, for example, notes about the relationship, and/or performance of the partner. Other intra-organization users may read these notes, which may help those users select the right partner and/or negotiate other deals with the same partner. Each link may be tagged with a link category. The link category may describe the type of linked entity, and/or the relationship between the linked entity and the organization, for example, supplier, recruiter, lawyer, and contractor. Each unidirectional link may have different tags, for example, supplier on link 422A and client on link 422B. The tags may enable searching and/or sorting. Data stored on the link may be stored within PCE mapping module 210D, or within a data repository mapped to PCE mapping module 210D.

The link tags (or PCE object tags as described herein) may be selected from pre-defined tags, for example, departments, purchasing categories, divisions, regions, and revenue categories. Customized tags may be added, locally by PCE members and/or globally by a central administrator.

In one example, PCE 402A is created by a certain company for collaboration on a new patent. Team members 410A include the inventor, R&D leader, and in-house counsel. An external patent attorney firm has been invited as linked entity 412A to join. The team leader of the external firm is added to newly created PCE 402B for collaboration on the patent. The team leader invites a patent attorney of the external firm and a paralegal as team members 410B. The team leader invites an external patent search firm as linked entity 412B. The team leader of the external search firm is added to the created PCE 402C (which may be a child of PCE 402B and/or grandchild of PCE 402A), and invites a patent searcher of the search firm as a team member 410C. In this manner, team members 410A may collaborate with the external patent firm around the patent, without necessarily being aware of the patent search firm's involvement. Another external patent firm may be invited by team members 410A, to work on another patent of the patent portfolio, and linked as linked entity 412A (after creating another PCE object linked with PCE 402A). In this manner, the two patent firms may be unaware of each other's presence, yet both are linked to PCE 402A.

Figure 4B:
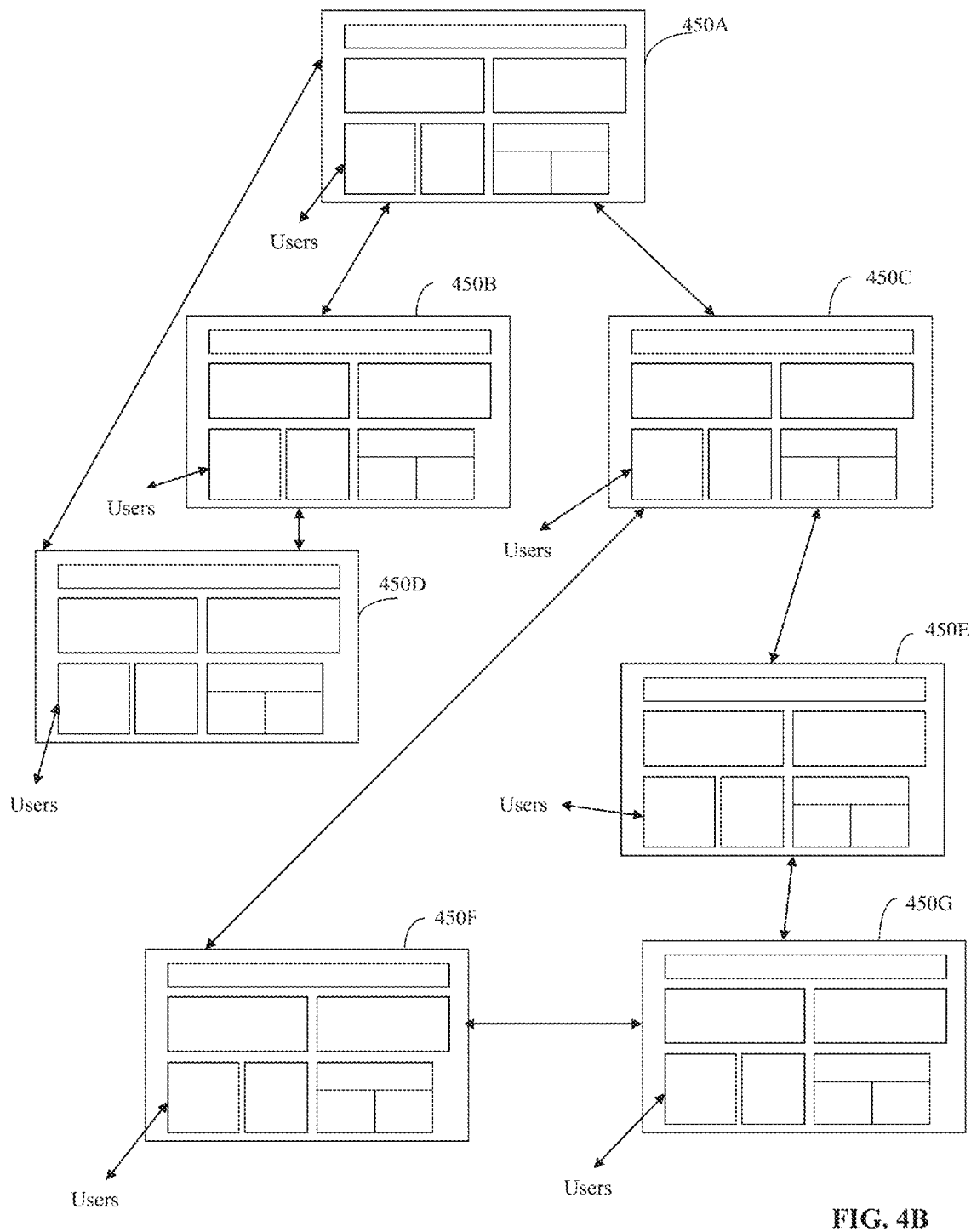

Reference is now made to FIG. 4B, which is a schematic diagram depicting an example of complex linking relationships between different PCE objects, in accordance with some embodiments of the present invention. As discussed herein, each PCE object may be linked to one or more other PCE objects, each of with may be linked to one or more other PCE objects, which may be linked back to other PCE objects. In this manner, complex PCE object link graphs may be formed.

Links will be described as bidirectional, but may be unidirectional in either direction as described herein.

PCE object 450A (parent) is linked to both PCE objects 450B and 450C (children). PCE object 450B (parent) is linked to PCE object 450D (child). PCE object 450D is linked back to PCE object 450A. PCE object 450C (parent) is linked to PCE object 450E (child). PCE object 450E (parent) is linked to PCE object 450G (child). PCE object 450G (parent) is linked to PCE object 450F (child). PCE object 450F is linked back to PCE object 450C. Links may be formed (for example, upon request of team members of either PCE object) between PCE objects that do not have a parent-child relationship, for example, between PCE objects 450F and 450C, and between objects 450D and 450A.

Details such as the structure of PCE objects and/or correspondence amongst members is as described herein. In a brief summary, each object 450A-G has a group of team members, which are independent of any other object. The team members of each PCE object may correspond amongst themselves, and/or with the team members of directly linked PCE objects via the respective PCE link. Members of PCE objects that are not directly linked to each other may not correspond with one another, for example, shared members of PCE object 450G are unable to correspond with shared members of PCE object 450C, although PCE objects 450G and 450C are both linked to PCE object 450E. In order to correspond, a link may be created between PCE objects 450G and 450C. Team members of each PCE object may invite others to join as members of the respective PCE object, as team members and/or as linked entities, by creating an additional child PCE object. Each additional created child PCE object inherits certain allowed metadata from the parent and/or data from the shared space, and is automatically linked back to the parent.

Any PCE object may be linked to any other PCE object, whether the PCE object exists or not. When the PCE object is pre-existing (for example, created by another user, created as a child of a different PCE object), the pre-existing PCE object is linked to the respective PCE object. When the PCE object does not yet exist, the PCE object may be created and a new link formed between the new PCE objet and the respective PCE object, for example, based on the child relationship as described herein.

Referring now back to FIG. 1, at 112, data is shared between users of the PCE object, for example, by the processor implementing code stored as PCE object management module 210G. The shared space has been previously discussed with reference to FIG. 3. Additional details are now described. A PCE object member (team and/or linked entity) may provide data to the shared space, for example, by uploading a file from the client terminal (using the user interface), and/or by typing a message into a box appearing within the user interface.

The providing PCE object member may set the permission level associated with the data, to define which particular members or groups of members may have access to the data, for example, all team members, all linked entities, all linked and team members, or certain members listed by name. The permitted members may access the data, for example, to read the data and/or download the data.

The users having permission levels to access the data may be informed of the availability of the new data, for example, by the user interface as described herein in additional detail.

Users that have been joined as members of the PCE object (as linked entities and/or team members) are automatically provided with access to data within the shared data. Such newly joined member may have access to data with suitable permission level. For example, a new member assigned as leader may have access to all data, a new member assigned as a team member may have access to data having permission for access by all team members and/or linked entities, and a new member assigned as a linked entity may have access to data having a permission level for access by all linked entities. In this manner, messages and/or other files do not need to be selected, copied and/or forward (for example, by email) to the new member, as the data with suitable permission for the new member is already available in the shared space. The new member may access the full history of messages, and/or the stored files.

Optionally, data is categorized or labeled as group data or individual data (for example, messages and/or files). Individual data may be defined as data provided only to a certain user. Group data may be defined as data provided to multiple or all users.

When the certain user leaves or closes the PCE object, the only the individual messages destined for the certain user may be kept for future access.

When an existing member leaves or is removed from the PCE object, the removed member may have access to data in the shared space until the time and/or date when the member has left. The removed member does not have access to any new data regardless of the permission level. In this manner, the member that left still retains a record of his/her activity within the PCE object, and does not need to select and/or copy important data before leaving, yet is denied access to new data.

Data may be shared with peers that are not members of the PCE object. When data is provided (for example, uploaded or typed into an interface box), the providing member may select a permission to allow a peer that is not a member of the PCE object to access the data. The member may provide an email address of the peer (which may be intra-organizational and/or extra-organizational). The peer may receive an email (with the providing member and/or PCE object as sender) that includes the typed message (in the body of the email) and/or files attached to the email.

The email may be sent (and the response email received) by server 202 through an email server (or client) 214 connected to network 206. The peer that received the email may respond to the email, by typing a message and/or attaching files. Data is extracted from the email sent back, and stored in the shared space of the PCE object. The data extracted from the email may be assigned the same permission as the original email sent to the peer. The email sent to the peer and/or sent from the peer may contain metadata to provide for integration with the PCE object. The metadata may allow the response email from the peer to integrate with the PCE object, by guiding the extraction of the data from the email.

The non-registered peer may be stored within user repository 210A, and optionally linked with the PCE object though the processor implementing code stored as user mapping module 210C. User mapping module 210C may contain code to automatically generate the email based on the mapping data, and forward the email to an email server for transmission to the non-registered peer. User mapping module 210C may also include code to serve as a destination address for email from the non-registered peer, and decode the metadata within the email to assign the provided data to the correct PCE object. In this manner, members of the PCE object may collaborate using the PCE object with non-registered peers.

Reference is now made back to FIGS. 4A-B, to describe shared space between linked PCE objects. The shared space may be managed, for example, the processor implementing code stored as PCE object management module 210G.

Data in shared space 414A of PCE 402A may be selectively shared with certain linked entities 412A, which may include PCE 402B. Child PCE object 402B may inherit data from parent PCE object 402A, optionally automatically upon creation of PCE object 402B. The data inherited may be metadata and/or data (messages and/or files) within shared space 414A that has permission levels allowing access to linked entity PCE object 402B. The inherited and/or shared data may be copied to shared space 414B when PCE 402B is a linked entity of PCE 402A, for example, by the processor implementing code stored as PCE mapping module 210D. The data is recopied after being changed to maintain the same copy at both locations. Alternatively, the data is not copied, but a link is provided from shared space 414B to shared space 414A. Data in shared space 414B may be independent of data in shared space 414A, except for data selected to be shared with PCE 402B by the providing user of PCE 402A.

When data is shared by PCE 402A with PCE 402B, all team members of PCE 402B (i.e., users 420D-F) have access to the data through shared space 414B. Data in shared space 414B may also contain additional data provided by members of PCE 402B. The additional data may be selectively shared with PCE 402A. In this manner, PCE 402A and 402B may store different data in their respective shared spaces 414A-B, with shared data appearing in both shared spaces 414A-B.

PCE object members of PCE 402B may provide shared data to shared space 414B with a permission level that only allows members (all or certain members) of PCE 402B access to the data, and does not allow members of other linked PCEs (for example, PCE 402A and/or 402C) access to the data.

Sharing data within the common PCE object allows members to communicate and/or collaborate with one another. Such data sharing may replace email communication between members. The data sharing improves computer performance and/or requires less resources, as a single copy of the data within the PCE object is accessible to the relevant members, instead of, for example, forwarding multiple copies of email to each member, where each email may contain a separate copy of a file. When the files are large and the distribution list is long, the storage and/or processing requirements may be significant, which may affect performance of the computer. Instead, the systems and/or methods described herein use a single copy of the data accessible by the members, which requires fewer resources and has much less risk of overloading the processor. Several copies of the data may exist, such as a copy at each linked PCE object, as described above. The several copies are far fewer in number than the multiple copies that would be required when emailing a copy to every member.

The shared space may have different optional features. For example:

- Large storage capacity that may automatically increase when the current capacity is close to being filled, for example, based on a cloud architecture, which may effectively provide unlimited capacity.
- Ability to store any type of file as described herein.
- Data from the shared space may be downloaded to other computers, which may allow for offline work. The data worked on may then be uploaded back to the shared space.
- Data may be organized within folders (which may be defined by the leader and/or uploading user).
- A synchronization mechanism to allow only one user to modify the file at a time, to help prevent multiple copies having different amendments. Alternatively, users may work together in real time, on a common document that is updated with the changes each makes, while maintaining a single updated version.
- Code stored as an automatic conversion module to convert uploaded files to a common file format, for example, all images are automatically converted to PDF format.
- The shared data space may be accessible from any terminal device at any location, for example, using a Smartphone, laptop, desktop, tablet, or other computer.
- Code stored as a synchronization mechanism module for download to the terminal client of the user, to synchronize files copied from the shared space to the terminal client.
- User interface 210E may allow for a user to open files in the shared space for viewing and/or editing, and/or to create new files, for example, through a web-browser interface accessed by client terminal 204.
- Code stored as an encryption module may automatically encrypt and decrypt data stored on the shared space.
- Code stored as a search module may allow searching within the shared space for certain data, for example, using optical character recognition and/or image processing.
- Code stored as an activity tracker module may track which PCE members edited the files, when they edited them, and what changes were made.
- Older versions of files may be stored, for example, to allow easy back-tracking when unwanted changes have been made.
- External and/or third party application may be integrated to provide additional functions, for example, to allow for digital signatures.
- Data may be designed in an archived state, as described herein.
- Data in the shared space may be permanently maintained in its original posted and/or uploaded state, to create an accurate correspondence history without changes, deletions, or tampering.

Optionally, at 114, social links are generated between registered users, for example, by the processor implementing code stored as PCE object management module 210G. The social links may be formed by a particular registered user sending an invitation (for example, through email, or through a PCE object) to another registered user to link. Alternatively, the links may be automatically and/or manually generated, for example, by a central administrator, based on the organizational structure of the organization. For example, the CEO is linked to all vice presidents, each vice president is linked to middle managers, and each middle manager is linked to his/her staff. The link may be unidirectional, or bidirectional. Links may be stored, for example, in a user social link module 210F that maps social links between registered users of user repository 210A. Users may be nodes and links may be edges, providing for formation of complex graphs.

Figure 5:
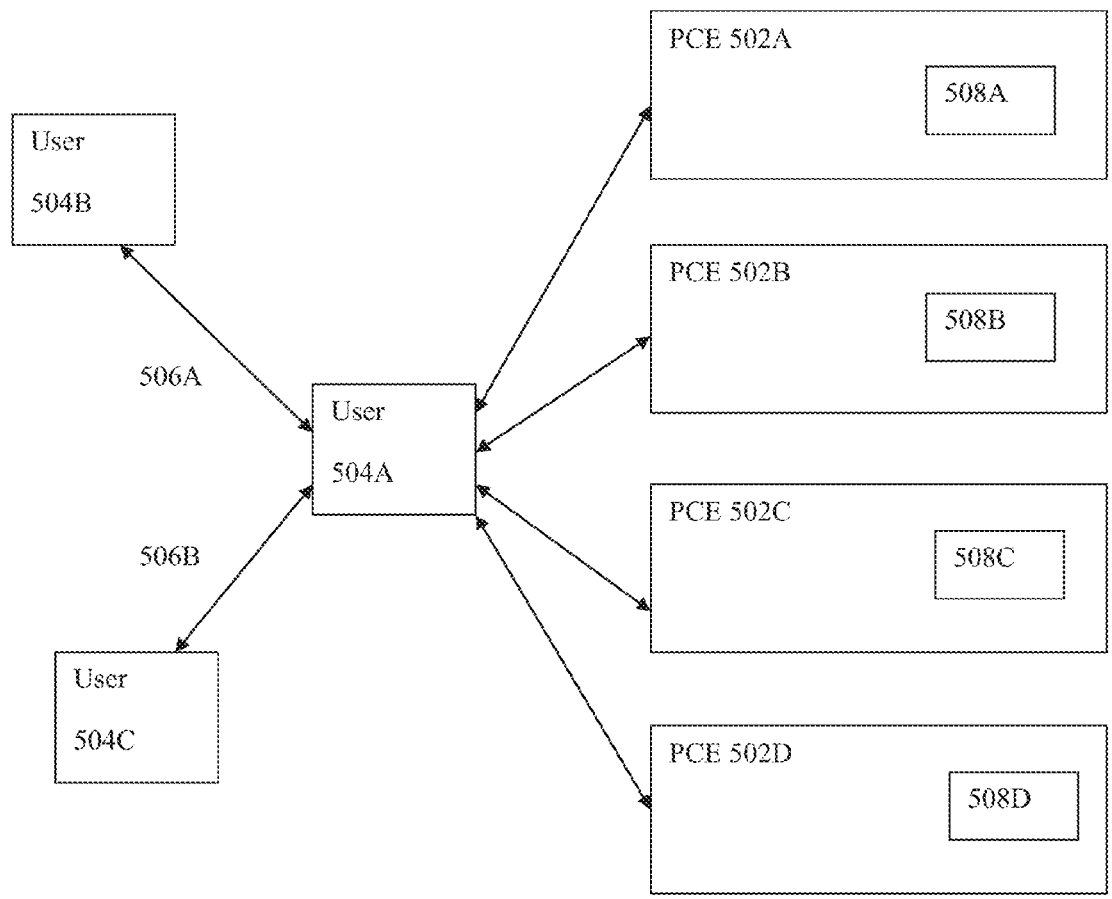
FIG. 5 is a block diagram depicting social links between users, in accordance with some embodiments of the present invention.

Reference is now made to FIG. 5, which is a block diagram depicting an example of social links between users, in accordance with some embodiments of the present invention. User 504A is linked to user 504B through a social link 506A. User 504A is also linked to user 504 through a social link 506B. The user link arrangement is simplified and made for example purposes only, and is not necessarily limiting, as different links may be made between different registered users.

User 504A is a PCE object member of PCE objects 502A, 502B, 50C, and 502D, as described herein. Each PCE object 502A-502D may have exemplary fields as described with reference to FIG. 3.

User 504B and/or user 504C may access certain fields of each PCE object 502A-502D, for example, the title, the brief, the debrief, archived data, and/or other information fields which may be defined for such viewing (for example, by a central administrator). The title, the brief, the debrief and/or the tags are part of a briefing which is shared, as described herein. The membership status of user 504A in each PCE object may be provided, for example, team leader, team member, and/or linked entity. Terminal interface 212 may display the certain fields for each PCE object 502A-D on respective client terminals 204 being used by users 504B and/or 504C. The fields and/or PCE objects may be selected and/or organized for display on the client terminals 204 by user interface 210E.

Optionally, the access to certain fields is centrally administered. For example, only users that are company employees may access the PCE object fields, and/or may access certain PCE object fields such as the brief and/or debrief. In another example, only users that are company employees may receive updated briefings, as described herein. The permission to receive the briefings updates (i.e., brief, debrief and/or other updates) may be based, for example, on the email address of the user. Users with email addresses having company domains may access the brief, debrief and/or updates information. External users with email addresses having domains outside the organization may be blocked from access to the brief, debrief, and/or updated information. In this manner, extra-organizational users may be blocked from looking at activity within the company that they are not directly involved with.

Optionally, each PCE object includes a respective social permission level 508A-D that defines which particular PCE objects are accessible (for example, for viewing) to which linked peer. Alternatively or additionally, social permission levels 508A-D define which information fields of the particular PCE object are accessible to which linked peer. The social permission level may be defined, for example, by the PCE leader of each PCE object, by the user associated with the PCE objects, and/or by the central administrator. The social permission level may be stored as part of the information stored with each PCE object, for example, within PCE repository 210B.

Optionally, each social link 506A-B has an associated social permission threshold. The social permission threshold defines which PCE objects having certain social permission levels are accessible to the peer at the other end of the link. Social permission threshold may be assigned in a unidirectional manner, so that different social permissions are available, for example, for user 504B accessing user 504A than for user 504A accessing user 504B. Alternatively, the social permission threshold is bidirectionally assigned, so that the linked peers have the same threshold relative to each other. The social permission threshold for each link may be stored in association with the links, for example, in user social link module 210F.

An exemplary social permission level set includes: confidential, unrestricted, standard, and general. An exemplary related social permission threshold is defined as:
confidential level 1: receive all briefings;
confidential level 2: receive all briefings except confidential;
confidential level 3: receive all general and standard briefings; and
confidential level 4: receive general briefings only.

There may be other number of confidential levels (less or more than 4). The confidential levels may be assigned names that correspond to confidential levels 1-4.

The categories may be further defined, for example, linked peers having a standard permission cannot see the estimated charge for the PCE object, and peers having general privacy cannot see the estimated charge and the history of prior briefings.

Optionally, each user defines the social permission threshold for a peer he/she wants to link with. Alternatively or additionally, social permission threshold are assigned automatically or manually, for example, by a central administrator, based on organizational hierarchy within the company. For example, high level managers may see everything, middle managers may see less, and peers who are in different departments and/or not working together may have limited access.

For example, PCE 502A has a social permission level 508A of 3, PCE 502B has a social permission level 508B of 2, PCE 502C has a social permission level 508C of 4, and PCE 502D has a social permission level 508A of 1. Link 506A has a social permission threshold of >=3, and link 506B has a social permission of >=1. Based on the example, user 504B accessing a user profile of user 504A may access PCE 502A and 502C. User 504C may access all PCE 502B-D.

Optionally, the PCE objects are shared only between peers within the organization, for example, registered users having email addresses of the organization, and/or registered uses flagged as belonging to the organization.

Optionally, PCE objects are not accessible to externally linked peers.

Optionally, only intra-organizational peers may be linked to each other. Extra-organizational peers may not be able to be linked to intra-organizational peers.

Alternatively, extra-organizational peers may be linked, but are assigned limited access. Alternatively, extra-organizational peers may only be linked to intra-organizational peers that are members of the same PCE object as the extra-organizational peers. In this manner, the linking of the extra-organizational peers may be limited to those employees of the organization that they are working with.

Alternatively, when using single directional links, intra-organizational users may link to extra-organizational users, without the extra-organizational users being able to link back to the intra-organizational users.

Each user may select to share the PCE objects in which they are the PCE leader, PCE objects in which they are team members, all PCE objects, or only certain PCE objects.

Optionally, updates are automatically detected and sent to each user (and/or the user is informed of the availability of the new update) when information field(s) are updated in PCE objects associated with the linked peer. Updates may be sent when the linked peer is a leader of the PCE object. Updates may be sent when the linked peer is a member of the PCE object, or alternatively, when the linked peer is a member (but not a leader). Alternatively, updates may be available to be read, but may not be automatically sent. Updates may include the status change of files and/or documents to archived.

The updates may serve as a monetization model. Users may first receive only titles of briefings or PCE objects, without being able to access all the other information (i.e., briefing, debriefing, tags, list of shared members and/or linked entities). The users browse the available titles to select PCE objects of interest. The users may pay a fee to subscribe to receive full access to the other information from the PCE object.

For example, when a debrief of a certain PCE object (for example, PCE 502B) is updated, the updated information (or all information for the PCE object) is automatically provided and/or made available to the linked peers of the user associated with the updated PCE object. The update may be sent to those linked peers having suitable permission thresholds to receive the update. In this manner, linked peers may be kept up to date with what is going on in different parts of the company, and/or supervisors and/or other administrators (for example, finance) may be kept in the loop.

The updating may be automatically performed, for example, by PCE repository 210B when an information field is updated and/or by the processor implementing code stored as PCE object management module 210G. The update may be sent to the client terminal of the linked user, as a message to an email inbox of the linked user, and/or to user interface 210E for centralized viewing by the linked user. The received briefings may be sorted by update date, with the most recent briefings appearing higher on the list.

The systems and/or methods described herein provide a platform to publish work of employees. Employees may receive credit for their work, which may motivate in their work. For example, an employee having finished work on a work related document may publish his/her work by changing the status of the finished work to archived. Sharing briefings and/or debriefings (and/or other information fields) of PCE objects allows employees to publish their work to their linked peers.

The users sharing the briefings (e.g., briefings and/or debriefings) may enjoy social benefits from publishing their progress, for example, rewards, recognition, and/or promotion. Shy and/or modest workers who normally would go unrecognized and/or be undervalued may receive the recognition they deserve when others are able to see how they work and/or what they are working on. Similarly, extra-organizational partners that perform well may be recognized by others in the company, which may help other employees pick the high performing partners for future projects. The shared briefings may be associated with recommendations and/or rankings of the partner by the company employees, as described herein in more detail.

Optionally, at 116, the level of the system is upgraded. Upgrades may be selectively performed for individual users within a company, so that some users remain at the current level and some are upgraded. An upgraded version may be downgraded again.

The basic level may provide users with time limited access to data within PCE objects they are associated with. For example, the users may only access messages and/or files with time stamps of 12 months or less, or other predefined time periods, such as 6 months or 24 months. The organization may define how long the data is held for, for example, for each user and/or group of users. The upgraded level may provide users with unlimited access to the data regardless of the age of the data.

Users working on projects with short time frames may not need to be upgraded when projects are completed in less than 12 months. Users in finance, quality control, or other administrative functions may need access to all data, for example, to perform auditing.

Optionally, a mechanism is provided to help sort through ongoing messages.

For example, by the users in finance, quality control, or other administrative functions that review the ongoing messages. A new folder may be created to store all new unhandled messages. Once the messages have been handled (for example, by the auditors) the messages moved to the respective PCE object for access by the PCE shared members and/or linked entities as described herein.

Figure 6:
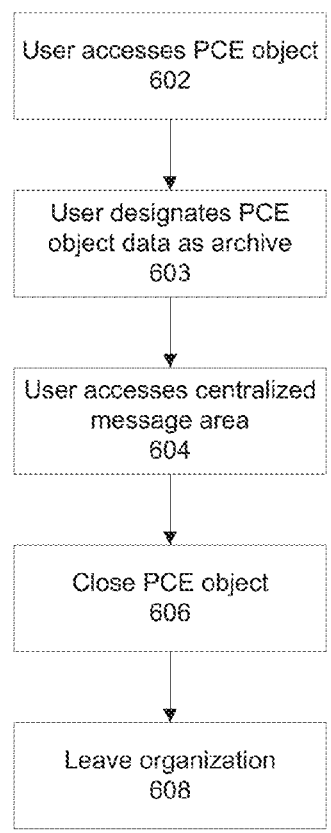
FIG. 6 is a flowchart of additional optional exemplary features based on PCE objects of the method of FIG. 1 and/or the system of FIG. 2, in accordance with some embodiments of the present invention.

Reference is now made to FIG. 6, which is a flowchart of additional optional exemplary features for actions based on PCE objects of the method of FIG. 1 and/or the system of FIG. 2, in accordance with some embodiments of the present invention. The features may be implemented by the processor executing code stored in the program store.

Optionally, at 602, a registered user accesses a particular PCE object from a list of PCE objects in which the registered user is a PCE object member of. The list of PCE objects may be presented by user interface 210E and/or user interface 208A, based on user mapping module 210C.

The registered user may see a list of the briefcases he/she is a member of. For each briefcase, an overview of the participants and/or activity may be displayed.

For each PCE object, the user is presented with data within the shared space (for example, messages and/or files) that has a permission level allowing the user to access the data. For example, individual messages not sent to the user are not displayed. Group messages including the user as a recipient are displayed to the user.

In this manner, each PCE object member is presented with a customized view of data within the shared space. The shared PCE object environment, which may be based on a single copy of the data, provides customized views to each member. The result is something that may feel as private, easy and/or flexible as email while delivering powerful group collaboration.

Optionally, at 603, data stored in association with the PCE object is designated as archived. The data may correspondence data. The data may be messages, files, and/or documents. The designation may be performed manually by the user, via the user interface, for example, by selecting the respective data item and selecting a menu option to archive the data item. The archived data may be stored in the shared space field of the PCE object. The archived data may be included in the metadata associated with the PCE object, which may be inherited by child PCE objects and/or used for social networking (as described herein).

Archived data items may be accessible to all (or designated sub-group) of the PCE members, including team members and linked entities, for example, being assigned a global permission level high enough to allow viewing by the team members and linked entities. It is noted that archived items may be viewed by linked entities that would otherwise not have access to other correspondences, messages, files, and/or documents associated with the PCE object.

Archiving the data items acts as a form of virtual publication, allowing team member and linked entities of the PCE object access to the archived data items. Archived data items may represent significant milestones related to the PCE object, for example, a final draft version of a work document. Each subsequent finalized updated version may be archived.

Archived data items may be automatically copied from the parent PCE object to created child PCE object(s).

Alternatively, the archived data item is designated as un-archived, which restores the previous permission status of the data item. Alternatively (e.g., as defined by a policy), once archived, data items may not be un-archived.

Permissions allowing users to archive and/or un-archive the data items may be set, for example, by a global policy (e.g., by the system administrator, and/or as pre-configured system settings, and/or by a local policy defined by the PCE leader. Optionally, the leader is allowed to designate data items as archived and/or un-archived. Alternatively or additionally, the PCE team members are allowed to designate data items as archived and/or un-archived. Alternatively or additionally, the PCE linked entities and/or linked members are allowed to designate data items (which are visible to them) as archived and/or un-archived.

Optionally, at 604, the registered user accesses a centralized data space, in which messages and/or files from all (or a selected subset of) PCE objects in which the registered user is a member of, are gathered together, for example, in a single list and/or single folder. The centralized data space provides the user with the option of reading messages, answering messages, and/or accessing data files (for example, to view and/or edit) without having to access each PCE object separately. Each data item is still associated with its respective PCE object, so that messages replied to, and/or files edited through the centralized data space are related back to their respective PCE object.

Messages, files and/or other data may be searched and/or filtered from the centralized data space. Messages and/or files may be moved between PCE objects (personal messages and/or files, but not group messages and/or files, as doing so would remove the access from other recipient members), forwarded to other PCE objects (or to an email address), printed, archived, and/or deleted.

Alternatively, messages, files, documents, and/or other data are retained (e.g., permanently stored), by blocking deletion, changes, and/or other tampering attempts, for example, the user interface for users omits an option to delete or change messages and/or files once they have been posted and/or uploaded. Deletion and/or tampering is blocked (or not available) for any (or selected) members of the PCE object, including PCE members and/or linked entities. In this manner, the retained data represents an un-tampered correspondence record. It is noted that deletions and/or changes may be allowed, for example, defined by system settings granted to certain users, for example, to the system administrator and/or team leader. Such deletions and/or changes may be recorded to maintain a complete record.

Data displayed within the centralized data space mirrors data within respective PCE objects. The same data may be accessed from two locations, from individual PCE object shared spaces, and/or from the centralized data space. Any changes to the data at the centralized data space are reflected within the data of the PCE object. The data may be stored as the single copy within the PCE object, accessed through the centralized data space. Messages and/or files read or acted upon at the centralized data space may be closed, being removed from the centralized space but retained within the PCE object.

Optionally, new data (for example, unread and/or otherwise not acted upon data) posted to each shared space of each PCE object appears within the centralized data space. Data that was previously acted upon may only appear when individual shared spaces of individual PCE objects are accessed. Files may be previewed, downloaded and/or forwarded from the centralized data space.

Data may be uploaded to shared spaces of PCE objects from the centralized data space. The user may specify the particular destination PCE object (sending to one or several PCE objects), and the particular recipients. In this manner, from a central location, the user may send messages and/or upload data destined to different recipients, to different shared spaces of PCE objects. From the centralized data space, the user may send messages and/or files to recipients that are not registered members, for example, based on email as described herein.

User interface 210E may act as the centralized data space, for example, when users connect through a web-browser.

Optionally, at 606, the registered user closes a certain PCE object in which he/she is a member, for example, using user interface 210E.

Each member of the certain PCE object may individually close the PCE object for him/herself. The PCE object remains active for the remaining members to continue collaboration. The member that closed the PCE object may be removed from the member list (the team members or linked entities).

Data may continue to accumulate in the shared space of the closed PCE object (by other members that have the PCE object open). Data having suitable permission levels may be still accessed by the user that closed the PCE object. The data may be accessed by re-opening the closed PCE object. The data may be consolidated into an automatically created closed PCE object that consolidates data from all PCE objects closed by the registered user. In this manner, no data is lost, and data may still be accessed at any time. Closing of PCE objects may provide a way for the registered user to remain organized, for example, closing PCE objects in which the user is no longer contributing to, or in which the project has been completed.

Closed PCE objects may be reopened. The user may be reinstated back as a PCE member. The user may have access to all the data that has accumulated between the closing and re-opening of the PCE object (the data that has permission levels allowing the user access to the data).

When a new message (or file) is sent to a non-PCE object member (who may have previously been a member of the PCE object, or has never been a member thereof), the non-PCE object member may receive the message in a folder of non-PCE objects. The non-PCE objects folder may consolidate all such messages sent to the non-PCE object member. The message may be sent by a shared member of a certain PCE object. The non-PCE object folder may be accessed through the common space, as described herein.

Optionally at 608, the registered user leaves the organization. The registered user may change his/her profile to a status denoting that he/she has left the organization. Alternatively, any registered user may change the status of another user (which may or may not be a linked peer) denoting that the other user has left the company. Central administration to change the status to left-the-organization may not be required. The status within user repository 210A may be changed to reflect that the user has left the organization, for example, by PCE object management module 210G.

The details of the leaving user may be retained within repository 210A, in case the user returns to the organization, and/or works for a partner that collaborates with the organization.

When a certain user flags another user as having left-the-company, an email may be automatically sent to the other user with a link and a message allowing the other user to object. When three days (or another predefined period of time) have elapsed without objection, the status of the other user is finalized to left-the-organization.

To log back in after changing the status to left-the-company, the same user may need to re-verify his/her email address. The email address may remain the same, for example, when the user has returned to the company. The email address may change, for example, when the user has moved to a collaborating partner.

Users that have left the organization may not take the data along with them.

Email addresses may not be changed to an outside domain. When a user does move to a different organization, and wants to be re-registered as a user, the email address is changed to the outside domain, and access to all data and/or PCE objects associated with the old email address (when the user was part of the organization) are blocked. In order to access the blocked data, the user (with the new domain name) needs to be re-invited to join respective PCE objects by PCE members.

Figure 7:
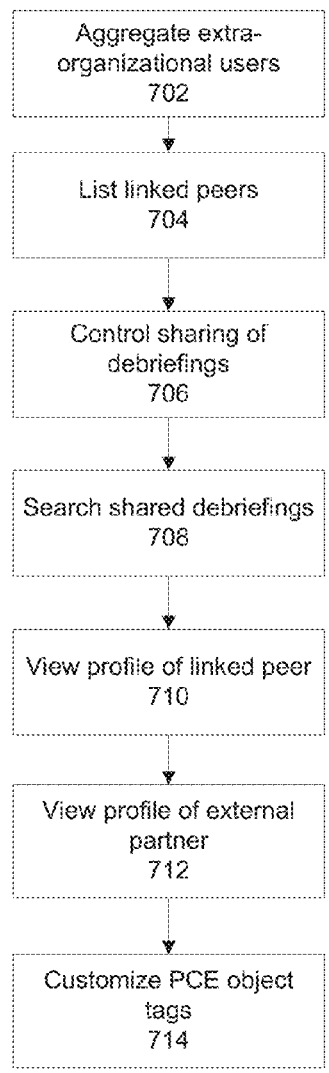
FIG. 7 is a flowchart of additional optional exemplary features for social network related actions based on the method of FIG. 1 and/or the system of FIG. 2, in accordance with some embodiments of the present invention.

Reference is now made to FIG. 7, which is a flowchart of additional optional exemplary features for social network related actions based on the method of FIG. 1 and/or the system of FIG. 2, in accordance with some embodiments of the present invention. The features may be implemented by the processor executing code stored in the program store.

Optionally, at 702, all extra-organizational members of PCE objects are aggregated into an extra-organizational dataset, for example, by user interface 210E.

All external members outside of the organization that are PCE object members of any intra-organizational user are aggregated into the extra-organization dataset.

The dataset may include profiles of individual members, for example, when such members are team members. The data set may include profile of extra-organizational partners, for example, when such partners are linked entities.

Optionally, the dataset includes the tag (which may be stored on the link) between the intra-organizational PCE object and the PCE object created by the extra-organizational partner.

The dataset may be searched by company (or partner) or individual person, for example, based on their activity related to tags (for example, purchasing, sales, or other categories). Optionally, only intra-organizational users may access and/or search the dataset.

The extra-organizational members may be identified, for example, based on their registration details, their email address, and/or their member status.

Optionally, at 704, a list of all linked peers (or a selected subgroup thereof) for a certain registered user is compiled, for example, by user interface 210E.

The list may include the number of briefings each linked peer has shared with the registered user, how many briefings have been shared with other users, and/or how many briefings the registered user has shared with each linked peer.

Optionally, at 706, the certain registered user access a dashboard user interface (which may be controlled by user interface 210E) to control how briefings of PCE objects are shared. Briefings may be shared on the dashboard, for example, with specific departments, countries, or with the entire company.

The dashboard may provide a summary to allow a certain user to quickly scan what has been shared with the user, for example, by linked peer, by external partners, by category and/or based on other categories. When the user clicks on the briefing, the user may see a history of previous briefings.

Optionally, at 708, all briefings shared by all linked peers (or a selected subgroup thereof) with the certain registered user is searchable, for example, through user interface 210E. In this manner, the user may find other similar projects in the company, find partners recommended by other peers, and/or see what is happening in the company. Searching may be performed through the dashboard.

Optionally, at 710, user profiles of linked peers are displayed, for example, by the user clicking on the name of a linked peer through user interface 210E. The user profile may include information fields of PCE objects the linked peer is involved with, and other personal details of the linked peer for sharing, for example, address, title, phone number, email, education, who those linked peers are linked to within the company, and/or who those linked peers are linked to outside the company.

Optionally, the user profile includes archived items of PCE objects the linked peer is involved with. Optionally, all archived items are associated with the user profile. Alternatively, items archived by the linked peer become part of the user profile (e.g., which may be based on the assumption that the user designating the archive played a significant role). Alternatively, archived items related to the linked peer (e.g., the linked peer is an author of the document) become part of the user profile. The archived items may be accessible to individuals having access to the user profile.

Individuals from outside the company that participate in PCE objects in which the user was a member and/or leader may be automatically added to the user profile as part of a network. Specific invitations to link with intra-organizational users may not be required. Optionally, social link module 210F automatically links between intra-organizational users of the user repository and extra-organizational users of the user repository based on the extra-organizational users being members of the PCE object together with respective intra-organizational users.

Optionally, at 712, partner profiles of external organizations are displayed, for example, by the user clicking on the name of an extra-organizational individual and/or the name of an extra-organizational partner (for example, a company). The partner profile may be automatically defined by user interface 210E based on existing information within the system and/or manually defined by the extra-organizational partner. The partner profile may include briefings of PCE objects that are shared with the certain user through linked peer that have worked with the partner. The shared briefings may be used to assess capabilities of the external partner, which may help in providing references for the partners, negotiating with the partners and/or selecting the best partners. When the name of an extra-organizational individual is clicked, the profile may include, for example, contact details, resume, who the individual has worked with from the organization, and the briefings shared with the user in which the extra-organizational individual was involved.

Optionally, at 714, a tag associated with each PCE object is customized, for example using user interface 210E, and/or automatically by a software module. The tag may be selected by the central administrator, by the PCE leader, or by other PCE members. The tags may categorize the PCE object by one or more categories, for example, department, division, spend category, revenue category, and activity.

The tags may be searched by an administrator or other individual with high permission level, to identify PCE objects based on the different categories. For example, finance may search through PCE objects related to spending, to learn how money is being spent across the company.

Optionally, when a project is confidential, and a person without proper permission levels is viewing the confidential PCE object, certain information fields may be blocked and certain fields may be allowed, for example, the title, brief, debrief and/or shared data space may be blocked. The members may be visible. The budget of the PCE object may be visible. In this manner, the viewer may know there is a secret project going on, without knowing what it is. For example, finance may have access to the budgets of the secret projects. The viewer may contact those involved for more information when required.

Optionally, certain people may be assigned a permission level to view activity based on the different tags. For example, executives, procurement, and/or finance professionals may want to see activity by spend category, division, department, and/or country. The permission level may be an option available in an upgraded version of the system as described herein.

The tags allow those with suitable permission levels to access PCE objects without being linked to any members of the PCE objects.

It is estimated that within a company, about 3-5% of employees will require special high level permission, for example, to access PCE objects (such as by tags) without being a member of the PCE object. In this manner, the administration requirements are fairly low, which may be controlled with a small team. The remaining user without the high level permission define and/or control access to PCE objects themselves, as described herein.

Reference is now made to FIGS. 8A, 8B, 8C, 8D, 8E, 8E', 8F, 8G, 8H, 8I, 8J, 8K, 8K', 8L, 8M, 8N, 8O, 8P, 8Q, 8R, 8S, 8T, 8U, 8V, 8W, 8X, and 8Y which are screen captures of an exemplary implementation of the systems and/or methods for PCE object based intra-organizational and/or extra-organizational collaboration, in accordance with some embodiments of the present invention. The screen captures may be displayed on a client terminal of a registered user, being viewed through a user interface, for example, as web-browser or customized application, as described herein. The screen captures may be based on the method of FIG. 1 and/or the system of FIG. 2.

Figure 8A:
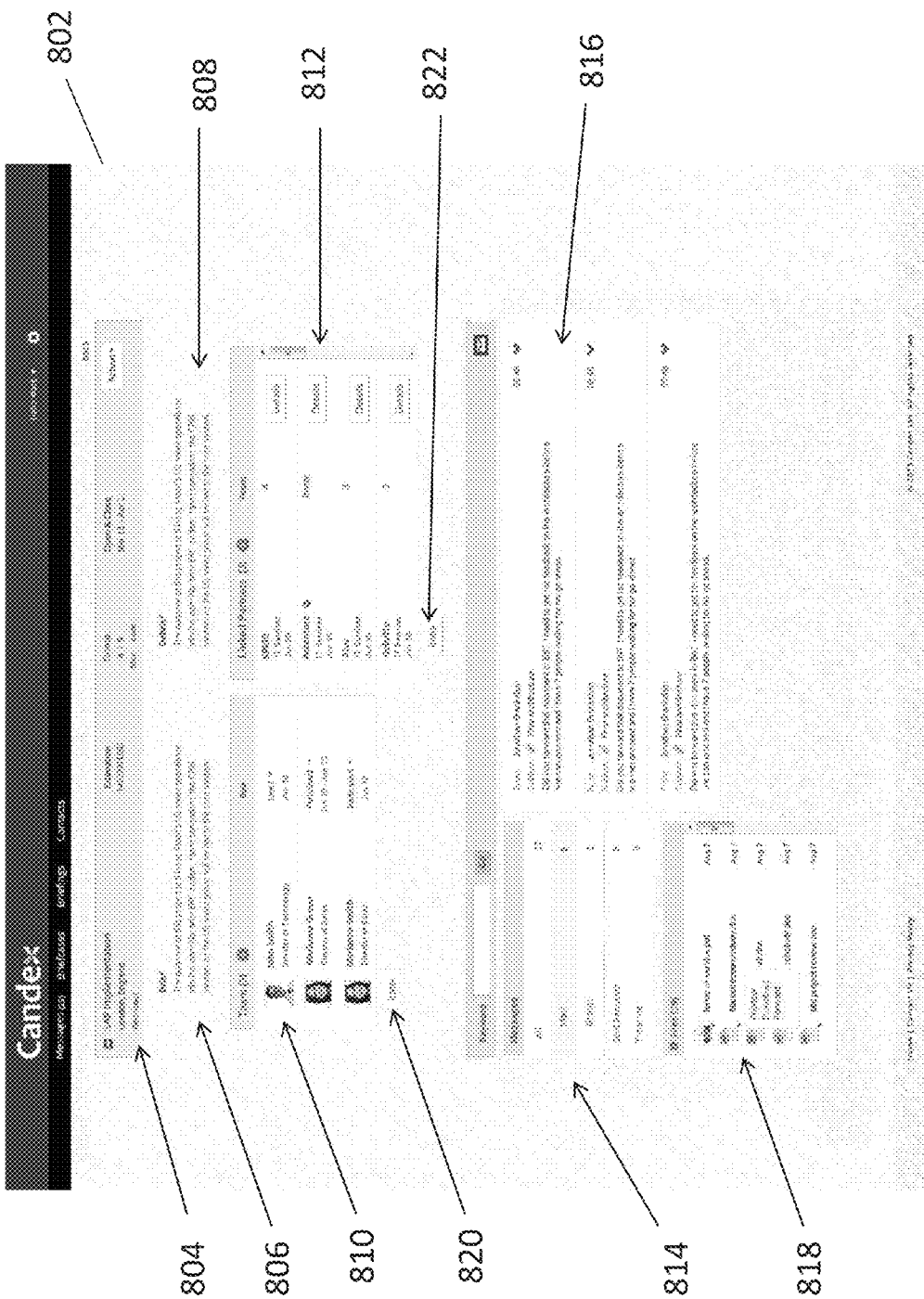
FIGS. 8A, 8B, 8C, 8D, 8E, 8E', 8F, 8G, 8H, 8I, 8J, 8K, 8K', 8L, 8M, 8N, 8O, 8P, 8Q, 8R, 8S, 8T, 8U, 8V, 8W, 8X, and 8Y are images of an exemplary user interface based on an exemplary implementation of the method of FIG. 1 and/or the system of FIG. 2, in accordance with some embodiments of the present invention.

FIG. 8A is an exemplary user interface that displays and/or accesses an exemplary PCE object 802, as described herein, for example, in reference to PCE object 302 of FIG. 3. Title 804 includes the project title, location, overall PCE object classification (for linked peer to view briefings), estimated cost, summary of activity, and open and close dates. Brief 806 provides a summary of the goal of the project and debrief 808 provides the updated status of the project. PCE team members 810 are listed, which may include for each member, a picture, name, title, role (leader or participant), and dates of involvement. Additional team members may be invited by clicking invite 820. Linked PCE entities 812 are listed as external organizations, with the name of the external organization, the role in the project, the date of joining, the number of team members within the PCE object of the partner, and additional details which may be accessed. Partners may be invited to link by clicking button 822.

Shared space 814 includes messages 816 and files 818. Shared space 814 allows searching for specific files and/or messages within the shared space itself.

Figure 8B:
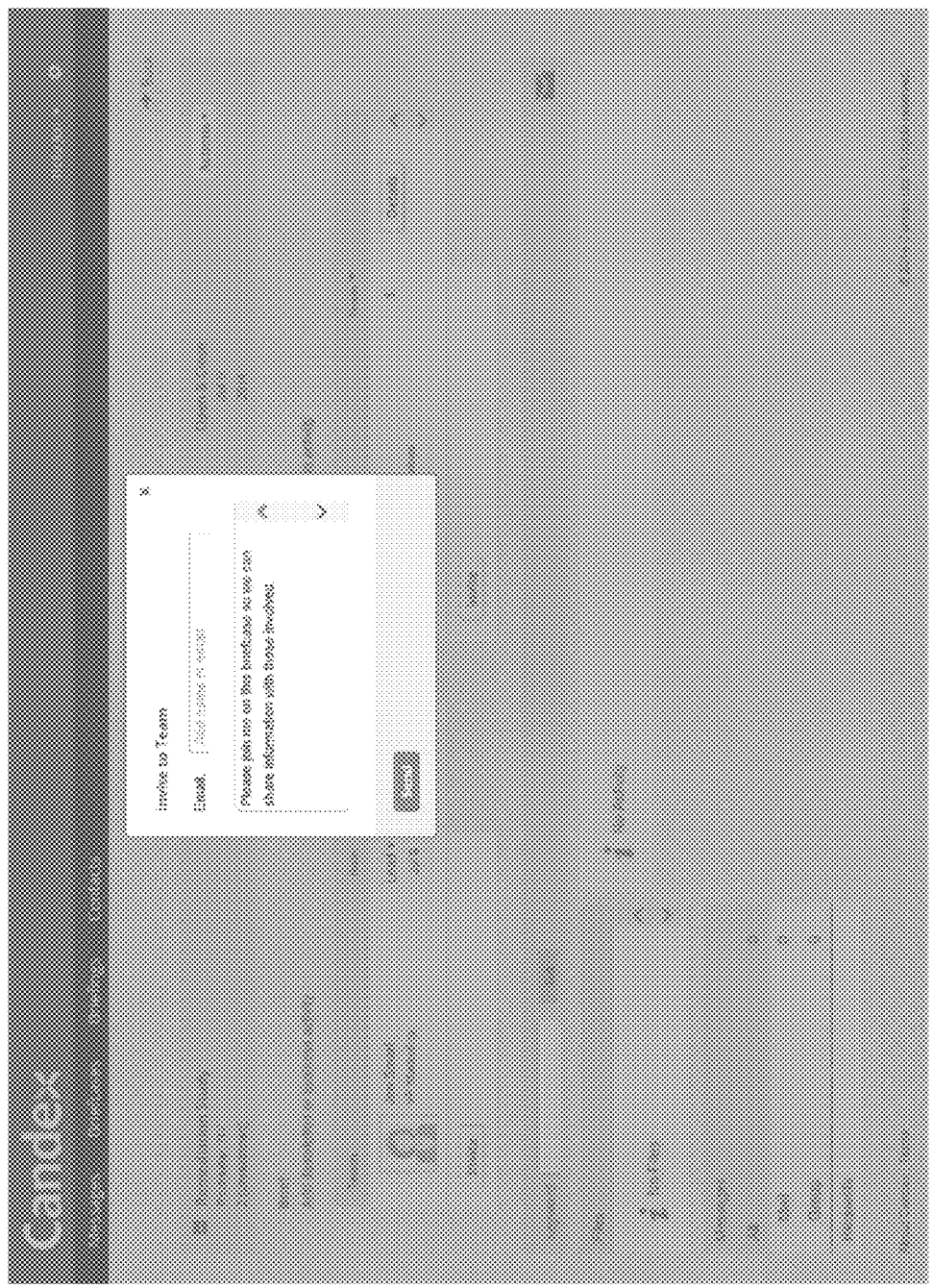

FIG. 8B is an exemplary user interface that displays and/or accesses the invitation to another registered user to become a team member, for example, after clicking button 820 of FIG. 8A.

Figure 8C:
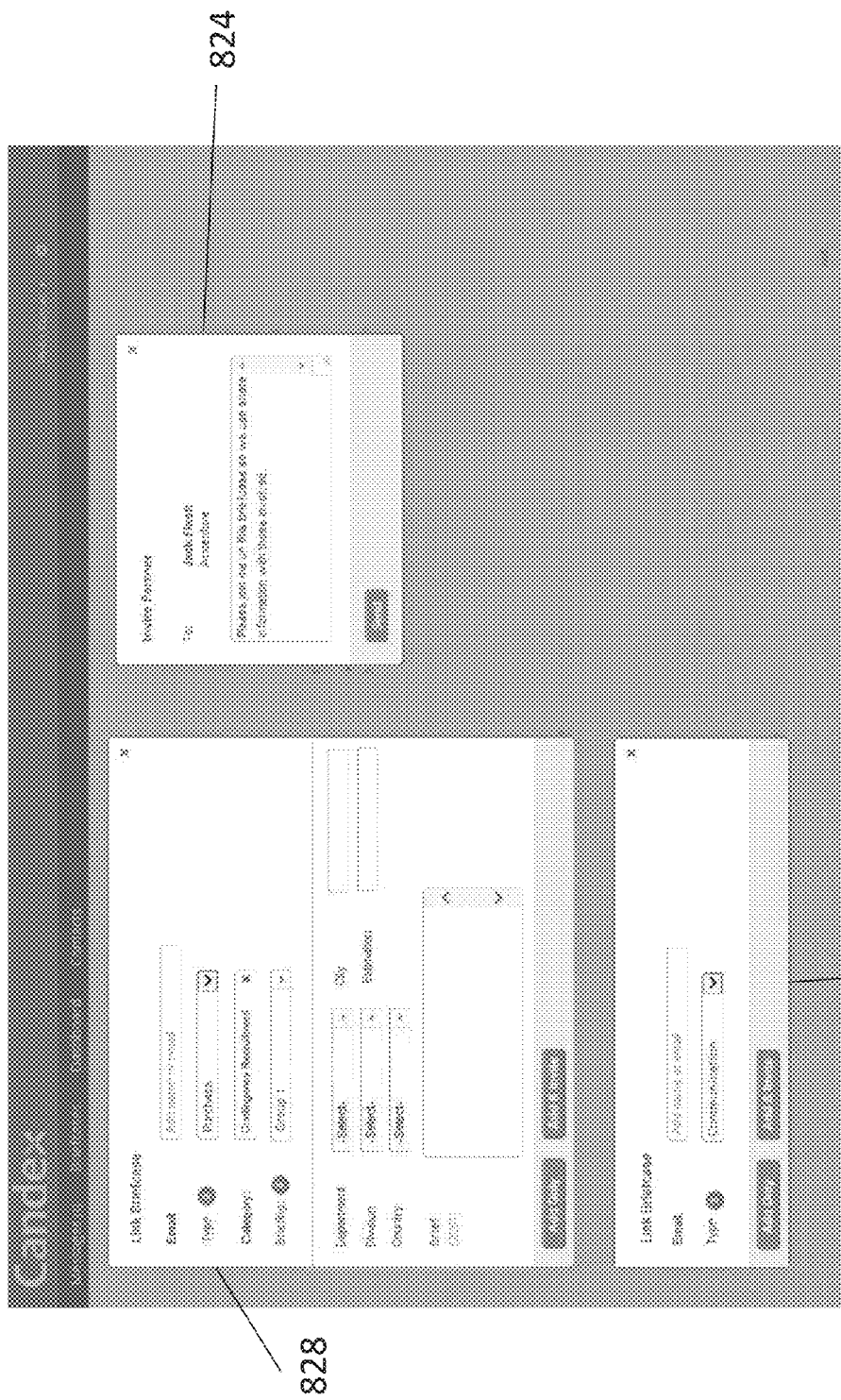

FIG. 8C is an exemplary user interface that displays and/or accesses inviting an external partner to join as a linked entity, for example as described with reference to FIGS. 4A-B. Box 824 sends an invitation to the leader of the external partner.

Once the leader has created his/her own PCE object (i.e., child PCE), the partner PCE object may be linked back to the intra-organizational PCE object (i.e., parent PCE) by box 826 or 828. Box 828 is optionally a further detailed version of box 826, both of which allow the inviting user to customize the labeling of the partner PCE object, which may be stored on the link between the parent and child PCE object, as described herein. In this manner, the child PCE objects of external partners may be searched and/or sorted.

Figure 8D:
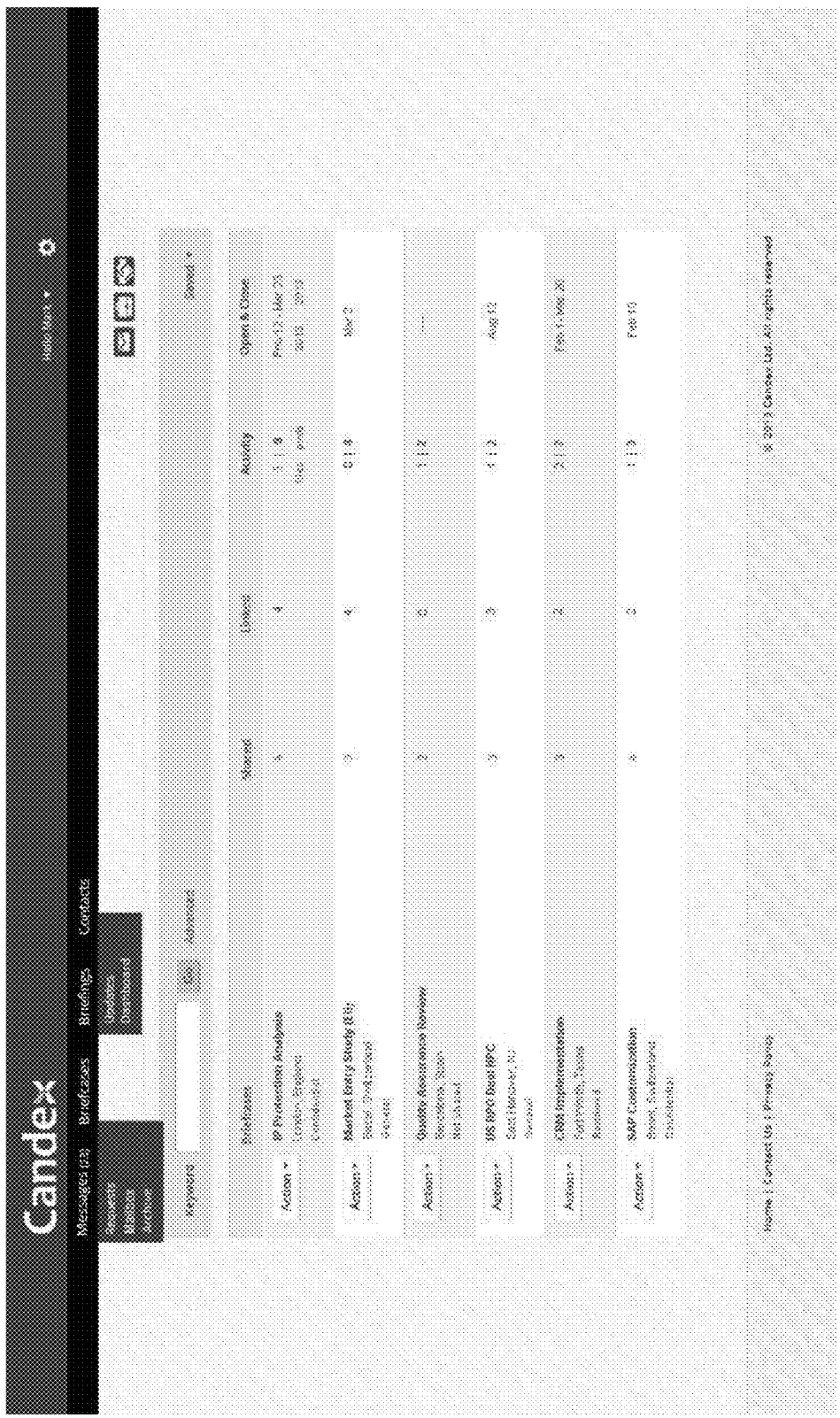

FIG. 8D is an exemplary user interface that displays and/or accesses a list of PCE objects for a certain registered user, which may include a summary of the title, the number of team members, the number of linked entities, the number of files and/or messages in the shared space, the dates of opening and/or closing, and the permission level of the PCE object for sharing briefings, as described herein.

Figure 8E:
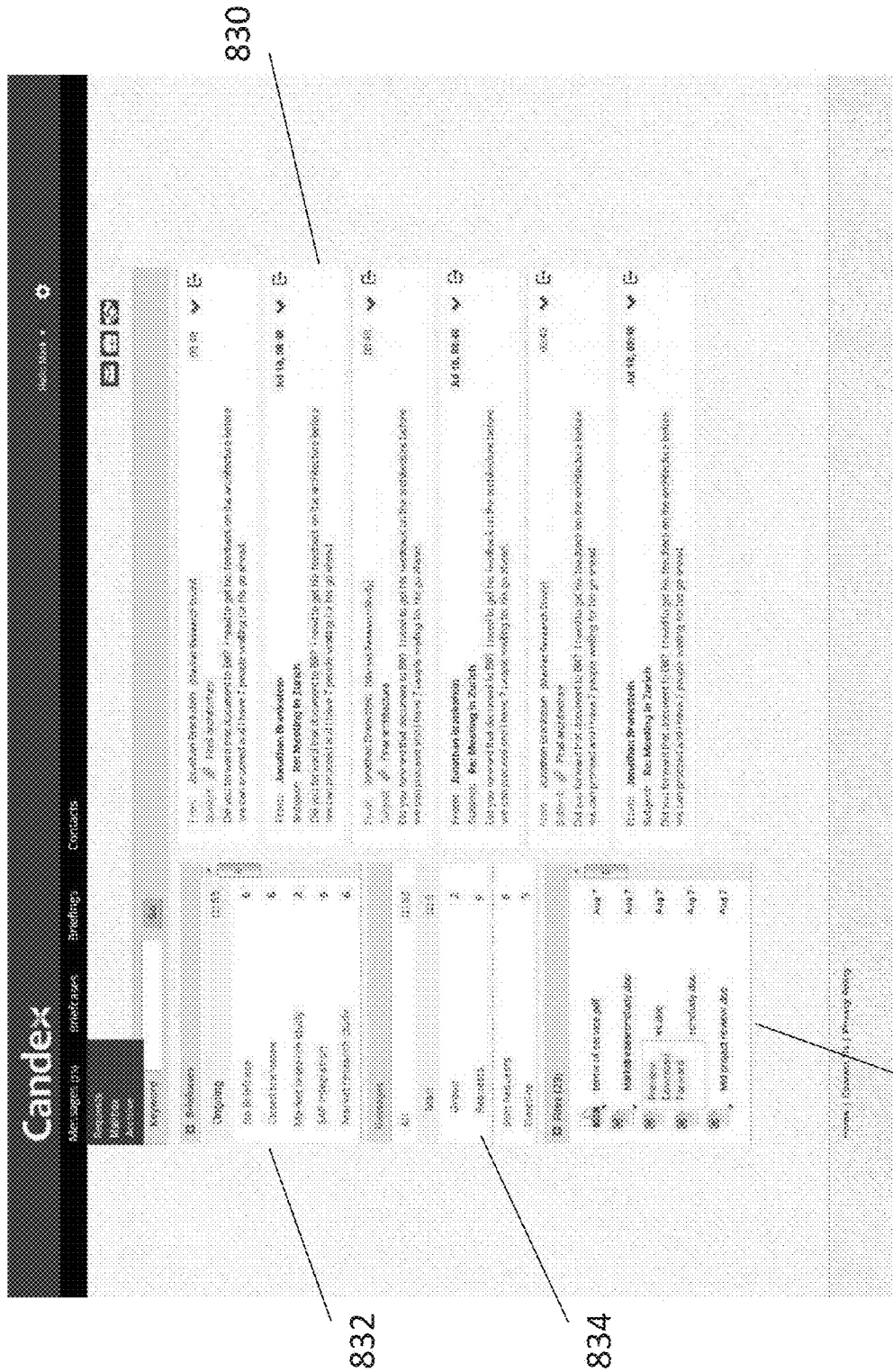
Figure 8E:
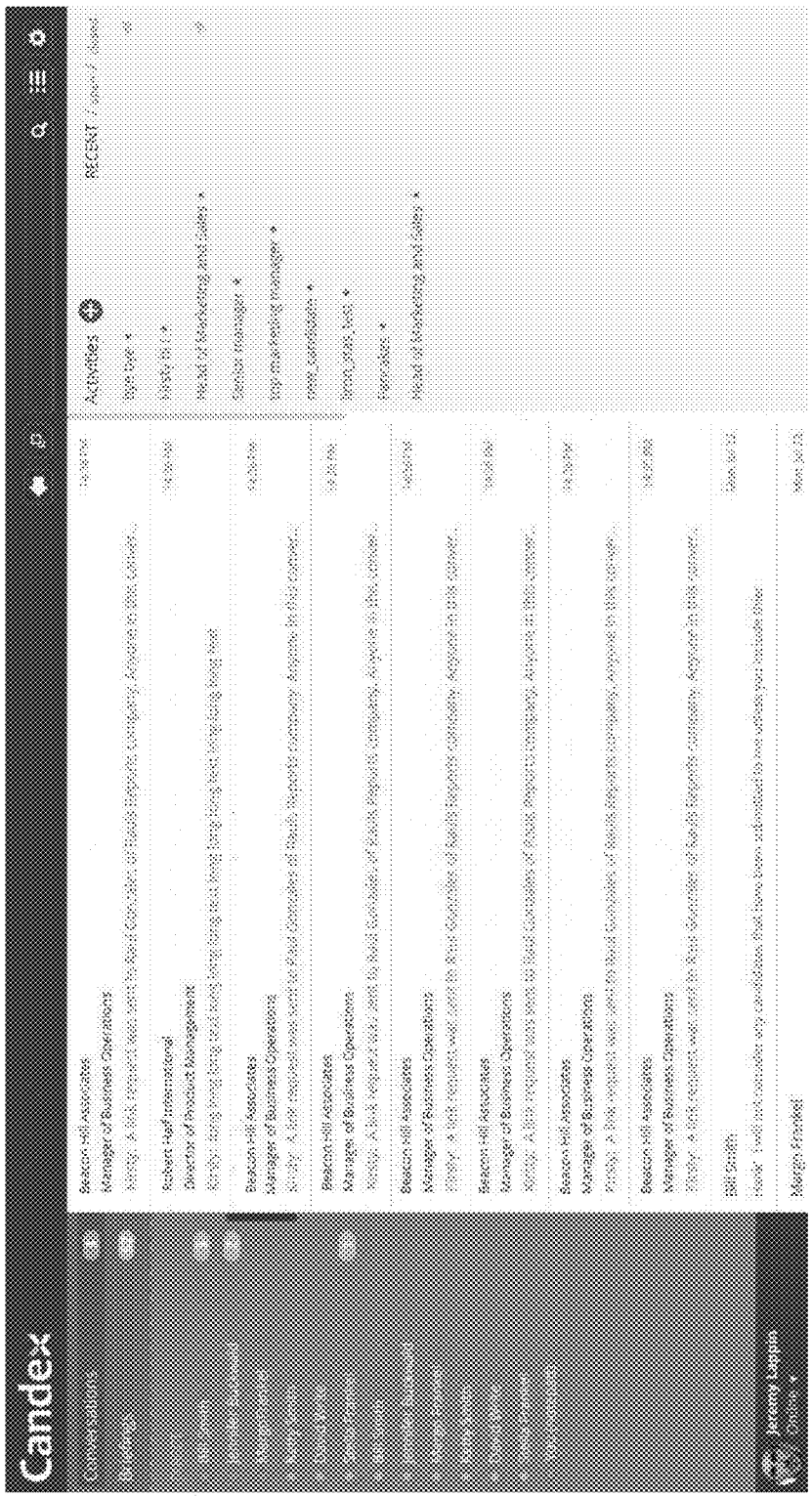

FIG. 8E is an exemplary user interface that displays and/or accesses the centralized messages space, as described herein. Unread or otherwise acted upon messages from PCE objects that the user is a member of are organized in a centralized space 830. Box 832 contains a list of PCE objects in which the user is a member of, along with a closed-briefcase PCE object that consolidates data for user closed PCE objects (as described herein), and a No-Briefcase PCE object which contains data sent to the user without being associated with any particular PCE object. Box 834 contains a breakdown of messages by type. Box 836 is a centralized space for files.

FIG. 8E' is another exemplary user interface that displays and/or accesses the centralized messages space, as described herein. The user interface may display a summary of the number of conversations and/or briefings that the user is participating in. The user interface may display a summary of the PCE members and/or PCE linked entities compiled from the PCE objects that the use is a member of. PCE members may be marked, for example, with a green dot. PCE linked entities may be marked, for example, by a grey dot. The number of pending messages may be displayed next to each name.

A list of the summary of the pending messages is presented, optionally organized in reverse chronological order (i.e., newest first). Each pending message summary may include the PCE object name (e.g., Beacon Hill Associates), the name and/or title of the PCE member or linked entity posting the message, and the first line of the message. In this manner, the user may quickly browse through the pending messages, for example, to identify important messages that need to be answered first.

The list of pending messages may be filtered, for example, based on important PCE objects. Other PCE objects may be presented in a different window, which may be selected separately, for example, by clicking the Activities tag. The PCE objects related to other activities may be sorted by RECENT, open, and closed status of the PCE objects.

Figure 8F:
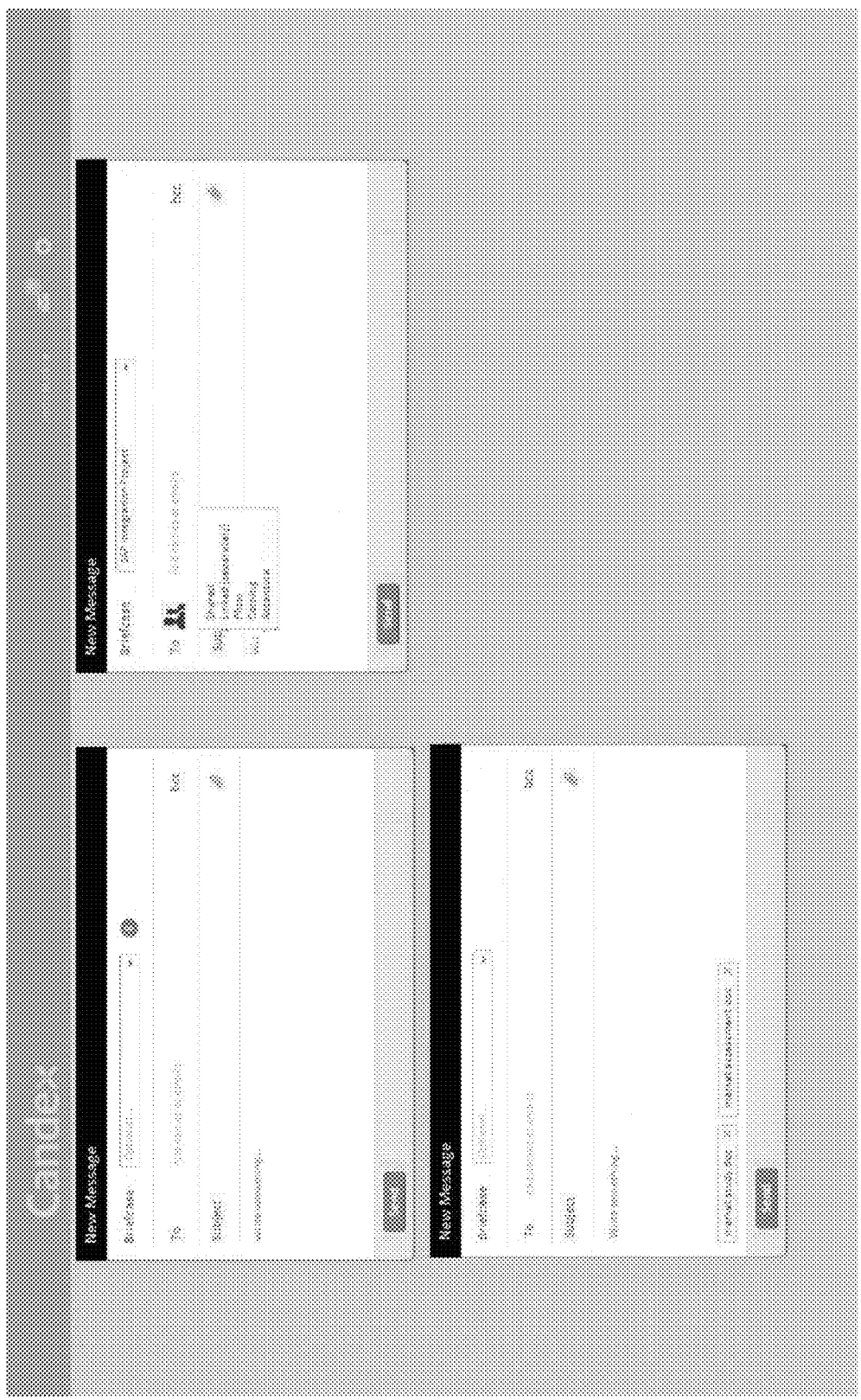

FIG. 8F is an exemplary user interface that displays and/or accesses sending a message from the centralized messages space, as described herein. The destination PCE object is selectable, along with the destination user or group of users.

When the destination PCE object is a child PCE (for example, an extra-organization partner), specific members or groups of members of the child PCE object may be selected.

Figure 8G:
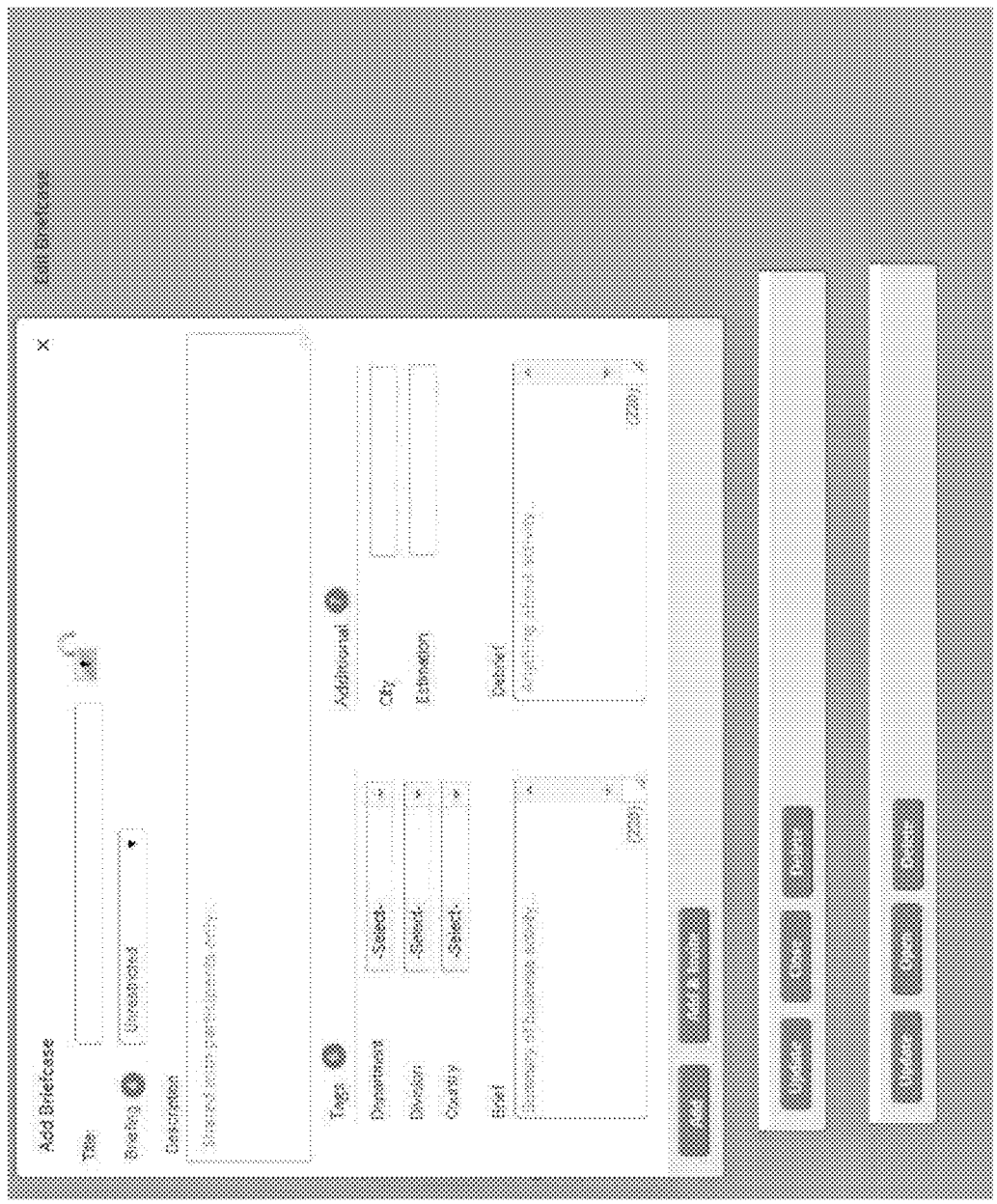

FIG. 8G is an exemplary user interface that displays and/or accesses creation of a new PCE object. The user may select and/or enter data in fields such as title, briefings permission level, brief, debrief, and tags to help classify the PCE object, as described herein.

Figure 8H:
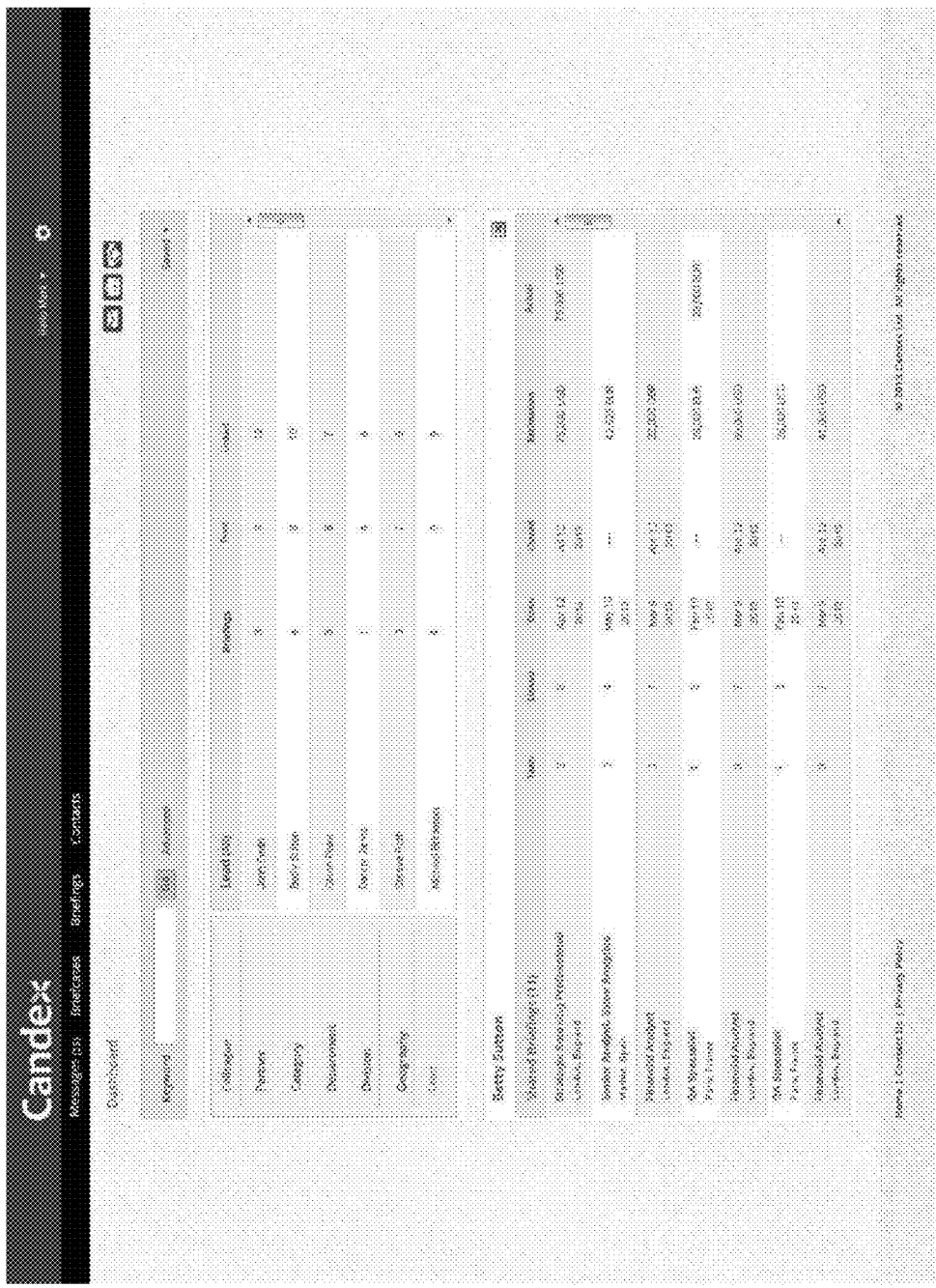

FIG. 8H is an exemplary user interface that displays and/or accesses a dashboard for viewing briefings shared by others intra-organizational colleagues with the linked user. The shared briefings are organized in different ways, for example, by type such as: colleague, partner, category, department, division and geography. For one or more selected types (or all types), the names of the linked peers are displayed, along with the number of shared briefings, and number of other members of the PCE object. Particular team members may be selected (for example, Betty Sutton) to display a breakdown of specific PCE objects the linked peer is sharing.

Figure 8I:
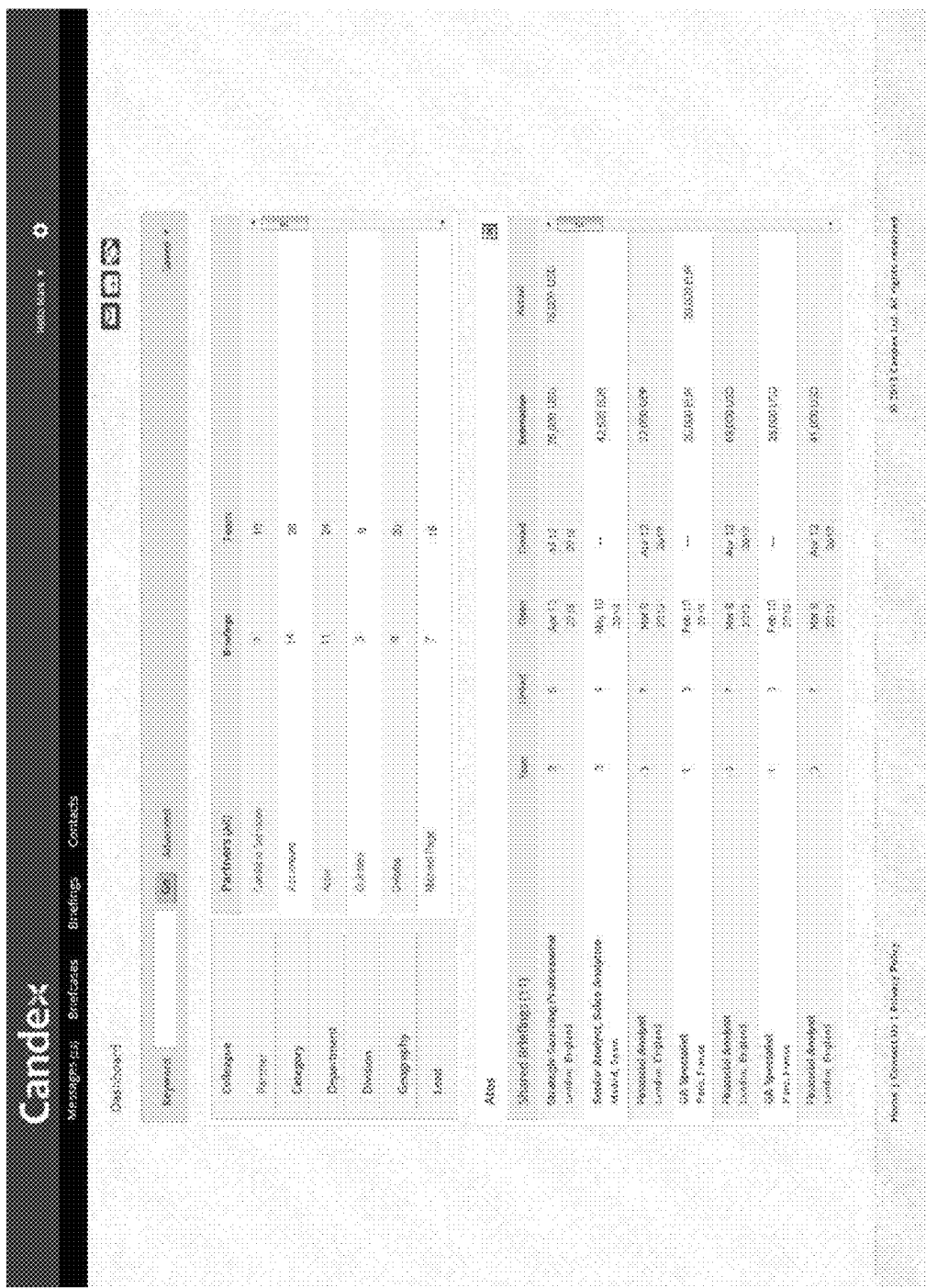

FIG. 8I is an exemplary user interface that displays and/or accesses a dashboard for viewing briefings shared by extra-organizational partners with the linked user.

Figure 8J:
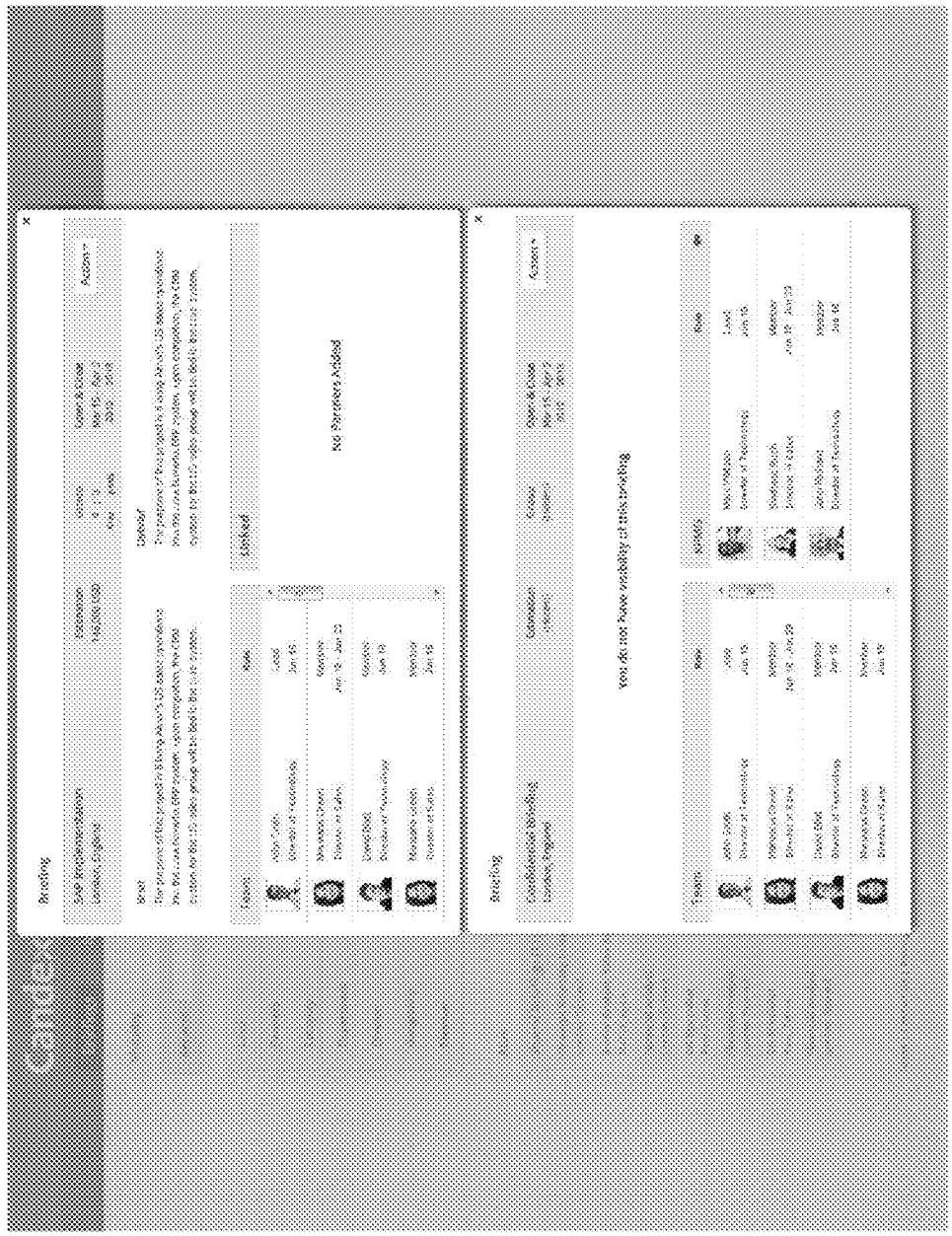

FIG. 8J is an exemplary user interface that displays and/or accesses certain shared PCE objects of a linked peer. The top box displays information such as the brief, debrief, title, team members and any linked entities. The bottom box depicts a shared PCE object in which the viewing linked user does not have sufficient permission to view the briefings. The user may be presented with basic information, such as title and team members, which may be contacted to learn more about the restricted PCE object.

Figure 8K:
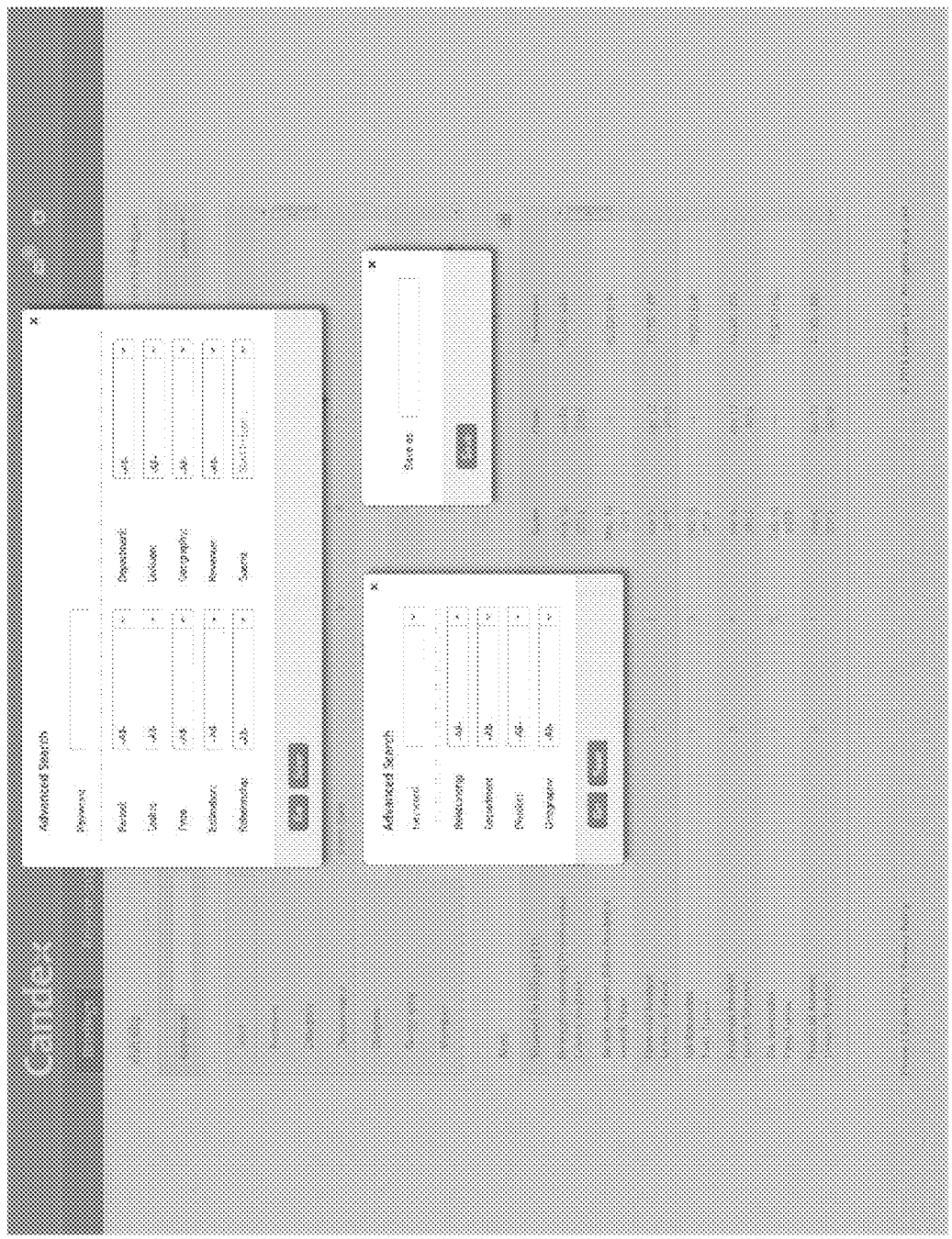
Figure 8K:
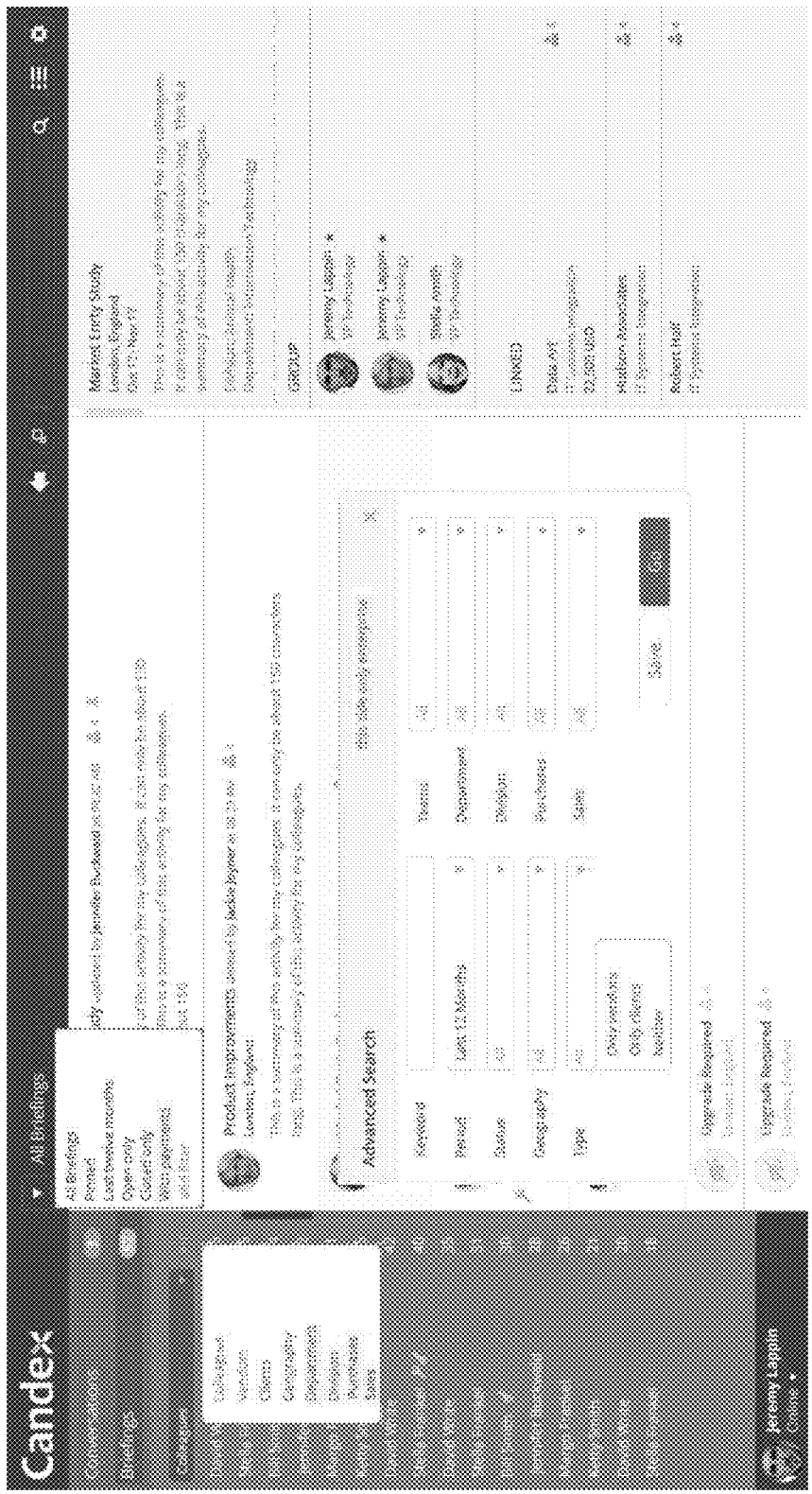

FIG. 8K is an exemplary user interface that displays and/or accesses a box to search through briefings from a certain user. Search may be performed, for example, based on time period, status (e.g., all, open, closed, deleted), type (e.g., all, revenue, expense, no partner, internal partner), estimated cost, permission level, and relationship (e.g., mine, colleagues, my department, my country, everyone).

FIG. 8K' is another exemplary user interface that displays and/or accesses fields to organize briefings and/or search briefings.

Optionally, the list of briefings displayed on the user interface may be filtered by status of the PCE object (e.g., by the user selecting a feature from a list), for example: All briefings (displays all the visible briefings as described herein), pinned (e.g., briefings related to the PCE objects the user is a member of), Last twelve months, Open only, Closed only, With payments (PCE objects having associated payment values, for example, for outsourced projects), and add filter (a custom filter may be defined).

Alternatively or additionally, the list of briefings displayed may be filtered, for example by owner of the PCE object: Colleagues, Vendors, Clients, Geography, Department, Division, Purchases, and Sales.

Alternatively of additionally, the list of briefings displayed may be a result of a search. The search may include only enterprise PCE objects. Examples of search fields (which may be combined): Keyword, Period (e.g., time period), Status (e.g., open, closed), Geography, Type (e.g., only vendors, only clients, neither), Teams, Department, Division, Purchases, and Sales.

Figure 8L:
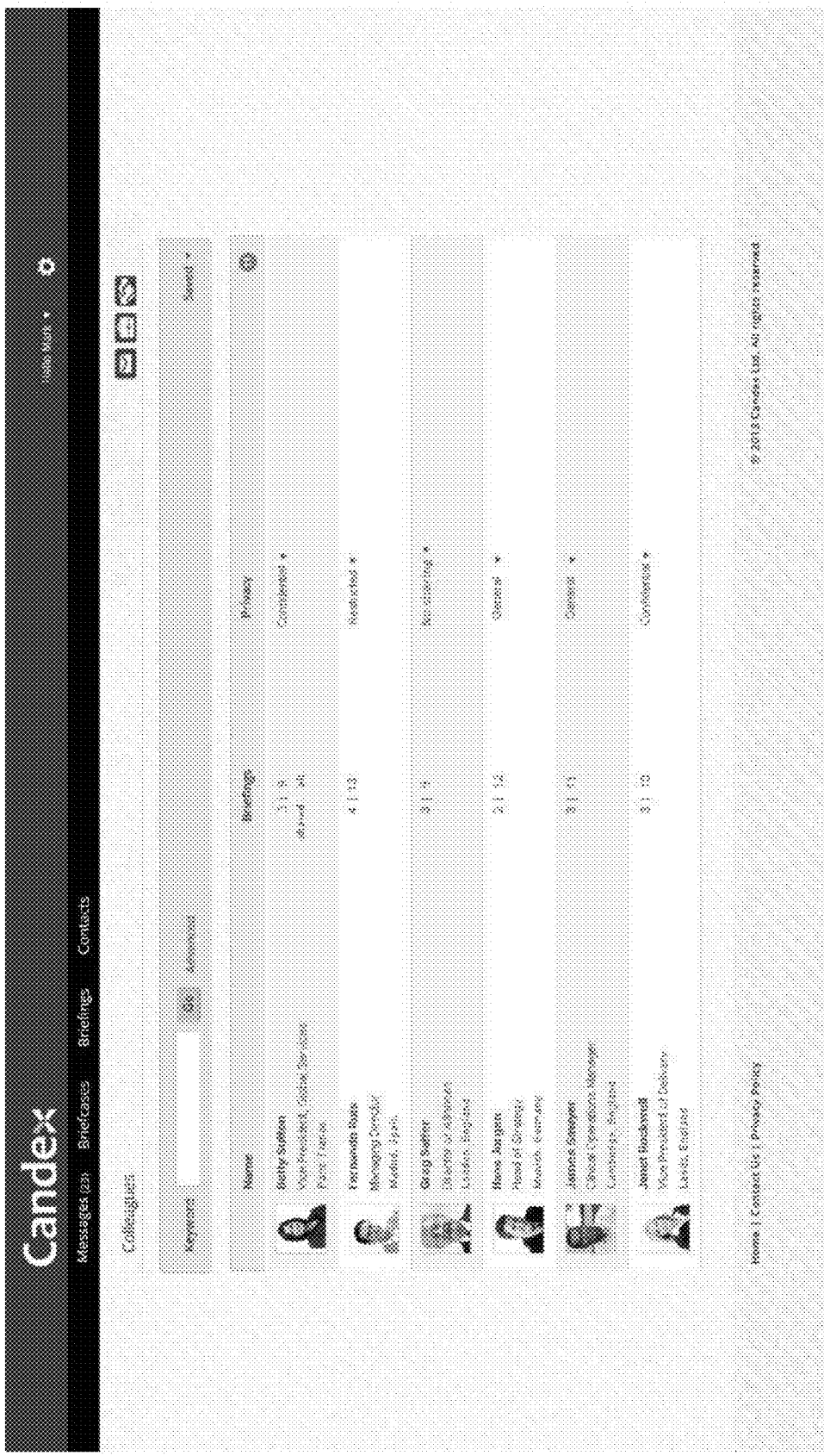

FIG. 8L is an exemplary user interface that displays and/or accesses a list of linked peers. The permission level denoting sharing of briefings with the linked peer is displayed and may be changed. The number of briefings shared by the displayed linked peers is shown. Briefings shared by the linked peers may be searched.

Figure 8M:
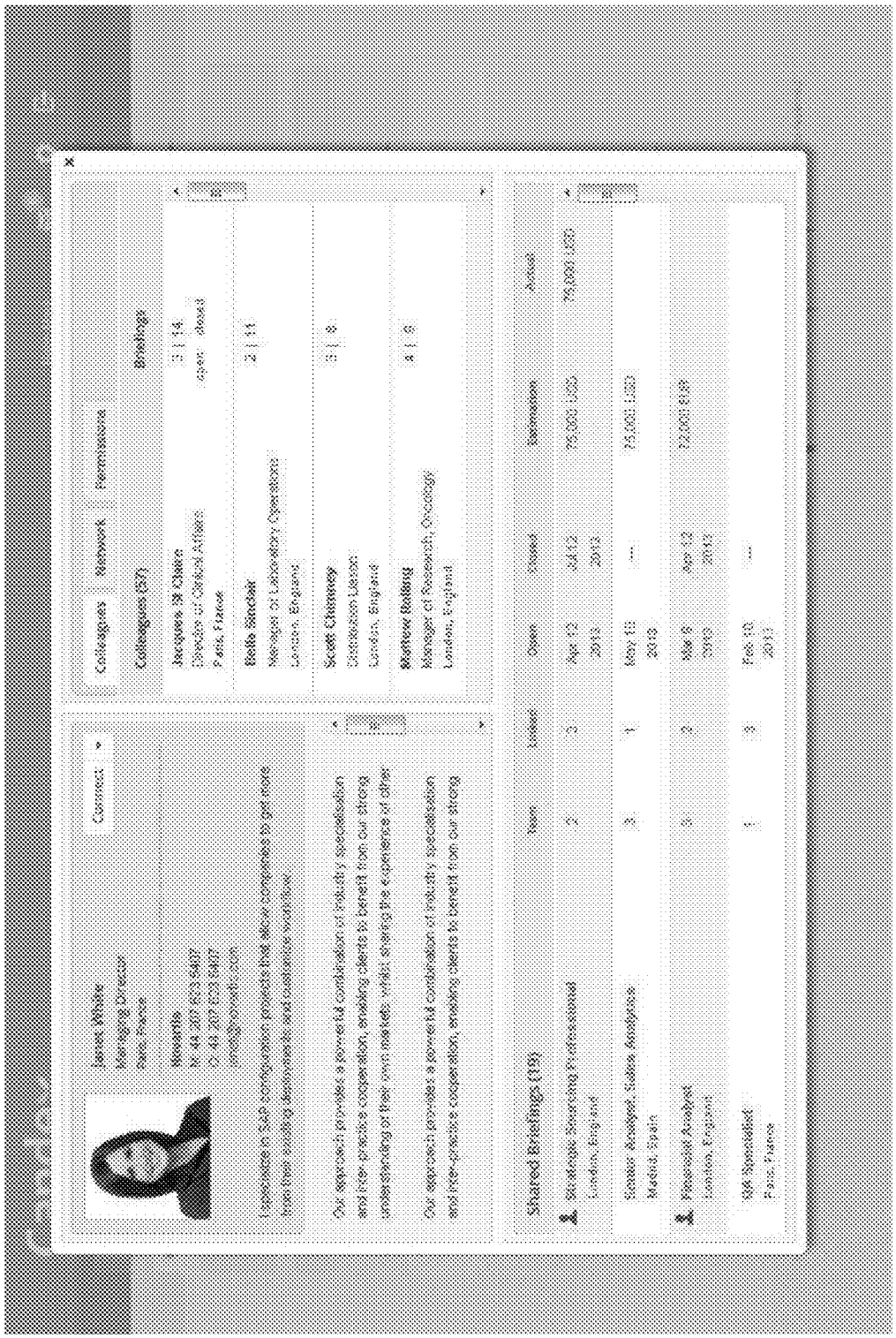

FIG. 8M is an exemplary user interface that displays and/or accesses a user profile of an intra-organizational peer (which may be shared or have a general permission allowing users to view the profile), as described herein, which may be accessed by clicking on the name of the linked peer. The user profile displays personal information of the linked peer, a list of shared PCE objects having shared briefings, and a list of who the linked peer is further connected to, organized by intra-organizational peers (denoted as the Colleagues tab), extra-organizational peers (denoted as the Network tab), and permission levels to access different types of PCE object briefings (denoted as the Permissions tab). Actions may be performed directly from the user profile, for example, link to the user of the profile, invite to a certain PCE object, send a message, and change status to left-the-company.

Figure 8N:
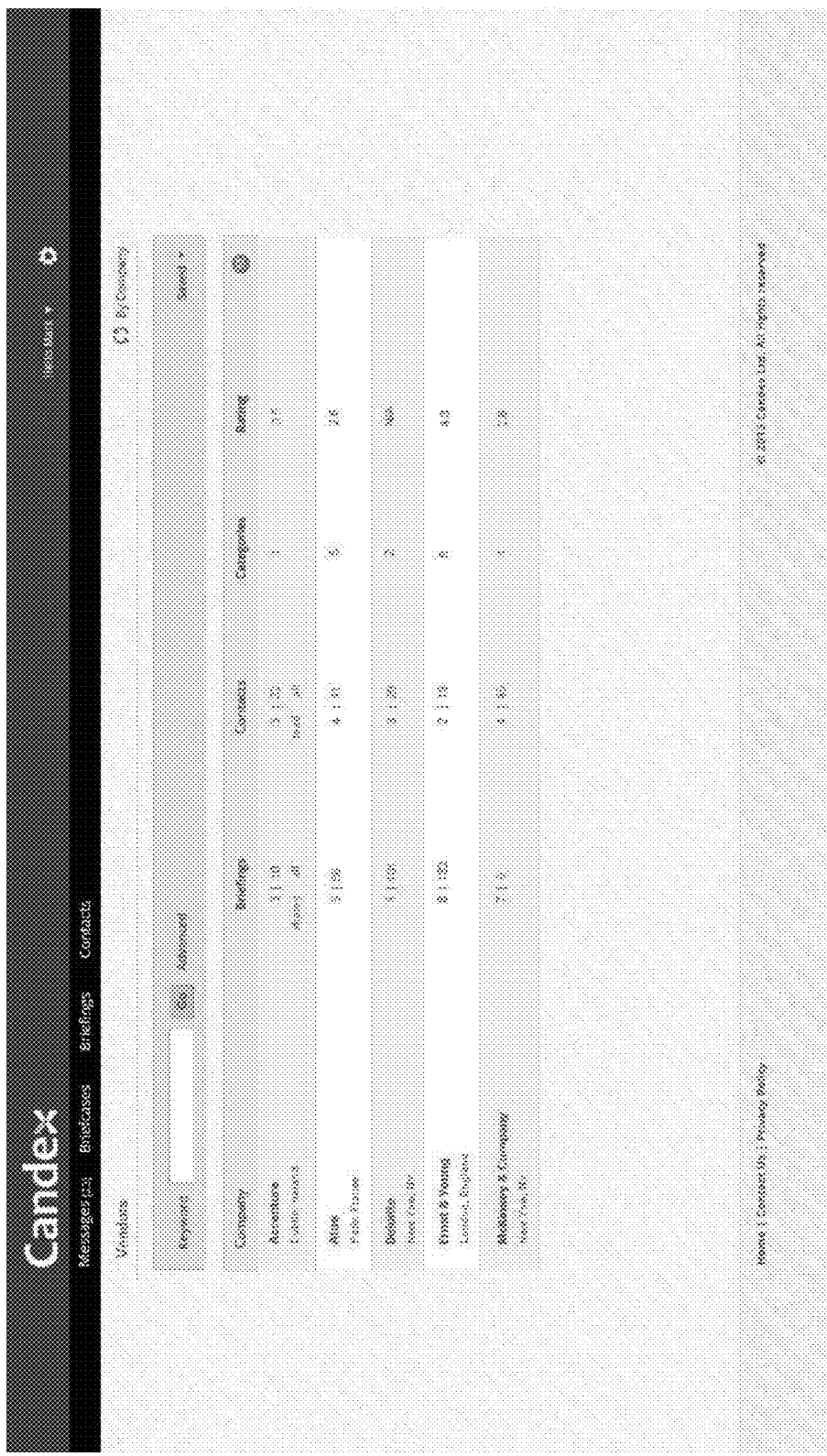
Figure 80:
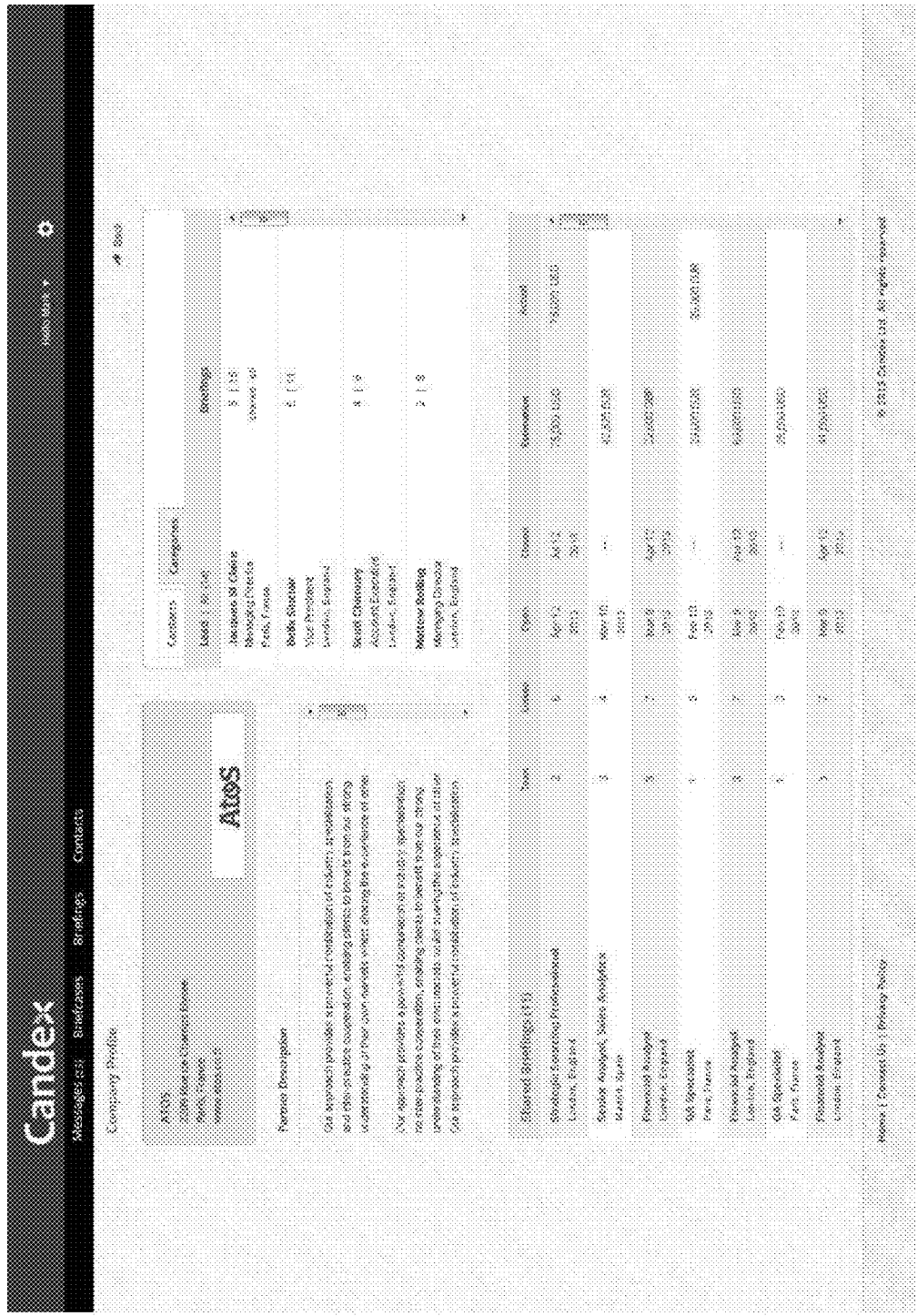

FIG. 8N is an exemplary user interface that displays and/or accesses a list of profiles of extra-organizational partners. The list may be searched by briefings of the shared PCE objects of the partners. The number of members of the child PCE objects of the partners is displayed.

FIG. 8O is an exemplary user interface that displays and/or accesses a profile of an extra-organizational partner. The partner provides contact information, and a summary of their business. The profile displays briefings which the partner is sharing for certain PCE objects, along with details of the objects, such as number of team members, project open date, project close date, estimated cost, and actual cost. A list of intra-organizational members the partner is linked to is provided. A list of contacts of individuals working within the partner organization is provided.

Figure 8P:
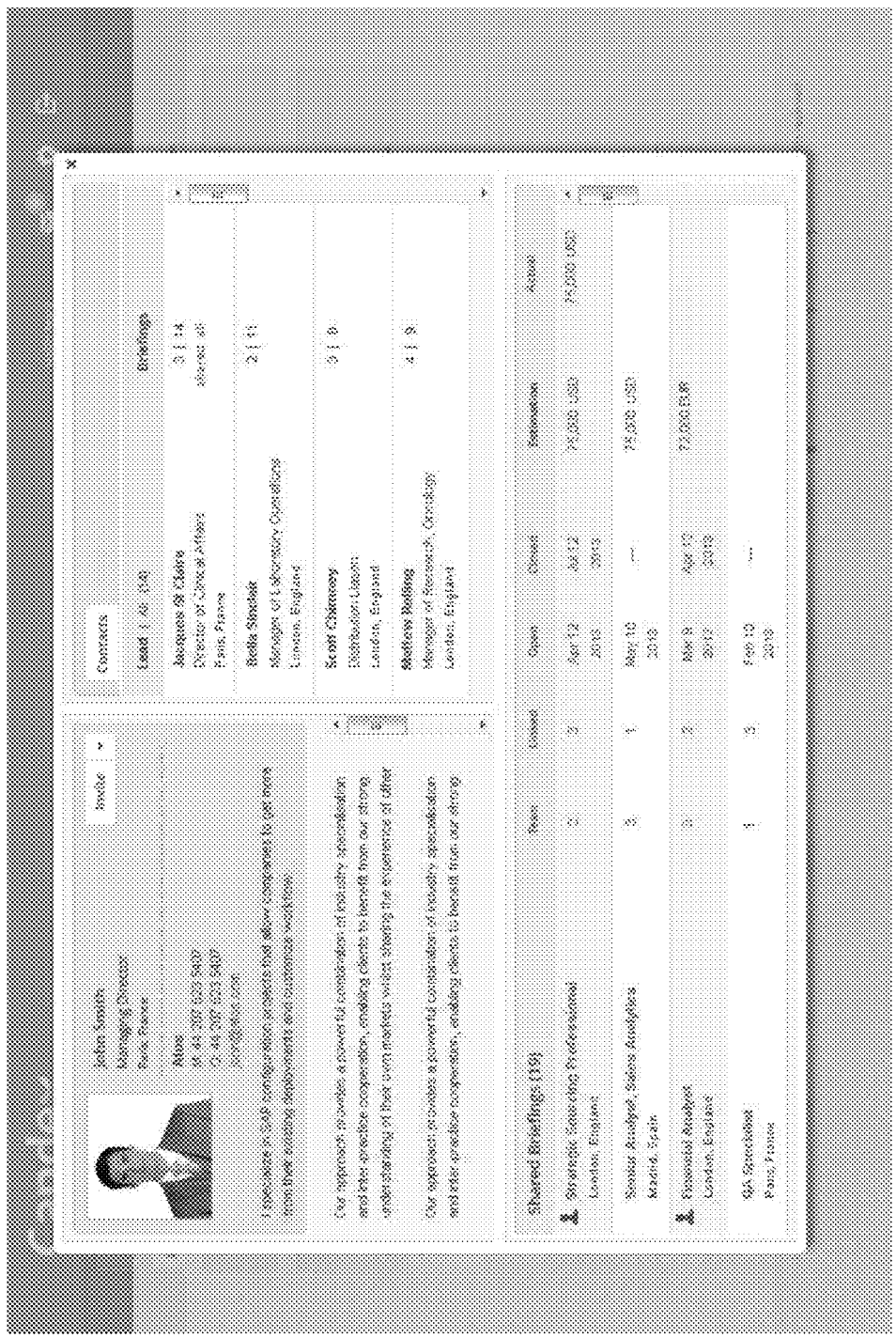

FIG. 8P is an exemplary user interface that displays and/or accesses a profile of an extra-organizational individual, which may be displayed after the individual is selected from the partner profile, and/or from other user interfaces. The individual may be linked by an intra-organizational employee when the individual has joined a PCE object of the intra-organizational employee.

Figure 8Q:
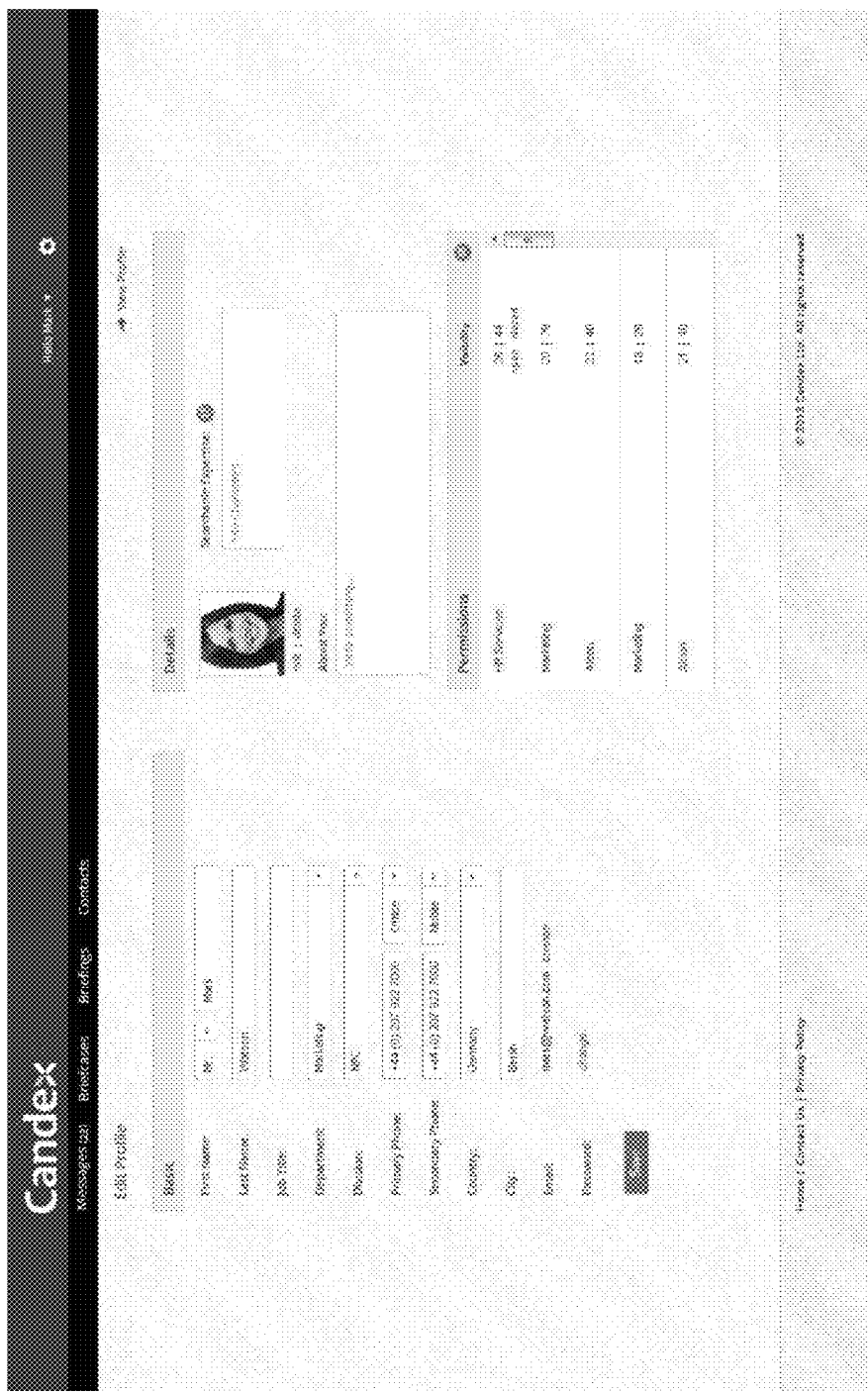

FIG. 8Q is an exemplary user interface depicting fields of an intra-organizational user profile, that may be entered by the user having the displayed profile.

Figure 8R:
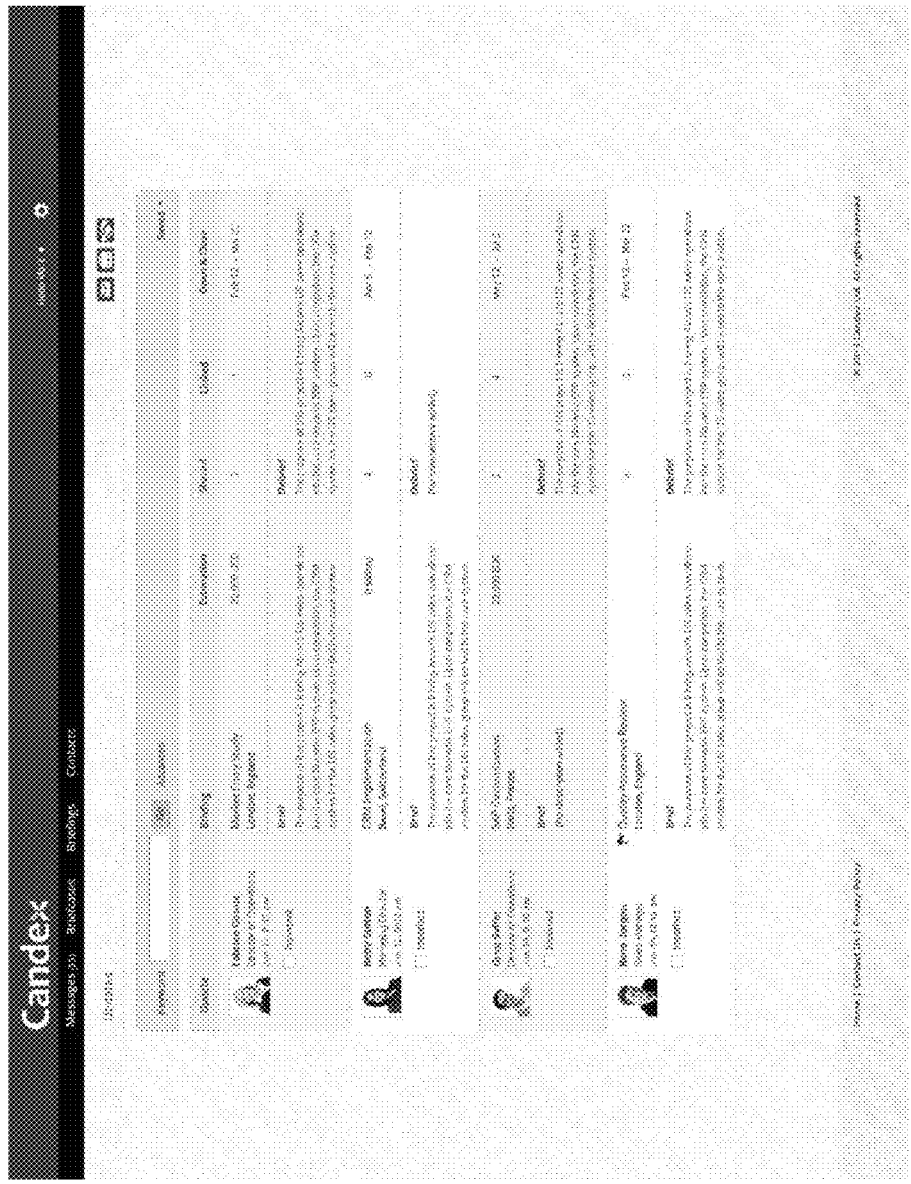

FIG. 8R is an exemplary user interface that displays and/or accesses a list of briefings updates sent from different PCE objects of different linked peers of a certain user. Recent updates are higher up on the list. Updates may be flagged as important. Partners having a flag beside them are not on an approved partner list, which may be updated by a central administrator, for example, based on employee recommendations.

Figure 8S:
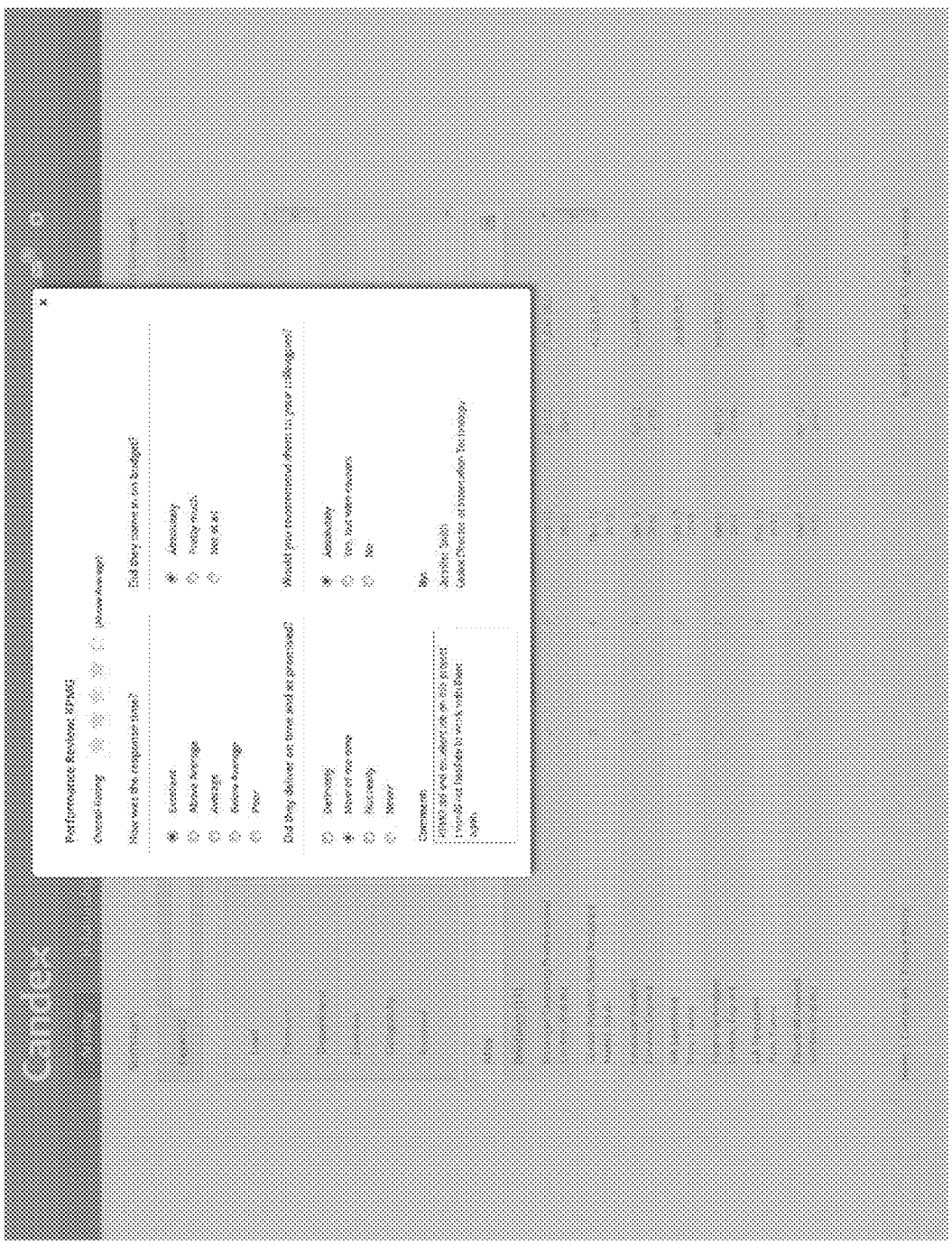

FIG. 8S is an exemplary user interface that displays and/or accesses an exemplary user interface depicting reviews of extra-organizational partners by intra-organizational users that worked with those partners.

Figure 8T:
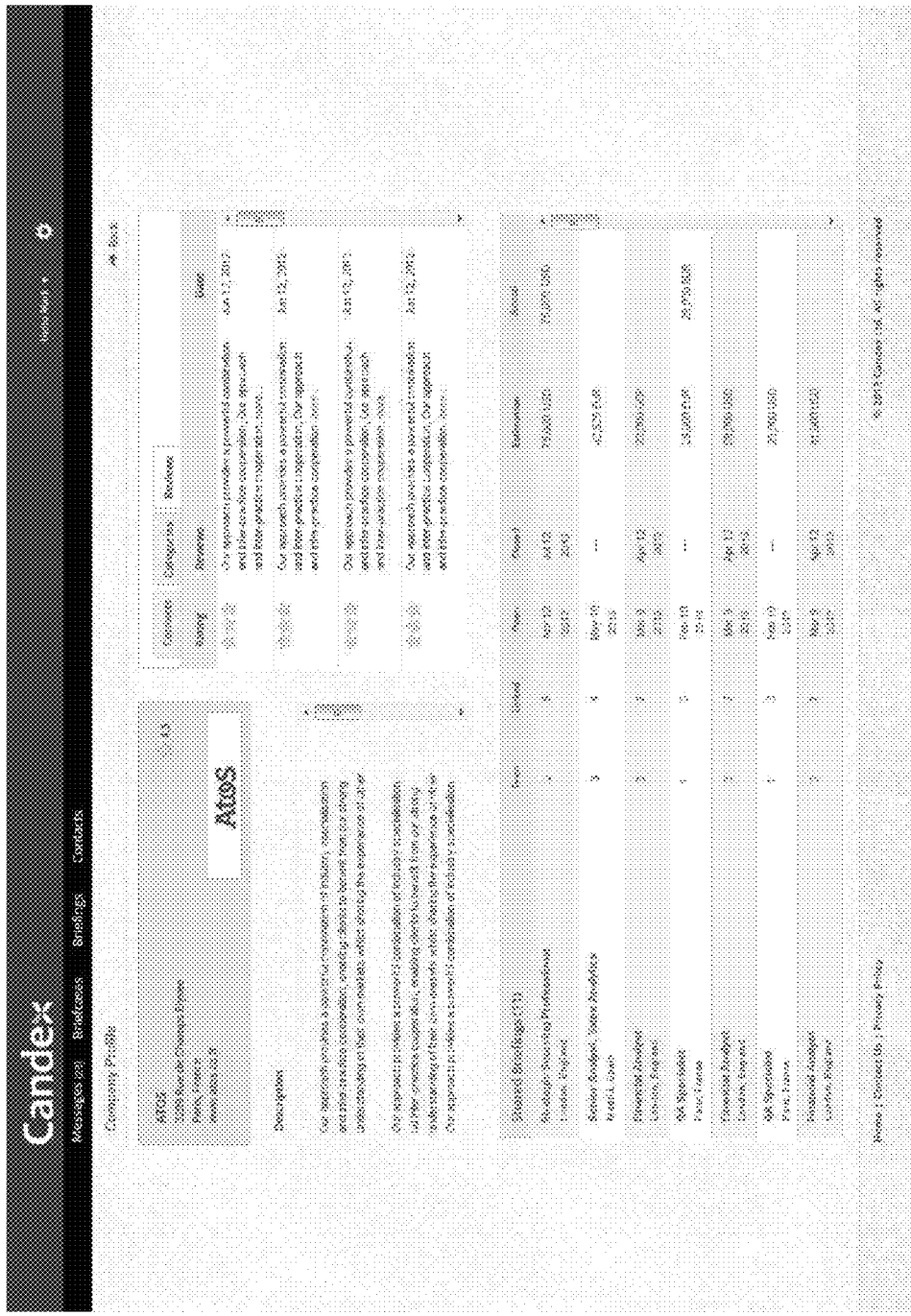

FIG. 8T is an exemplary user interface that displays and/or accesses a partner profile (as described above), which includes review summaries by intra-organizational users that worked with the partner.

Figure 8U:
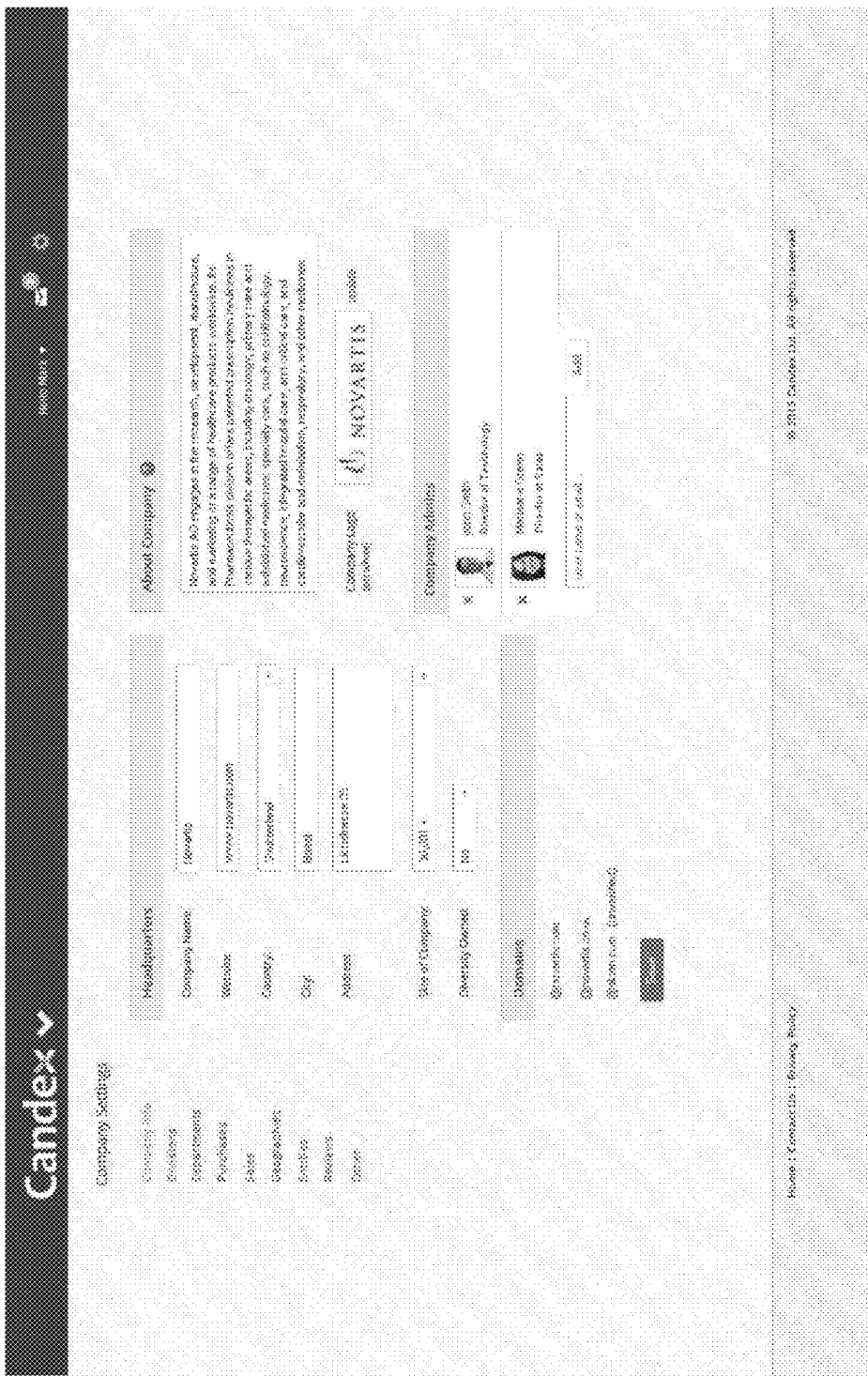

FIG. 8U is an exemplary user interface that displays and/or accesses registration of extra-organizational users based on the email domain name of the extra-organizational partner, for example, by the central administration. Such extra-organizational users have different settings than intra-organizational users, as described herein.

Figure 8V:

FIG. 8V is an exemplary user interface that displays and/or accesses settings for PCE objects, for example, to tag different PCE objects in order to classify them, for example, by division, department, purchases, sales, geography, entities, and other. Reviews may be customized to reflect desired information from the reviewer (by clicking on the Review link). PCE objects may be accessed centrally, for example, by the administrator without having to be a member of the PCE object. Categories may be customized.

Figure 8W:

FIG. 8W is an exemplary user interface that displays and/or accesses settings to authorize partners as vetted, for example, after being approved by procurement. The list of partners may be automatically populated based on activity of users at the organization. Each partner may be vetted by an individual with suitable permission, such as individuals listed under the Verified by column.

Figure 8X:
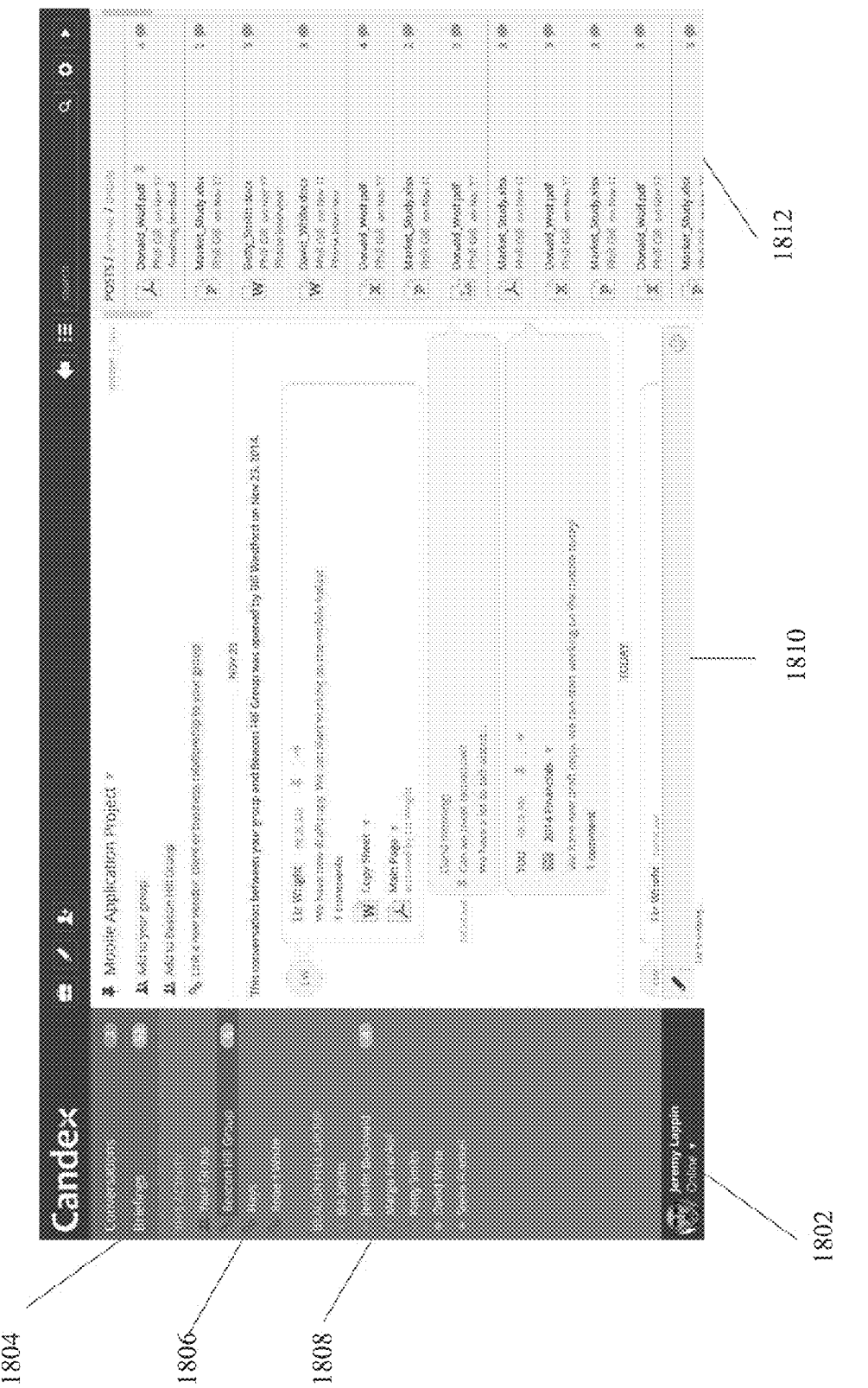

FIG. 8X is an exemplary user interface that displays and/or accesses archived files. User interface may include a user field 1802 of the current user. An optional conversations and briefings field 1804 summarizes the number of active conversations the user is involved with, and the number of briefings the user is publishing (and/or viewing). An activity field 1806 displays the active PCE objects the user has registered with. A correspondence field 1810 displays a history of the correspondences. In this case, the user is viewing the Beacon Hill Group. Members field 1808 may display and/or mark the PCE team members of the selected PCE object (i.e., Beacon Hill Group), such with a green dot next to the respective names. Members field 1808 may display and/or mark the PCE linked entities of the PCE object, such as with a grey dot next to the respective names. A post field 1812 may display files and/or document that have been posted by members of the PCE object, such as files and/or documents within the shared space of the PCE object, for example, by selecting the POSTS tab. It is noted that different versions of documents may be displayed. Access to each document is as described herein.

Figure 8Y:
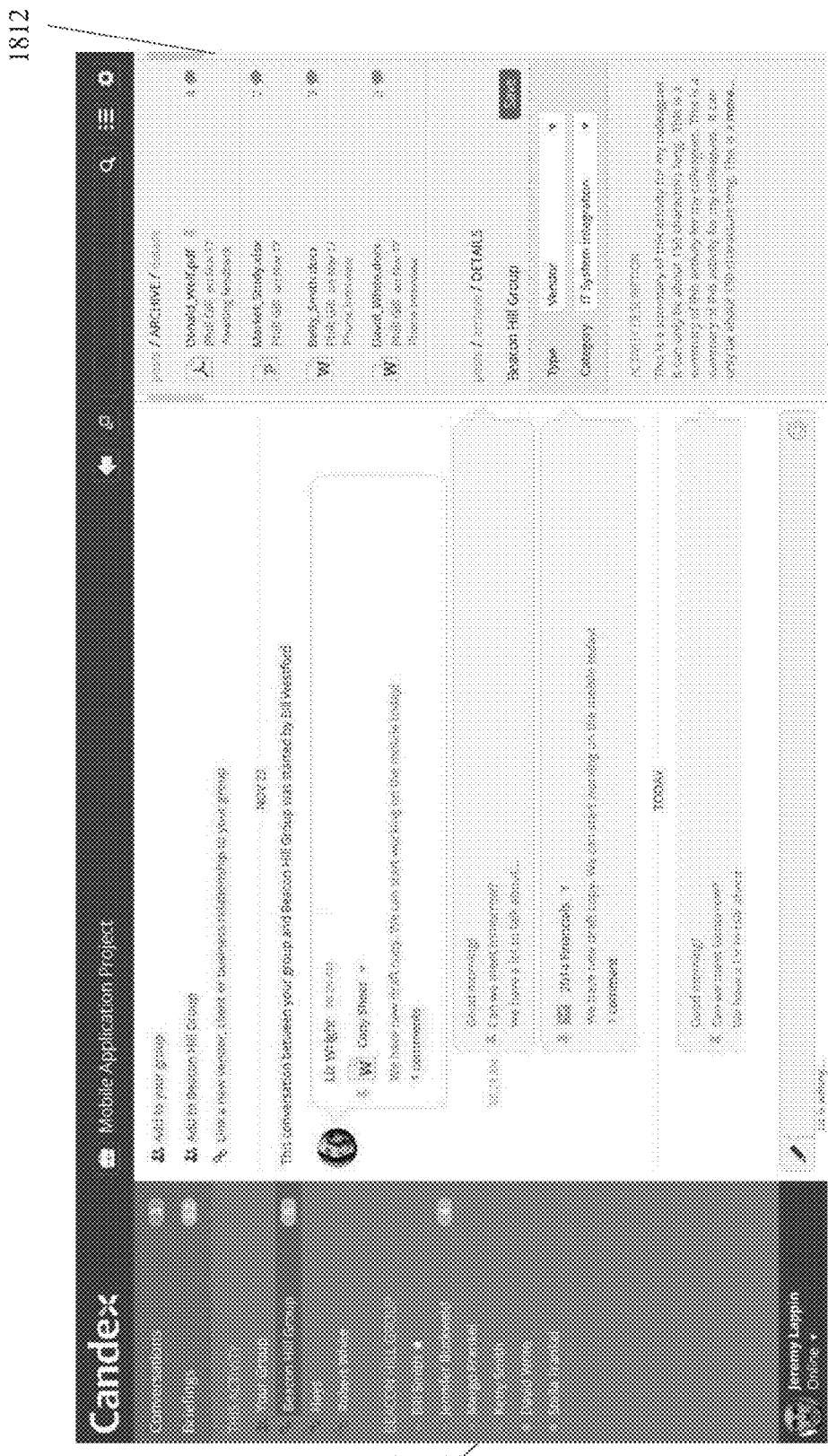

FIG. 8Y is a different view of the exemplary user interface of FIG. 8X. The ARCHIVE tag has been selected from field 1812, displaying archived files. The archived files are a sub-set of files displayed using the POSTS tab, which may represent significant achieved milestones. For example, a single document is archived, instead of the multiple documents representing intermediate steps in creation of the final document. The archived files are available to all members listed in field 1808. Details field 1814 is obtained by selecting the DETAILS tab. Details related to the selected PCE object are presented, for example, the type, category and activity description.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant servers, user interfaces and client terminals will be developed and the scope of the terms server, user interface and client terminal are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer-implemented method for intra-organizational and extra-organizational peer collaboration, comprising:

registering, by using at least one hardware processor of a central server, a plurality of users in a user repository storing a dataset of a plurality of registered users;

receiving, at the central server, a plurality of commands from certain users of the plurality of registered users, to create a plurality of project correspondence environment (PCE) objects each containing PCE metadata and a plurality of PCE team member electronic addresses of a plurality of PCE team members from the registered users, and a plurality of related entity electronic addresses of entities associated with the PCE object;

receiving a command, at the central server, from a certain PCE team member of each PCE object, to associate a plurality of entity users from the plurality of related entities with each PCE object based on the electronic address;

using the at least one hardware processor for:
generating, for each of the PCE objects, a plurality of child PCE objects associated with respective the plurality of related entities, associating each entity user with the respective child PCE object as a PCE child member, and inheriting respective the PCE metadata from the PCE object, each one of the plurality of child PCE objects additionally containing a plurality of child PCE team member electronic addresses of a plurality of child PCE team members;

documenting correspondence held between any of the plurality of child PCE team members within each respective child PCE object using the plurality of related entity electronic addresses in the PCE object;

instructing a plurality of client terminals to present a user interface granting each of the plurality of child PCE team members with an access to correspondence documented in a respective the child PCE object while denying the access to the correspondence documented in the respective the child PCE object from other of the registered users;

documenting correspondence held between any of the plurality of PCE team members with each of the entities using the plurality of related entity electronic addresses in the PCE object; and automatically granting each of the plurality of PCE team members with an access to correspondence documented in the respective PCE object.

2. The method of claim 1, further comprising:
associating the PCE objects with the user; and
generating a list of the PCE objects for presentation in an intra-organizational social profile page.

3. The method of claim 1, further comprising:
blocking access to the documented correspondence from other child PCE team members of other child PCE objects and from PCE team members of the PCE object; and
blocking each of the entities from access to correspondence with other of the entities.

4. The method of claim 1, wherein the metadata includes a brief field which includes a user provided description of a project on which the respective PCE object is based, and a debrief field which includes a user provided update of the project or a summary after project completion.

5. The method of claim 1, wherein the PCE object includes a shared space for sharing of data and correspondence of messages and files between team members of the PCE object and child team members of each child PCE object.

6. The method of claim 1, further comprising displaying on a respective user interface of each team member of each PCE object, information of other team members of the PCE object and information of each related entity of each child PCE object; and
displaying for each child PCE team member, information of other child team members of the PCE object and information of each team member of the PCE object.

7. The method of claim 1, wherein the generated PCE objects and child PCE objects are stored in a PCE repository.

8. The method of claim 1, further comprising:
receiving a command, at the central server, from a certain child PCE team member of each child PCE object, to associate a plurality of entity users from the plurality of related entities of the child PCE object with each child PCE object based on the electronic address; and
generating, for each of the PCE child objects a plurality of grandchild PCE objects associated with respective the plurality of related child entities, associating each child entity user with the respective grandchild PCE object as a PCE grandchild member, and inheriting respective the child PCE metadata from the child PCE object, each one of the plurality of grandchild PCE objects additionally containing a plurality of grandchild PCE team member electronic addresses of a plurality of grandchild PCE team members.

9. The method of claim 8, wherein correspondence of grandchild team members of the grandchild PCE object is unavailable for access by team members of the PCE object, and correspondence of team members of the PCE object is unavailable for access by team grandchild members of the grandchild PCE object.

10. The method of claim 8, further comprising:
receiving, at the central server, a request from a certain team member of the PCE object to link to the grandchild PCE object, and
linking the grandchild PCE object to the PCE object;
wherein selected correspondence of the grandchild team members of the grandchild PCE object is available to team members of the PCE object, and selected correspondence of the PCE team members of the PCE object is available to grandchild team members of the grandchild PCE object.

11. The method of claim 1, further comprising:
linking the child PCE object to the PCE object via a PCE link.

12. The method of claim 1, wherein inheriting comprises automatically copying data from a shared space of the PCE object having permission for access by the respective child PCE object, to the shared space of the respective child PCE object, the copied data having a permission to allow access to the copied data by all child team members of the child PCE object.

13. The method of claim 12, wherein data designated as archived in the PCE object has permission for access by all respective child PCE objects, the archive automatically copied to all child PCE objects.

14. The method of claim 1, wherein the correspondence includes a text message written by the certain team member for viewing by a selected subset of team members based on a permission associated with the text message.

15. The method of claim 1, wherein the correspondence includes a file uploaded by the certain team member to the respective shared space of the PCE object, for downloading or viewing by a selected subset of team members based on a permission associated with the file.

16. The method of claim 15, wherein correspondence designated as archived is available for downloading or reviewing by all team members based on a global permission level.

17. The method of claim 1, wherein the correspondence by the PCE team member is copied to the child PCE object for access by all child PCE team members.

18. The method of claim 1, wherein the correspondence by the child PCE team members is copied to the PCE object for access by all PCE team members.

19. The method of claim 1, further comprising:
receiving, at the central server, a request from at least one user of the plurality of registered users, to become a member of the PCE object; and
mapping, at the central server, between the at least one requesting user and the PCE object, to assign members of the PCE object.

20. The method of claim 1, wherein a single copy of the correspondence is stored within the shared space of the PCE object, the same single copy accessible to the PCE members.

21. The method of claim 1, wherein the PCE team members include internal users from within a company and the child PCE team members include external users from the related entity outside the company, the internal and external users collaborating together through common respective PCE objects.

22. The method of claim 1, further comprising one or both of tagging a PCE link between the PCE object and child PCE object, and storing data in association with the PCE link, the data related to the relationship between the team members of the PCE object and the related entity of the child PCE object.

23. The method of claim 22, wherein the link is unidirectional, and tagging and storing data is independently performed for the link between the PCE object and child PCE object, and for the link between the child PCE object and the parent PCE object.

24. The method of claim 1, wherein metadata of the child PCE object is changed by a certain child PCE member, independently of the metadata of the PCE object.

25. The method of claim 1, further comprising, providing data from a certain team member of the PCE object to selected child team members of the child PCE object, the data uploaded to a shared space of the child PCE object by the certain team member.

26. The method of claim 1, further comprising:
adding a new team member to the PCE object; and
providing access to pre-stored correspondence of the PCE object having permission for access by the new member.

27. The method of claim 1, further comprising:
removing an existing team member of the PCE object; and
providing access to pre-stored correspondence of the PCE object having permission for access by the removed member until the time and date of the removal.

28. The method of claim 1, further comprising selectively upgrading certain registered users to an upgraded system level, wherein registered users at the basic level have access to correspondence within the shared space of each PCE object until a preselected time period, and users at an upgraded level have access to all correspondence independently of the preselected time period.

29. The method of claim 1, further comprising:
receiving, at the central server, a command from a certain PCE team member to close a certain PCE object; and
receiving, at the central server, a command from the certain PCE member to open the closed certain PCE object;
wherein the certain PCE member accesses correspondence of the certain PCE object added between the closing and the opening, after the opening of the closed certain PCE object.

30. The method of claim 1, further comprising:
receiving, at the central server, a command from a certain internal user that another certain internal user has left the organization, and flagging the another certain user within the user repository with a left-the-organization status based on the signal from the certain internal user.

31. The method of claim 1, wherein documented correspondences are retained by blocking at least one of tampering and deletion of the documented correspondences by each of the plurality of PCE team members.

32. A system for intra-organizational and extra-organizational peer collaboration, comprising:
a central server comprising:
a terminal interface configured for communicating with a plurality of client terminals of a plurality of registered users;
a program store storing code;
a user repository that stores a dataset of the plurality of registered users;
a project correspondence environment (PCE) repository that stores a plurality of PCE objects, each containing PCE metadata and a plurality of PCE team member electronic addresses of a plurality of PCE team members from the registered users, and a plurality of related entity electronic addresses of entities associated with the PCE object; and
at least one hardware processor coupled to the terminal interface, and the program store for implementing the stored code, the code comprising:
instructions to associate, based on a received command from a certain PCE team member of each PCE object, a plurality of entity users from the plurality of related entities with each PCE object based on the electronic address,
instructions to generate, for each of the PCE objects, a plurality of child PCE objects associated with respective the plurality of related entities, associates each entity user with the respective child PCE object as a PCE child member, and inherits respective the PCE metadata from the PCE object, each one of the plurality of child PCE objects additionally containing a plurality of child PCE team member electronic addresses of a plurality of child PCE team members,
instructions to receive a plurality of commands from certain users of the plurality of registered users, creates a plurality of PCE objects,
instructions to document correspondence held between any of the plurality of child PCE team members within each respective child PCE object using the plurality of related entity electronic addresses in the PCE object,
instructions to instruct the plurality of client terminals to present a user interface that grants each of the plurality of child PCE team members with an access to correspondence documented in a respective the child PCE object while denying the access to the correspondence documented in the respective the child PCE object from other of the registered users;
instructions to document correspondence held between any of the plurality of PCE team members with each of the entities using the plurality of related entity electronic addresses in the PCE object, and
instructions to grant each of the plurality of PCE team members with an access to correspondence documented in a respective the PCE object;
wherein the terminal interface transmits instructs the respective client terminal from the plurality of client terminals to at least one of displaying and downloading, correspondence of a respective PCE or child PCE based on an associated permission and the user accessing the client terminal.

33. The system of claim 32, wherein the metadata includes a brief field which includes a user provided description of a project on which the respective PCE object is based, and a debrief field which includes a user provided update of the project or a summary after project completion.

34. The system of claim 32, wherein the PCE object includes a shared space for sharing of data and correspondence of messages and files between members of the respective PCE object.

35. The system of claim 32, wherein stored code implemented by the at least one hardware processor comprises instruction for storing PCE links between PCE objects of the PCE repository.

36. The system of claim 32, wherein stored code implemented by the at least one hardware processor comprises instruction for performing the inheriting by automatically copying data from a shared space of the parent PCE object having permission for access by the child PCE object, to a shared space of the child PCE object, the copied data having a permission to allow access to the copied data by all child team members of the child PCE object.

37. The system of claim 32, wherein each stored correspondence includes the associated permission denoting a subset of the PCE team members and child PCE objects that have access to the data.

38. The system of claim 37, wherein a single copy of the correspondence is stored within the PCE object, the single copy accessible to the subset of PCE team members.

39. The system of claim 32, wherein stored code implemented by the at least one hardware processor comprises instruction for storing one or both of a tag of a PCE link and data in association with the PCE link between the child PCE object and the PCE object.

40. The system of claim 32, wherein stored code implemented by the at least one hardware processor comprises instruction for copying data from the child PCE object having permission for access by the team members of the PCE object, to the PCE object.

41. The system of claim 32, wherein stored code implemented by the at least one hardware processor comprises instruction for sending an email to a non-registered peer when the PCE object, contains certain correspondence having a permission to allow the non-registered peer access to the certain correspondence, the email including the data in the body of the email or as an attachment, the email including metadata to allow the non-registered peer to respond to the email.

42. The system of claim 41, wherein stored code implemented by the at least one hardware processor comprises instruction for receiving a response email from the non-registered user, and to decode metadata within the response email to integrate data from the response email with the shared space of the correct corresponding PCE object.

43. The system of claim 32, wherein the system is a stand-alone system independent of integration with a company system.

44. The system of claim 32, further comprising a user interface that displays to a certain registered user, a customized view of correspondence stored within each PCE object associated with the certain registered user, based on associated permission allowing the certain registered user access to certain correspondence.

45. The system of claim 32, further comprising a user interface that provides a central data space for a certain registered user, wherein certain correspondence from all PCE objects associated with the certain registered user is centrally organized in a single list, based on the associated permission allowing the certain registered user access to the certain correspondence.

46. The system of claim 45, wherein the user interface includes code to mirror the certain correspondence between the respective PCE objects and the central data space, so that removal of the certain correspondence from the central data space retains the certain data in the respective PCE object.

47. The system of claim 45, wherein the user interface displays data from respective PCE objects that has not been acted upon by the certain registered user, within the central data space.

48. The system of claim 45, wherein the user interface includes a closed PCE object that consolidates correspondence added to closed PCE objects after closing of respective PCE objects by the certain registered user.

49. The system of claim 32, further comprising a user interface that aggregates all extra-organizational members of all PCE objects into an extra-organizational dataset, and to allow an intra-organizational registered user to search the dataset.

50. The system of claim 32, further comprising a user interface that tags each PCE object with a category type, and searches through PCE objects based on the category type.

51. A computer-implemented method for intra-organizational and extra-organizational peer social networking, comprising:
registering, at a central server and using at least one hardware processor, a plurality of users in a user repository storing a dataset of a plurality of registered users;
receiving, at the central server, a plurality of commands from certain users of the plurality of registered users, to create a plurality of project correspondence environment (PCE) objects each containing PCE metadata and a plurality of PCE team member electronic addresses of a plurality of PCE team members from the registered users, and a plurality of related entity electronic addresses of entities associated with the PCE object;
receiving a command, at the central server, from a certain PCE team member of each PCE object, to associate a plurality of entity users from the plurality of related entities with each PCE object based on the electronic address;
using the at least one hardware processor for:
documenting correspondence held between any of the plurality of PCE team members with each of the entities using the plurality of related entity electronic addresses in the PCE object;
instructing a plurality of client terminals to present a user interface granting each of the plurality of PCE team members with an access to correspondence documented in a respective the PCE object;
associating the PCE objects with the user;
generating a list of the PCE objects for presentation in an intra-organizational social profile page; and
mapping social links between registered users of the user repository, and providing the list of the user to other users socially linked to the user.

52. The method of claim 51, wherein the metadata includes a brief field denoting a project on which the respective PCE object is based, a debrief field denoting an update of the project or a summary after project completion, and a shared space for sharing of data and correspondence of messages and files between team members of the PCE object.

53. The method of claim 51, wherein the metadata includes data, messages, and files designated as archived, and the list includes PCE objects with accessible archived items from the social profile page.

54. The method of claim 51, further comprising mapping links between PCE objects of each user having child PCE objects therefrom.

55. The method of claim 51, further comprising blocking display of the list to extra-organizational users.

56. The method of claim 51, wherein the list includes a brief and a debrief of the PCE objects associated with the user, when the user is extra-organizational and list for the extra-organizational is viewed by intra-organizational users.

57. The method of claim 51, wherein each PCE object is associated with a social permission level, and each social link is associated with a social permission threshold, the social permission threshold defining which particular PCE objects of the at least linked user to provide.

58. The method of claim 51, further comprising mapping the social links between registered users based on an organizational hierarchal structure of the organization, so that supervisors arc linked to subordinates and to superiors.

59. The method of claim 51, further comprising automatically detecting an update of the metadata of respective PCE objects, and automatically sending a message including the updated metadata to the linked user.

60. The method of claim 51, further comprising generating for a certain extra-organizational user, a list of respective PCE objects for presentation based on the certain extra-organizational user being a member of the respective PCE objects.

61. The method of claim 51, further comprising providing a user with a suitable permission level access to a certain PCE object without being linked to PCE team members of the certain PCE object.

62. The method of claim 51, further comprising automatically linking between intra-organizational users of the user repository and extra-organizational users of the user repository based on the extra-organizational users being members of the PCE object together with respective intra-organizational users.

* * * * *